US009213994B2

(12) United States Patent
Green et al.

(10) Patent No.: US 9,213,994 B2
(45) Date of Patent: *Dec. 15, 2015

(54) SYSTEMS AND METHODS FOR QUANTIFYING FLOOD RISK

(71) Applicant: CORELOGIC SOLUTIONS, LLC, Irvine, CA (US)

(72) Inventors: Mark Charles Green, North Royalton, OH (US); Lee Jason Sears, Georgetown, TX (US); Wei Du, Springfield, VA (US); Jeff C. Himmelright, Round Rock, TX (US); Kevin Eugene Madden, Cedar Park, TX (US)

(73) Assignee: CORELOGIC SOLUTIONS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,018

(22) Filed: Feb. 12, 2014

(65) Prior Publication Data
US 2014/0229420 A1 Aug. 14, 2014

Related U.S. Application Data

(63) Continuation of application No. 12/027,096, filed on Feb. 6, 2008, now Pat. No. 8,655,595, which is a continuation-in-part of application No. 11/974,911, filed on Oct. 16, 2007, now Pat. No. 7,917,292.

(60) Provisional application No. 60/899,904, filed on Feb. 7, 2007, provisional application No. 60/852,379, filed on Oct. 17, 2006.

(51) Int. Cl.
*G01V 3/38* (2006.01)
*G06Q 40/08* (2012.01)
(Continued)

(52) U.S. Cl.
CPC ............ *G06Q 40/08* (2013.01); *G06N 5/048* (2013.01); *G06Q 90/00* (2013.01)

(58) Field of Classification Search
CPC ........ G06Q 40/08; G06Q 90/00; G06N 5/048
USPC ......... 702/1, 2, 5, 12, 50, 179–181, 183, 187; 705/4, 313
See application file for complete search history.

(56) References Cited

U.S. PATENT DOCUMENTS 4,766,539 A 8/1988 Fox
4,831,526 A 5/1989 Luchs et al.
(Continued)

*Primary Examiner* — Sujoy Kundu
*Assistant Examiner* — Ricky Ngon
(74) *Attorney, Agent, or Firm* — Oblon, McClelland, Maier & Neustadt, L.L.P.

(57) ABSTRACT

In various embodiments, a flood risk score may be determined for a property point that provides a comprehensive assessment of the property point's risk of flooding. Determining the flood risk score may include determining a flood risk characteristic for the property point and assigning a flood risk score that corresponds to the flood risk characteristic. In some embodiments, flood risk characteristics may include a difference in elevation between the elevation of the property point and an elevation of a calculated point (e.g., on a known flood risk zone boundary). Flood risk characteristics may also include a flood zone determination for the property point and/or proximity of the property point to a known flood risk zone boundary or a flood source. In some embodiments, flood risk scores may be provided on flood risk score reports.

20 Claims, 72 Drawing Sheets

(51) Int. Cl.

*G06Q 90/00* (2006.01)
*G06N 5/04* (2006.01)

(56) References Cited

U.S. PATENT DOCUMENTS

| | | | |
|---|---|---|---|
| 4,876,648 A | 10/1989 | Lloyd | |
| 4,885,706 A | 12/1989 | Pate et al. | |
| 4,975,840 A | 12/1990 | DeTore et al. | |
| 5,546,107 A | 8/1996 | Deretsky et al. | |
| 5,559,707 A | 9/1996 | DeLorme et al. | |
| 5,796,634 A | 8/1998 | Craport et al. | |
| 5,839,113 A | 11/1998 | Federau et al. | |
| 5,848,373 A | 12/1998 | DeLorme et al. | |
| 5,873,066 A | 2/1999 | Underwood et al. | |
| 5,913,210 A | 6/1999 | Call | |
| 5,946,687 A | 8/1999 | Gehani et al. | |
| 5,953,722 A | 9/1999 | Lampert et al. | |
| 5,968,109 A | 10/1999 | Israni et al. | |
| 6,101,496 A | 8/2000 | Esposito | |
| 6,102,618 A | 8/2000 | Takada et al. | |
| 6,115,669 A | 9/2000 | Watanabe et al. | |
| 6,118,404 A | 9/2000 | Fernekes et al. | |
| 6,119,065 A | 9/2000 | Shimada et al. | |
| 6,163,770 A | 12/2000 | Gamble et al. | |
| 6,263,343 B1 | 7/2001 | Hirono | |
| 6,308,177 B1 | 10/2001 | Israni et al. | |
| 6,467,994 B1 | 10/2002 | Ankeny et al. | |
| 6,498,982 B2 | 12/2002 | Bellesfield et al. | |
| 6,529,824 B1 | 3/2003 | Obradovich et al. | |
| 6,539,080 B1 | 3/2003 | Bruce et al. | |
| 6,591,270 B1 | 7/2003 | White | |
| 6,631,326 B1 | 10/2003 | Howard et al. | |
| 6,678,615 B2 | 1/2004 | Howard et al. | |
| 6,684,219 B1 | 1/2004 | Shaw et al. | |
| 6,711,554 B1 | 3/2004 | Salzmann et al. | |
| 6,829,690 B1 | 12/2004 | Ashby | |
| 6,836,270 B2 | 12/2004 | Du | |
| 6,842,698 B2 | 1/2005 | Howard et al. | |
| 6,889,141 B2 | 5/2005 | Li et al. | |
| 6,934,634 B1 | 8/2005 | Ge | |
| 6,947,842 B2 | 9/2005 | Smith et al. | |
| 6,950,519 B2 | 9/2005 | Rhoads | |
| 7,038,681 B2 | 5/2006 | Scott et al. | |
| 7,042,470 B2 | 5/2006 | Rhoads et al. | |
| 7,054,741 B2 | 5/2006 | Harrison et al. | |
| 7,061,510 B2 | 6/2006 | Rhoads | |
| 7,082,443 B1 | 7/2006 | Ashby | |
| 7,085,650 B2 | 8/2006 | Anderson | |
| 7,092,957 B2 | 8/2006 | Klein | |
| 7,099,492 B2 | 8/2006 | Rhoads | |
| 7,099,882 B2 | 8/2006 | McDonough | |
| 7,114,050 B2 | 9/2006 | Ashby | |
| 7,117,199 B2 | 10/2006 | Frank et al. | |
| 7,127,107 B2 | 10/2006 | Kubota et al. | |
| 7,142,217 B2 | 11/2006 | Howard et al. | |
| 7,161,604 B2 | 1/2007 | Higgins et al. | |
| 7,167,187 B2 | 1/2007 | Scott et al. | |
| 7,184,572 B2 | 2/2007 | Rhoads et al. | |
| 7,190,377 B2 | 3/2007 | Scott et al. | |
| 7,197,160 B2 | 3/2007 | Rhoads et al. | |
| 7,254,249 B2 | 8/2007 | Rhoads et al. | |
| 7,383,125 B2 | 6/2008 | de Silva et al. | |
| 2001/0028348 A1 | 10/2001 | Higgins et al. | |
| 2001/0032050 A1 | 10/2001 | Howard et al. | |
| 2001/0033292 A1 | 10/2001 | Scott et al. | |
| 2001/0034579 A1 | 10/2001 | Howard et al. | |
| 2001/0047326 A1 | 11/2001 | Broadbent et al. | |
| 2002/0035432 A1 | 3/2002 | Kubica et al. | |
| 2002/0145617 A1 | 10/2002 | Kennard et al. | |
| 2002/0147613 A1 | 10/2002 | Kennard et al. | |
| 2003/0052896 A1 | 3/2003 | Higgins et al. | |
| 2004/0019517 A1 | 1/2004 | Sennott | |
| 2004/0034666 A1 | 2/2004 | Chen | |
| 2004/0046774 A1 | 3/2004 | Rhoads et al. | |
| 2004/0128170 A1 | 7/2004 | MacKethan et al. | |
| 2004/0138817 A1 | 7/2004 | Zoken et al. | |
| 2004/0172264 A1 | 9/2004 | Fletcher et al. | |
| 2004/0199410 A1 | 10/2004 | Feyen et al. | |
| 2004/0263514 A1 | 12/2004 | Jin et al. | |
| 2005/0027571 A1 | 2/2005 | Gamarnik et al. | |
| 2005/0034074 A1 | 2/2005 | Munson et al. | |
| 2005/0075911 A1 | 4/2005 | Craven | |
| 2005/0091193 A1 | 4/2005 | Frank et al. | |
| 2005/0091209 A1 | 4/2005 | Frank et al. | |
| 2005/0100220 A1 | 5/2005 | Keaton et al. | |
| 2005/0119824 A1 | 6/2005 | Rasmussen et al. | |
| 2005/0159882 A1 | 7/2005 | Howard et al. | |
| 2005/0177529 A1 | 8/2005 | Howard et al. | |
| 2005/0203768 A1 | 9/2005 | Florance et al. | |
| 2005/0203778 A1 | 9/2005 | Chen et al. | |
| 2005/0209867 A1 | 9/2005 | Diesch et al. | |
| 2005/0273346 A1 | 12/2005 | Frost | |
| 2005/0283503 A1 | 12/2005 | Hancock et al. | |
| 2005/0288957 A1 | 12/2005 | Eraker et al. | |
| 2005/0288958 A1 | 12/2005 | Eraker et al. | |
| 2006/0036588 A1 | 2/2006 | Frank et al. | |
| 2006/0041375 A1 | 2/2006 | Witmer et al. | |
| 2006/0041573 A1 | 2/2006 | Miller et al. | |
| 2006/0045351 A1 | 3/2006 | Jin et al. | |
| 2006/0059073 A1* | 3/2006 | Walzak | 705/35 |
| 2006/0072783 A1 | 4/2006 | Rhoads | |
| 2006/0075422 A1 | 4/2006 | Choi et al. | |
| 2006/0100912 A1 | 5/2006 | Kumar et al. | |
| 2006/0125828 A1 | 6/2006 | Harrison et al. | |
| 2006/0126959 A1 | 6/2006 | Padwick et al. | |
| 2006/0262963 A1 | 11/2006 | Navulur et al. | |
| 2006/0265350 A1 | 11/2006 | Klein | |
| 2007/0124328 A1 | 5/2007 | Klein | |
| 2007/0257235 A1 | 11/2007 | Park et al. | |
| 2007/0261517 A1 | 11/2007 | Lee et al. | |
| 2008/0055096 A1 | 3/2008 | Aylward | |
| 2008/0133462 A1 | 6/2008 | Aylward et al. | |

\* cited by examiner

| Flood Event | Annual Probability of Occurrence | Flood Elevation | Exceedance Probability |
|---|---|---|---|
| 1 | 0.002 | 124.5 | 0.002 |
| 2 | 0.005 | 117.35 | 0.007 |
| 3 | 0.01 | 112.75 | 0.017 |
| 4 | 0.02 | 110.12 | 0.037 |
| 5 | 0.03 | 107.45 | 0.067 |
| 6 | 0.04 | 103.11 | 0.107 |
| 7 | 0.05 | 100.5 | 0.157 |
| 8 | 0.06 | 98.33 | 0.217 |
| 9 | 0.07 | 96.52 | 0.287 |
| 10 | 0.08 | 93.61 | 0.357 |
| 11 | 0.09 | 92.23 | 0.447 |
| 12 | 0.1 | 90.76 | 0.547 |
| 13 | 0.12 | 87.67 | 0.647 |
| 14 | 0.15 | 84.85 | 0.797 |
| 15 | 0.2 | 81.66 | 0.997 |

*FIG. 8b*

**Flood Frequency –
Flood Depth Relationship at the Property**

| Flood Frequency | Flood Depth at the Property |
|---|---|
| 2yr | 0 |
| 5yr | 0 |
| 10yr | 0 |
| 50yr | 1 |
| 100yr | 3 |
| 200yr | 6 |
| 500yr | 10 |
| 1000yr | 16 |

*FIG. 17a*

**Flood Damage Curve

Building Type: IND3 –
Chemical Plant, contents (Equipment)**

| Flood Depth | % Damage |
|---|---|
| 1 | 38 |
| 2 | 44 |
| 3 | 52 |
| 4 | 92 |
| 5 | 92 |
| 6 | 92 |
| 7 | 92 |
| 8 | 92 |

*FIG. 17b*

**Flood Frequency –
Flood Damage
Relationship at the Property**

| Flood Frequency | Flood Depth at the Property |
|---|---|
| 2yr | $0 |
| 5yr | $0 |
| 10yr | $0 |
| 50yr | $1,435,000 |
| 100yr | $2,475,000 |
| 200yr | $3,345,000 |
| 500yr | $3,345,000 |
| 1000yr | $3,345,000 |

*FIG. 17c*

| Flood Frequency | Return Period | Flood Elevation | Flood Water Depth | Loss Value |
|---|---|---|---|---|
| 0.04 | 25 | 120 | 0 | 0 |
| 0.02 | 50 | 122 | 0.5 | $180,000 |
| 0.01 | 100 | 124 | 2.5 | $200,000 |
| 0.004 | 250 | 126 | 4.5 | $230,000 |
| 0.002 | 500 | 128 | 6.5 | $250,000 |

*FIG. 17d*

| Event | Annual Probability of Occurrence | Loss | Exceedance Probability | P * L |
|---|---|---|---|---|
| 1 | 0.002 | $25,000,000 | 0.0020 | $50,000 |
| 2 | 0.005 | $15,000,000 | 0.0070 | $105,000 |
| 3 | 0.01 | $10,000,000 | 0.0170 | $170,000 |
| 4 | 0.02 | $5,000,000 | 0.0370 | $185,000 |
| 5 | 0.03 | $3,000,000 | 0.0670 | $201,000 |
| 6 | 0.04 | $2,000,000 | 0.1070 | $214,000 |
| 7 | 0.05 | $1,000,000 | 0.1570 | $157,000 |
| 8 | 0.06 | $800,000 | 0.2170 | $173,000 |
| 9 | 0.07 | $700,000 | 0.2870 | $200,900 |
| 10 | 0.08 | $600,000 | 0.3570 | $214,200 |
| 11 | 0.09 | $500,000 | 0.4470 | $223,500 |
| 12 | 0.1 | $400,000 | 0.5470 | $218,800 |
| 13 | 0.12 | $300,000 | 0.6470 | $194,100 |
| 14 | 0.15 | $200,000 | 0.7970 | $159,400 |
| 15 | 0.2 | $100,000 | 0.9970 | $99,700 |
| | | Average Annual loss(AAL) = | | $2,266,200 |

FIG. 18b

| Impacted by Flood Events | Base | Levee | Dam | Hurricane | Landslide | Tsunami | Flash Flooding | Total Score |
|---|---|---|---|---|---|---|---|---|
| | | | | Risk Adjustments | | | | |
| 2-10yr Flood | 6 | 1 | 0.5 | 1 | 0.5 | 0.5 | 0.5 | 10 |
| 10-50yr Flood | 5 | 1 | 0.5 | 1 | 0.5 | 0.5 | 0.5 | 9 |
| 50-100yr Flood | 4 | 1 | 0.5 | 1 | 0.5 | 0.5 | 0.5 | 8 |
| 100-200yr Flood | 3 | 1 | 0.5 | 1 | 0.5 | 0.5 | 0.5 | 7 |
| 200-500yr Flood | 2 | 1 | 0.5 | 1 | 0.5 | 0.5 | 0.5 | 6 |
| 500-1000yr Flood | 1 | 0 | 0 | 0 | 0.5 | 0 | 0.5 | 5 |
| Non-Flood Zone | 0 | 0 | 0 | 0 | 0 | 0 | 0.5 | 1 |

FIG. 19

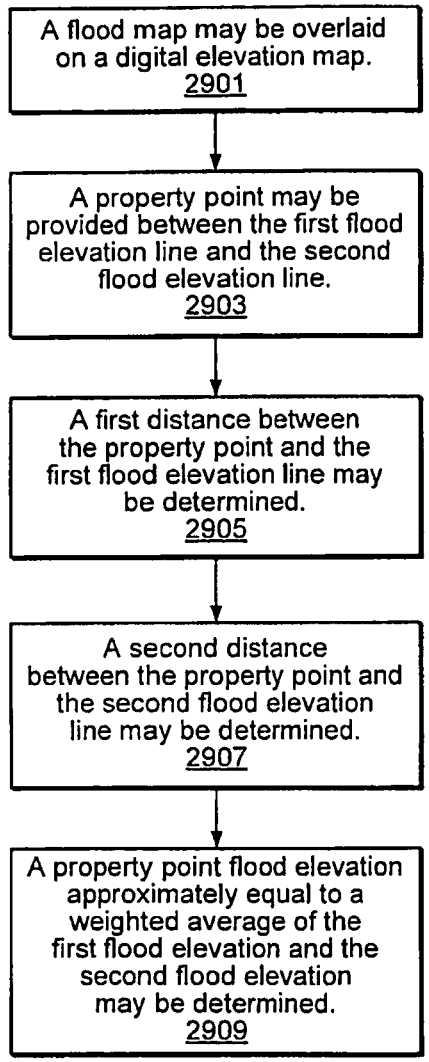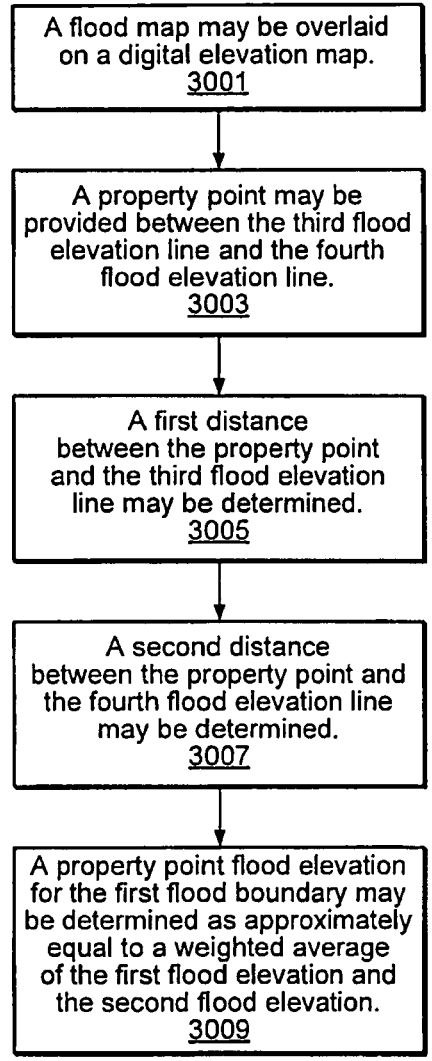
FIG. 29                    FIG. 30

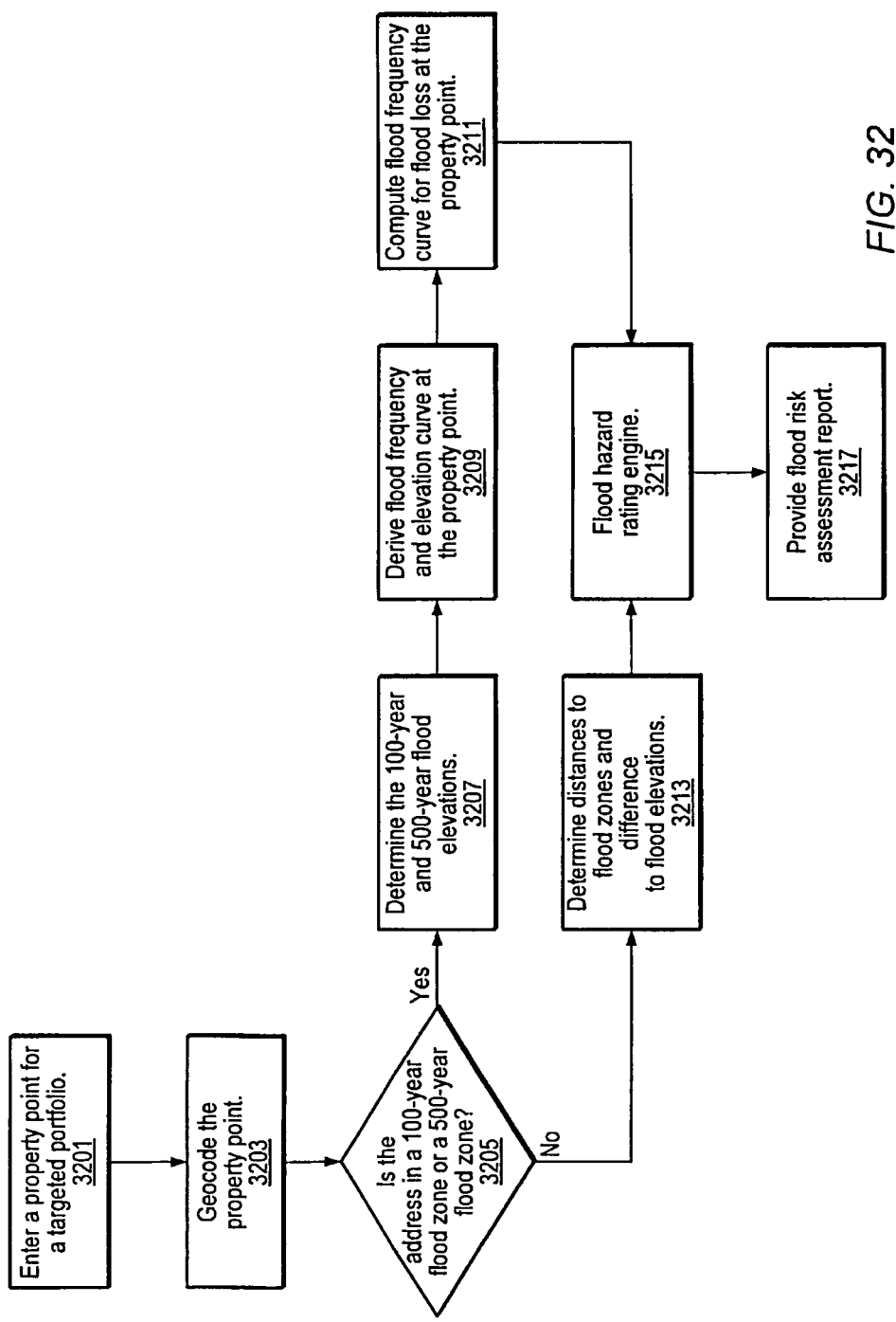

| Flooding Source | | Floodway | | | 1-Percent Annual Chance Flood Water-Surface Elevation (Feet NAVD 88) | | | |
|---|---|---|---|---|---|---|---|---|
| Cross Section | Distance (feet above mouth) | Width (feet) | Section Area (square feet) | Mean Velocity (feet per second) | Regulatory | Without Floodway | With Floodway | Increase |
| AN | 83,000 | 2999 | 56,421 | 1.0 | 27.8 | 27.8 | 28.1 | 0.3 |
| AO | 86,233 | 2950 | 48,635 | 1.2 | 34.5 | 34.5 | 35.2 | 0.7 |
| AP | 87,598 | 3995 | 58,425 | 1.8 | 39.6 | 39.5 | 40.6 | 1.1 |
| AQ | 89,720 | 4857 | 36,254 | 0.8 | 42.3 | 42.1 | 43.8 | 1.7 |

FIG. 37c

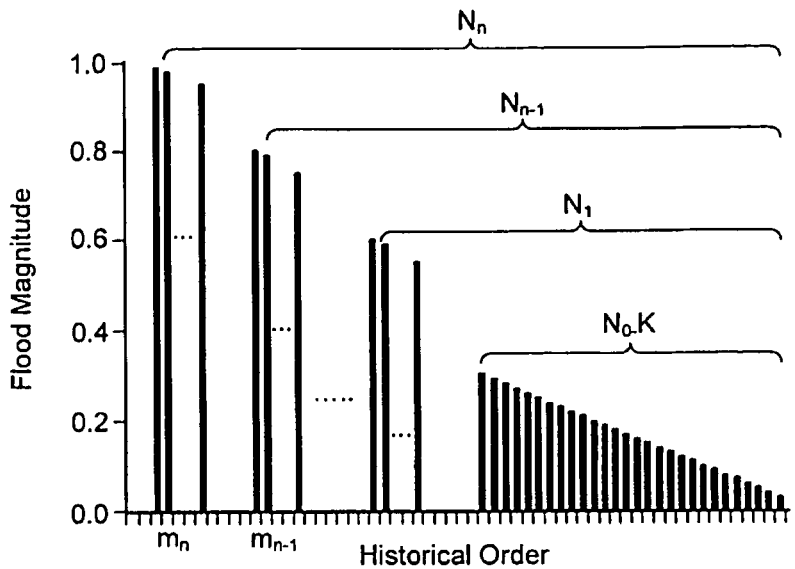

$N_i$ = number of years in the ith time period from the right to the left, i = 0, 1, 2, ..., n; and, $M_i$ = number of flood in the ith discrete segment from the right to the left, i = 1, 2, ...., n K = number of the floods which were taken to an extreme flood segment

*FIG. 38a*

| Frequency | Date | Discharge | Height | Elevation | Event Type |
|---|---|---|---|---|---|
| 0.001 | 5/1/1973 | 1030000 | 48.28 | 424.71 | Extreme Event |
| 0.002 | 6/9/1923 | 1018000 | 37 | 413.43 | Extreme Event |
| 0.003 | 6/21/1842 | 1000000 | 40.22 | 416.65 | Extreme Event |
| ..... | ..... | ..... | ..... | ..... | ..... |
| 0.012 | 1/23/1924 | 887300 | 35.1 | 411.53 | Significant Event |
| 0.022 | 7/12/1919 | 861500 | 34.25 | 410.68 | Significant Event |
| 0.031 | 7/28/1977 | 854000 | 44.83 | 421.26 | Significant Event |
| 0.041 | 6/5/1918 | 851000 | 33.85 | 410.28 | Significant Event |
| 0.05 | 4/26/1964 | 843000 | 37.24 | 413.67 | Significant Event |
| 0.059 | 3/24/1948 | 836000 | 37.84 | 414.27 | Significant Event |
| 0.069 | 2/24/1992 | 810000 | 40.69 | 417.12 | Significant Event |
| ..... | ..... | ..... | ..... | ..... | ..... |
| 0.079 | 4/21/1922 | 784500 | 32.85 | 409.28 | Continuous |
| 0.089 | 7/18/1948 | 783100 | 39.76 | 416.19 | Continuous |
| 0.099 | 7/22/1921 | 781000 | 40.38 | 416.81 | Continuous |
| 0.109 | 4/29/1984 | 776600 | 33.5 | 409.93 | Continuous |

*FIG. 38b*

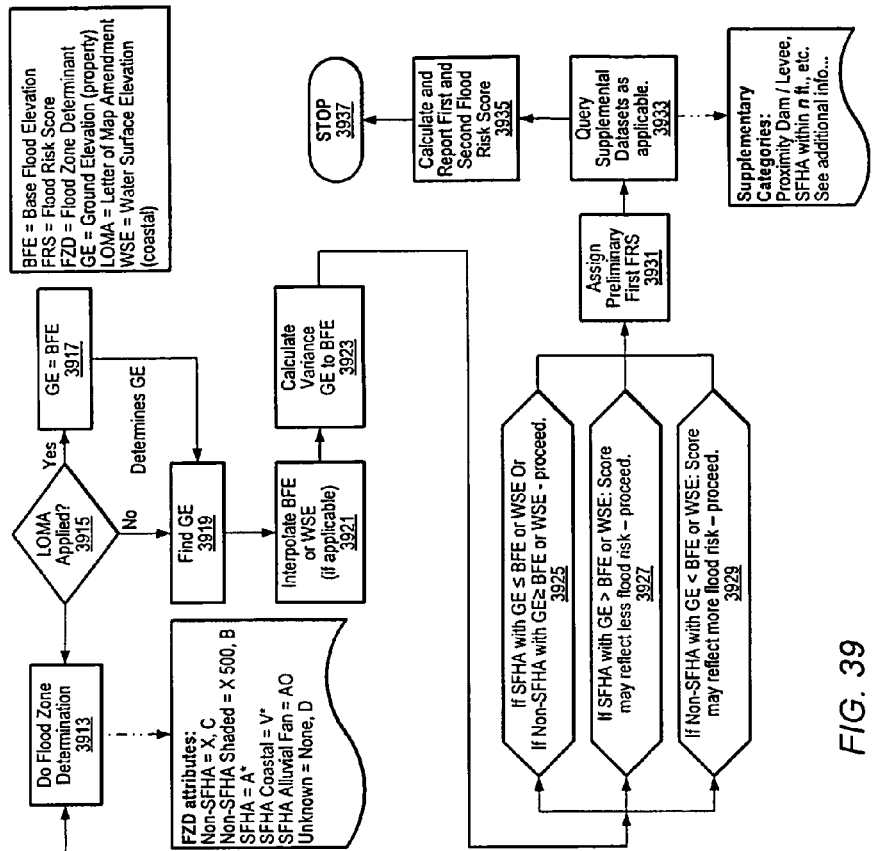
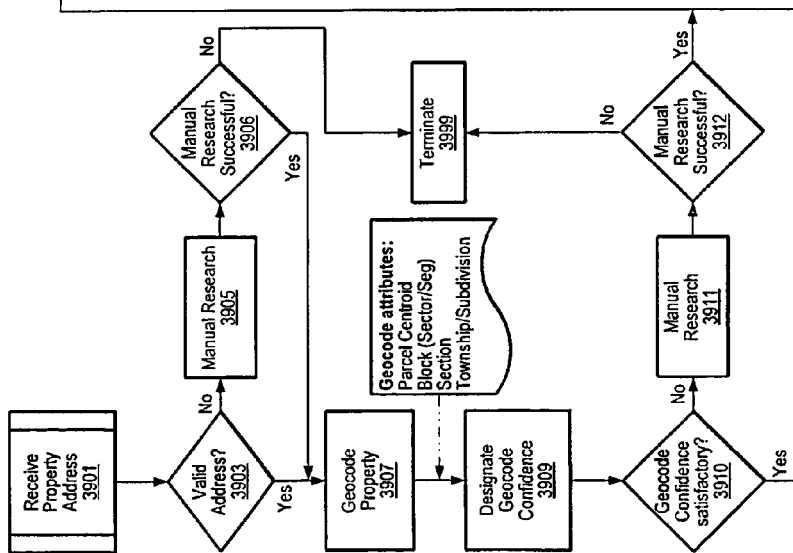
FIG. 39

Equation 4101: Dx = 0.5 D100 Log(RTx)

Equation 4103: $RTx = 10^{\frac{2}{D100}Dx}$

Equation 4105: SRx = (RTmax + RTmin − RTx) / (RTmax) * SRlimit

Equation 4107: $SRx = Int\left(\frac{SRlimit}{RTMax}(RTMax + Rtmin - 10^{\frac{2}{D100}Dx})\right)$ Equation 4103: $RTx = 10^{\frac{2}{D100}Dx}$ If D100 = 500ft $RTx = 10^{\frac{2}{500}Dx}$ $RTx = 10^{0.004\,Dx}$ If Dx = 500

$RTx = 10^{0.004 * 500} = 10^2 = 100$

If Dx = 0

$RTx = 10^0 = 1$

If Dx = 750

$RTx = 10^{0.004 * 750} = 1000$

---

Equation 4107: $SRx = Int\left(\frac{SRlimit}{RTMax}(RTMax + RTmin - RTx)\right)$ Equation 4109: $SRx = Int\left(\frac{75}{1000}(1000 + 1 - RTx)\right)$ $SRx = Int(0.075(1001 - RTx))$ If RTx = 1 (at river)

$SRx = Int(0.075(1001 - 1)) = 75$

If RTx = 1001 (beyond 1000 year flood zone)

$SRx = Int(0.075(1001 - 1001)) = 0$

Equation 4111: $SRx = Int(0.075(1001 - 10^{0.004\,Dx}))$

FIG. 41c

Equation 4111: $SR_x = \text{Int}(0.075(1001 - 10^{0.004 D_x}))$

Where $0 <= D_x <= 1.5\ D_{100}$ ($0 <= D_x < 750$) and where $D_x = 750$, $SR_x = 0$

| | |
|---|---|
| When $D_x = 0$ (at the river), $SR_x = 0.075(1001-1) = 75$ | (1 Year Flood) |
| When $D_x = 250$, $SR_x = 0.075(1001-10) = 74$ | (10 Year Flood) |
| When $D_x = 400$, $SR_x = \text{Int}[0.075(1001-39.8)] = 72$ | (40 Year Flood) |
| When $D_x = 500$, $SR_x = \text{Int}[0.075(1001-100)] = 68$ | (100 Year Flood) |
| When $D_x = 550$, $SR_x = \text{Int}[0.075(1001-158.5)] = 63$ | (159 Year Flood) |
| When $D_x = 600$, $SR_x = \text{Int}[0.075(1001-251.2)] = 56$ | (251 Year Flood) |
| When $D_x = 650$, $SR_x = \text{Int}[0.075(1001-398.1)] = 45$ | (398 Year Flood) |
| When $D_x = 700$, $SR_x = \text{Int}[0.075(1001-631)] = 28$ | (631 Year Flood) |
| When $D_x = 750$, $SR_x = \text{Int}[0.075(1001-1000)] = 0$ | (1000 Year Flood) |

FIG. 41d

| First Score Component | Min Variance Depth/Height | GE to BFE Variance Range | Flood Risk Zones | Exception Zones | Exception Rules | Second Score Component 1 | Second Score Component 2 |
|---|---|---|---|---|---|---|---|
| 800 | -3.0 | GEV < (-3.0) | A* and V* | AO/AH | Water Depth > 3.0 ft. | | If GE < Elev. Of Dam/Levee, add 25 |
| 700 | -1.6 | (-3.0) ≤ GEV < (-1.6) | A* and V* | AO/AH | 1.6 ft. ≤ Water Depth < 3.0 ft. | If V* zone, add 25 | If GE < Elev. Of Dam/Levee, add 25 |
| 600 | 0.0 | (-1.6) ≤ GEV < 0.0 | A* and V* | AO/AH | Water Depth < 1.6 ft.¹ | If V* zone, add 25 | If GE < Elev. Of Dam/Levee, add 25 |
| 500 | 0.0 | 0.0 ≤ GEV < 1.0 | Non-SFHA | | If GE < BFE, add bump to 600 ² | If V* zone, add 25 | If GE < Elev. Of Dam/Levee, add 25 |
| 400 | 1.0 | 1.0 ≤ GEV < 2.0 | Non-SFHA | | | If [...] to SFHA ≥ 100, but < 500 ft, add 75 | If GE < Elev. Of Dam/Levee, add 25 |
| 300 | 2.0 | 2.0 ≤ GEV < 3.6 | Non-SFHA | | | If [...] to SFHA ≥ 100, but < 500 ft, add 50 | If GE < Elev. Of Dam/Levee, add 25 |
| 200 | 3.6 | 3.6 ≤ GEV < 6.0 | Non-SFHA | | | If [...] to SFHA ≥ 500, but < 1000 ft, add 25 | If GE < Elev. Of Dam/Levee, add 25 |
| 100 | 6.0 | 6.0 ≤ GEV | Non-SFHA | | | | If GE < Elev. Of Dam/Levee, add 25 |
| N/A | xxx | xxx | D or None | No BFE | | | |

(GEV = Ground Elevation Variance)

¹ If GE > BFE, first score component may stay above 600 because it is in an SFHA.
² If GE > DFIRM BFE, WSE at the 100-yr boundary may be used and the same logic may be applied; if the GE > WSE, the exception rule may be applied.
² If LOMA applied to remove from SFHA, first score component may stay below 575 (i.e., may not be 600 or higher).

| First Score Component | Frequency Return Period in Years | Frequency Return Period Range in Years |
|---|---|---|
| 800 | 0 | < 25 |
| 700 | 25 | 25 ≤ to < 50 |
| 600 | 50 | 50 ≤ to < 100 |
| 500 | 100 | 100 ≤ to < 150 |
| 400 | 150 | 150 ≤ to < 250 |
| 300 | 250 | 250 ≤ to < 500 |
| 200 | 500 | 500 ≤ to < 1000 |
| 100 | 1000 | 1000 ≤ to n.... |
| N/A | xxx | xxx |

Legend:
| | |
|---|---|
| < | Less than |
| > | Greater than |
| ≤ | Less than or equal to |
| ≥ | Greater than or equal to |
| [...] | Distance |
| BFE | Base Flood Elevation |
| GE | Ground Elevation |
| N/A | Non applicable (no score applied) |
| n | Indeterminate number |
| WSE | Water Surface Elevation |
| Zone | A*: B, C, D, V*; X, X-500, None |
| *Zone | Zone classification (AE, A99, VE, etc.) |

FIG. 42a

Requirements and Business Rules

| Min Variance Depth/Height | Exception Rules | Second Score Component | Dam / Levee / Water Mgmt System | First Score Component |
|---|---|---|---|---|
| -3.0 | Water Depth > 3.0 ft. | If 'V' zone, add 25 | If GE < Dam/Levee[3], add 25 | 800 |
| -1.6 | 1.6 ft. ≤ Water Depth < 3.0 ft. | If 'V' zone, add 25 | If GE < Dam/Levee[3], add 25 | 700 |
| 0.0 | Water Depth < 1.6 ft. | If 'V' zone, add 25 | If GE < Dam/Levee[3], add 25 | 600 |
| 0.0 | If GE < BFE, add bump to 600 [2] | If [...] to SFHA < 100 ft., add 75 | If GE < Dam/Levee[3], add 25 | 500 |
| 1.0 | | If [...] to SFHA ≥ 100, but < 500 ft, add 50 | If GE < Dam/Levee[3], add 25 | 400 |
| 2.0 | | If [...] to SFHA ≥ 500, but < 1000 ft, add 25 | If GE < Dam/Levee[3], add 25 | 300 |
| 3.6 | | | If GE < Dam/Levee[3], add 25 | 200 |
| 6.0 | | | If GE < Dam/Levee[3], add 25 | 100 |
| xxx | No BFE | If None or D | | N/A |

[1] If GE > BFE, score may stay above 600, because it is in an SFHA.
If GE > DFIRM BFE, WSE at the 100-yr boundary may be used and the same logic may be applied;
if the GE > WSE, apply the exception rule.
[2] If LOMA applied to remove from SFHA, score may stay below 575 (i.e., may not be 600 or higher).
[3] Elevation of Dam/Levee A: Scenarios (including AO/AH)

| Min Variance Depth/Height | Exception Rules | Second Score Component | Dam / Levee / Water Mgmt System | Total Score |
|---|---|---|---|---|
| -3.0 800 | n/a | n/a 0 | No 0 | 800 |
| -3.0 800 | n/a | n/a 0 | Yes 25 | 825 |
| -1.6 700 | n/a | n/a 0 | No 0 | 700 |
| -1.6 700 | n/a | n/a 0 | Yes 25 | 725 |
| 0.0 600 | n/a | n/a 0 | No 0 | 600 |
| 0.0 600 | n/a | n/a 0 | Yes 25 | 625 |

V* Scenarios

| Min Variance Depth/Height | Exception Rules | Second Score Component | Dam / Levee / Water Mgmt System | Total Score |
|---|---|---|---|---|
| -3.0 / 800 | n/a | V* coastal / 25 | No / 0 | 825 |
| -3.0 / 800 | n/a | V* coastal / 25 | Yes / 25 | 850 |
| -1.6 / 700 | n/a | V* coastal / 25 | No / 0 | 725 |
| -1.6 / 700 | n/a | V* coastal / 25 | Yes / 25 | 750 |
| 0.0 / 600 | n/a | V* coastal / 25 | No / 0 | 625 |
| 0.0 / 600 | n/a | V* coastal / 25 | Yes / 25 | 650 |

X* (Non-SFHA) Scenarios (but not None or D)

| Min Variance Depth/Height | Exception Rules | Second Score Component | Dam / Levee / Water Mgmt System | Total Score |
|---|---|---|---|---|
| 0.0 / 500 | n/a | n/a / 0 | No / 0 | 500 |
| 0.0 / 500 | n/a | n/a / 0 | Yes / 25 | 525 |
| 0.0 / 500 | n/a | [...] to SFHA ≥ 500, but < 1000 ft. / 25 | No / 0 | 525 |
| 0.0 / 500 | n/a | [...] to SFHA ≥ 500, but < 1000 ft. / 25 | Yes / 25 | 550 |
| 0.0 / 500 | n/a | [...] to SFHA < 500 ft. / 50 | No / 0 | 550 |
| 0.0 / 500 | n/a | [...] to SFHA < 500 ft. / 50 | Yes / 25 | 575 |
| 0.0 / 600 | GE < BFE (no LOMA) | n/a / 0 | No / 0 | 600 |
| 0.0 / 600 | GE < BFE (no LOMA) | n/a / 0 | Yes / 25 | 625 |

| 4301 | 4303 | 4305 | 4307 | 4309 |
|---|---|---|---|---|
| 0.0 / 600 | GE < BFE (no LOMA) | [...] to SFHA ≥ 500, but < 1000 ft. / 25 | No / 0 | 625 |
| 0.0 / 600 | GE < BFE (no LOMA) | [...] to SFHA ≥ 500, but < 1000 ft. / 25 | Yes / 25 | 650 |
| 0.0 / 600 | GE < BFE (no LOMA) | [...] to SFHA < 500 ft. / 50 | No / 0 | 650 |
| 0.0 / 600 | GE < BFE (no LOMA) | [...] to SFHA < 500 ft. / 50 | Yes / 25 | 675 |
| 1.0 / 400 | n/a | n/a / 0 | No / 0 | 400 |
| 1.0 / 400 | n/a | n/a / 0 | Yes / 25 | 425 |
| 1.0 / 400 | n/a | [...] to SFHA ≥ 500, but < 1000 ft. / 25 | No / 0 | 425 |
| 1.0 / 400 | n/a | [...] to SFHA ≥ 500, but < 1000 ft. / 25 | Yes / 25 | 450 |
| 1.0 / 400 | n/a | [...] to SFHA < 500 ft. / 50 | No / 0 | 450 |
| 1.0 / 400 | n/a | [...] to SFHA < 500 ft. / 50 | Yes / 25 | 475 |
| 2.0 / 300 | n/a | n/a / 0 | No / 0 | 300 |
| 2.0 / 300 | n/a | n/a / 0 | Yes / 25 | 325 |
| 2.0 / 300 | n/a | [...] to SFHA ≥ 500, but < 1000 ft. / 25 | No / 0 | 325 |
| 2.0 / 300 | n/a | [...] to SFHA ≥ 500, but < 1000 ft. / 25 | Yes / 25 | 350 |
| 2.0 / 300 | n/a | [...] to SFHA < 500 ft. / 50 | No / 0 | 350 |
| 2.0 / 300 | n/a | [...] to SFHA < 500 ft. / 50 | Yes / 25 | 375 |
| 3.6 / 200 | n/a | n/a / 0 | No / 0 | 200 |
| 3.6 / 200 | n/a | n/a / 0 | Yes / 25 | 225 |

FIG. 43c

| 4301 | 4303 | 4305 | 4307 | 4309 |
|---|---|---|---|---|
| 3.6<br>200 | n/a | [...] to SFHA ≥ 500, but < 1000 ft.<br>25 | No<br>0 | 225 |
| 3.6<br>200 | n/a | [...] to SFHA ≥ 500, but < 1000 ft.<br>25 | Yes<br>25 | 250 |
| 3.6<br>200 | n/a | [...] to SFHA < 500 ft.<br>50 | No<br>0 | 250 |
| 3.6<br>200 | n/a | [...] to SFHA < 500 ft.<br>50 | Yes<br>25 | 275 |
| 6.0<br>100 | n/a | n/a<br>0 | No<br>0 | 100 |
| 6.0<br>100 | n/a | n/a<br>0 | Yes<br>25 | 125 |
| 6.0<br>100 | n/a | [...] to SFHA ≥ 500, but < 1000 ft.<br>25 | No<br>0 | 125 |
| 6.0<br>100 | n/a | [...] to SFHA ≥ 500, but < 1000 ft.<br>25 | Yes<br>25 | 150 |
| 6.0<br>100 | n/a | [...] to SFHA < 500 ft.<br>50 | No<br>0 | 150 |
| 6.0<br>100 | n/a | [...] to SFHA < 500 ft.<br>50 | Yes<br>25 | 175 |

FIG. 43d

| | First Score Component | Elevation Range | Targeted Frequency | Flood Risk Zones | Exception Zones |
|---|---|---|---|---|---|
| Row 1 | 800 | Ground Elev. < BFE - 3.0 ft. | Return Period < 25 Years | A* and V* | AO and AH |
| Row 2 | 700 | BFE - 3.0 ft. <= Ground Elev. < BFE - 1.6 ft. | 25 Year <= Return Period < 50 Years | A* and V* | AO and AH |
| Row 3 | 600 | BFE - 1.6 ft. <= Ground Elev. < BFE | 50 Year <= Return Period < 100 Years | A* and V* | AO and AH |
| Row 4 | 500 | BFE <= Ground Elev. < BFE + 1.0 | 100 Year <= Return Period < 150 Years | Others | |
| Row 5 | 400 | BFE + 1.0 ft. <= Ground Elev. < BFE + 2.0 | 150 Year <= Return Period < 250 Years | Others | |
| Row 6 | 300 | BFE + 2.0 ft. <= Ground Elev. < BFE + 3.6 | 250 Year <= Return Period < 500 Years | Others | |
| Row 7 | 200 | BFE + 3.6 ft. <= Ground Elev. < BFE + 6.0 | 500 Year <= Return Period < 1000 Years | Others | |
| Row 8 | 100 | Ground Elev. >= BFE + 6.0 | Return Period >= 1000 Years | | |
| Row 9 | None | | | | No Zone, No BFE |

BFE* - If Ground Elevation > DFIRM BFE, WSE at the 100 Year Boundary may be used and the same logic may be applied;
if the ground elevation > WSE, the exception rule may be applied.

| | Exception Rules | Exception Rules | Second Score Component 1 |
|---|---|---|---|
| Row 1 (cont.) | Water Depth > 3.0 ft. | | If it is V*, add 25 |
| Row 2 (cont.) | 1.6 ft. <= Water Depth < 3.0 ft. | | If it is V*, add 25 |
| Row 3 (cont.) | Water Depth < 1.6 ft. | If Ground Elev > BFE*, use 600 | If it is V*, add 25 |
| Row 4 (cont.) | If Ground Elev < BFE, add 50 | If it is a LOMA, use 500 | If distance to A or V < 1000 ft. add 25 |
| Row 5 (cont.) | | | If distance to A or V < 1000 - 2000 ft, add 25 |
| Row 6 (cont.) | | | |
| Row 7 (cont.) | | | |
| Row 8 (cont.) | | | |
| Row 9 (cont.) | | | |

| | Second Score Component 2 |
|---|---|
| Row 1 (cont.) | If Ground Elev. < Elevation of Dam or Levee, add 25 |
| Row 2 (cont.) | If Ground Elev. < Elevation of Dam or Levee, add 25 |
| Row 3 (cont.) | If Ground Elev. < Elevation of Dam or Levee, add 25 |
| Row 4 (cont.) | If Ground Elev. < Elevation of Dam or Levee, add 25 |
| Row 5 (cont.) | If Ground Elev. < Elevation of Dam or Levee, add 25 |
| Row 6 (cont.) | If Ground Elev. < Elevation of Dam or Levee, add 25 |
| Row 7 (cont.) | If Ground Elev. < Elevation of Dam or Levee, add 25 |
| Row 8 (cont.) | If Ground Elev. < Elevation of Dam or Levee, add 25 |
| Row 9 (cont.) | |

FIG. 44

Result

Property Address

Street: 123 Any Lane
City: Any City    State: Any State    Zip Code: 12345
GeoCode Info: GeoCode-Parcel Centroid (AP02)
Flood Risk Score: 500
View Map
View Resources    ROD view for Zip Code – Plus: 12345-1234

Research Information

IsHit: Yes

Flood Info

Community Name: Any County
Zone: C
Community #: 012345
Panel: 0123
Suffix: A

Census Info

State Code: 11
County Code: 099
Hit level: SEG

FIG. 47

| Distance | | Elevation | | Zone | |
|---|---|---|---|---|---|
| Feet To A/V zone | Risk Factor | Differential | Risk Factor | Zone | Risk Factor |
| 0 - 100 | 10 | Negative | 0 | X | 0.50 |
| 101 - 200 | 9 | 1 | 5 | X500 | 1.00 |
| 201 - 300 | 8 | 6 | 10 | A | 1.50 |
| 301 - 400 | 7 | 11 | 15 | V | 2.00 |
| 401 - 500 | 6 | 16 | 20 | D | 0.75 |
| 501 - 750 | 5 | 21 | 25 | | |
| 751 - 1000 | 4 | 26 | 30 | | |
| 1001 - 1250 | 3 | 31 Greater | 1 | | |
| 1251 - 1500 | 2 | | | | |
| 1501 + | 1 | | | | |

*FIG. 49*

| | Exposure | | | | | | |
|---|---|---|---|---|---|---|---|
| | Zone | Distance | Elevation Differential | Exposure Score | Exposure | % of Sub-Total | % of Total |
| Property 1 | A | 0 | 15 | 118.58 | High | 96.6% | 48.7% |
| Property 2 | V | 0 | 10 | 4.20 | High | 3.4% | 1.7% |
| | | | | 122.58 | | | |
| Property 3 | X500 | 150 | 3 | 62.29 | Significant | 51.7% | 25.6% |
| Property 4 | X | 500 | 2 | 12.67 | Significant | 10.5% | 5.2% |
| Property 5 | X | 100 | 20 | 11.48 | Significant | 9.5% | 4.7% |
| Property 6 | X | 1500 | 0 | 8.68 | Significant | 7.2% | 3.6% |
| Property 7 | X | 200 | 15 | 8.27 | Significant | 6.9% | 3.4% |
| Property 8 | X | 20 | 25 | 4.08 | Moderate | 3.4% | 1.7% |
| Property 9 | D | 400 | 10 | 6.02 | Moderate | 5.0% | 2.5% |
| Property 10 | X | 50 | 10 | 3.62 | Moderate | 3.0% | 1.5% |
| Property 11 | D | 700 | -2 | 1.20 | Low | 1.0% | 0.5% |
| Property 12 | D | 800 | 0 | 0.96 | Low | 0.8% | 0.4% |
| Property 13 | X | 600 | 20 | 0.48 | Low | 0.4% | 0.2% |
| Property 14 | D | 1500 | 5 | 0.32 | Low | 0.3% | 0.1% |
| Property 15 | C | 1500 | 25 | 0.21 | Low | 0.2% | 0.1% |
| Property 16 | D | 900 | 30 | 0.29 | Low | 0.2% | 0.1% |
| | | | | 120.55 | | | |
| | | | | 243.33 | | | |
| | | | | 15.21 | | | |

*FIG. 50*

Direction Assignment Block

| 32 | 64 | 128 |
|----|----|-----|
| 16 |    | 1   |
| 8  | 4  | 2   |

Flow Accumulation

| 1 | 1 | 2 | 4 |
|---|---|---|---|
| 1 | 3 | 5 | 8 |
| 1 | 1 | 1 | 3 |

Flow Direction Raster Data set

| 8 | 8 | 4 | 8 | 4 | 16 |
|---|---|---|---|---|----|
| 4 | 4 | 8 | 4 | 4 | 4  |
| 4 | 4 | 4 | 2 | 4 | 1  |
| 2 | 2 | 2 | 1 | 1 | 1  |
| 2 | 2 | 1 | 128 | 2 | 1 |
| 2 | 2 | 1 | 128 | 2 | 1 |

⇑

Elevation Raster Data Set

| 78 | 72 | 69 | 71 | 58 | 49 |
|----|----|----|----|----|----|
| 74 | 67 | 56 | 49 | 46 | 50 |
| 69 | 53 | 44 | 37 | 38 | 48 |
| 64 | 58 | 55 | 22 | 31 | 24 |
| 68 | 61 | 47 | 21 | 16 | 19 |
| 74 | 53 | 34 | 12 | 11 | 12 |

Flow Length Raster Data Set (example subset)

| 0 | 1   | 2   |
|---|-----|-----|
| 1 | 1.4 | 2.2 |
| 2 | 2.2 | 2.8 |

*FIG. 58a*

SYSTEMS AND METHODS FOR QUANTIFYING FLOOD RISK

CROSS REFERENCE TO RELATED APPLICATIONS

This application is a Continuation of and is based upon and claims the benefit of priority under 35 U.S.C. §120 for U.S. Ser. No. 12/027,096, filed Feb. 6, 2008, now U.S. Pat. No. 8,655,595 B1 which is a continuation-in-part application of U.S. patent application Ser. No. 11/974,911, filed Oct. 16, 2007, now U.S. Pat. No. 7,917,292 B1, and is related to and claims priority under 35 U.S.C. §119(e) to Provisional Application Ser. No. 60/899,904, filed Feb. 7, 2007 and Provisional Application Ser. No. 60/852,379, filed Oct. 17, 2006, the contents of which are hereby incorporated herein by reference.

BACKGROUND

1. Field of the Invention

The present invention relates generally to flood risk analysis and, more specifically, to quantifying flood risk.

2. Description of the Related Art

Worldwide, floods may be the number one cause of losses from natural events. Flood risk may be a function of flood hazards (e.g., hurricanes and/or damage to a levee or dam), property exposure to these hazards, and the damage vulnerability of properties during a flood. Comprehensive flood risk assessment and flood loss mitigation planning may need to address these three aspects. In addition, some flood planners may consider alternatives for coping with flood hazards including land-use planning, upstream watershed treatment, flood-proofing buildings, insurance and reinsurance measures, emergency evacuation, and building levees/dams and other structures.

In the United States, floods may account for significant property and business interruption losses affecting thousands of enterprises each year, which may cost more in property damages than other natural disasters. In 2005, the flooding from Hurricane Katrina alone caused over $40 billion in property damage, led to over 1600 deaths, and affected over 250,000 businesses according to the United States Census Bureau. Among federal, public, and private measures on flood loss mitigation, insurance and reinsurance may be a key factor in reducing the financial risk to individuals, enterprises and even whole societies. Mortgage companies, public sector (from the Federal Emergency Management Agency (FEMA) to municipalities), capital markets, insurance, and reinsurance companies may need knowledge about frequencies of floods, flood elevations, and frequencies of flood inundation losses at different property locations in order to underwrite sufficient and comprehensive policies for these properties.

Traditionally flood risk for both residential and commercial properties may have been determined by whether the properties were inside or outside FEMA Special Flood Hazard Areas (SFHAs) within the United States. Whether the property is inside or outside of an SFHA may have been the principle risk factor considered in determining whether to purchase flood insurance. Flood risks associated with properties within and beyond SFHAs may be different. In an SFHA, properties located near flood sources with lower elevations may have a higher flood risk than properties near SFHAs boundaries at a higher elevation. Repetitive loss may occur more often in properties at lower elevations because the flood frequencies at lower elevations may be much higher. Beyond the 100 yr flood zone, properties may also suffer flood damage. For example, based on FEMA records, historically about 25% of claims were from the outside of 100 yr flood zones.

In the United States, floods may account for significant property and business interruption losses affecting thousands of enterprises each year, which may cost more in property damages than other natural disasters. Among federal, public, and private measures on flood loss mitigation, insurance and reinsurance may be a key factor in reducing the financial risk to individuals, enterprises and even whole societies. Mortgage companies, public sector (from the Federal Emergency Management Agency (FEMA) to municipalities), capital markets, insurance, and reinsurance companies may need knowledge about flood risks at different property locations in order to, for example, underwrite sufficient and comprehensive policies for these properties.

SUMMARY

In various embodiments, a flood risk score may be determined for a property point that provides a comprehensive assessment of the property point's risk of flooding. Determining the flood risk score may include determining one or more flood risk characteristics for the property point and assigning a flood risk score that corresponds to the one or more flood risk characteristics. In some embodiments, flood risk characteristics may include a difference in elevation between the ground elevation (GE) of the property point and an elevation of a calculated point such as a calculated point on a known flood risk zone boundary, a boundary point on a known flood risk zone boundary (such as a FEMA SFHA) at an associated cross-section to its flood source (e.g., which may correspond to a base flood elevation (BFE), an interpolated BFE (e.g., using two surrounding BFEs), or a water surface elevation (WSE) on the known flood risk zone boundary at the cross-section). The difference in elevation between the GE of the property point and the elevation of the calculated point may indicate a risk that the property will experience flooding. Other points on other flood zone types may also be used as a flood risk characteristic. In some embodiments, a different calculated point may be used. In some embodiments, the calculated point may be determined by using a cross-section between the property point and the flood source (e.g., a cross section through the property point that is perpendicular to a flow direction of the flood source), using a radius search to find a point (e.g., a nearest point on the nearest known flood risk zone boundary), using a water drop method (e.g., to find a point on a hydrological path between the property point and a known flood risk zone boundary), or using a surface computation method.

Flood risk characteristics may also include a flood zone determination for the property point, a proximity of the property point to a known flood risk zone boundary, and/or a proximity of the property point to a flood source (such as a river centerline, river bank, or a coastal line). Other flood risk characteristics are also contemplated. For example, the flood risk characteristics may include proximity of the property point to a water control facility, potential for the property point to experience coastal surge flooding, or whether the property point is in a community within a given class of the National Flood Insurance Program's (NFIP) Community Rating System (CRS) (or other insurance or flood management programs). For example, NFIP communities that adhere to minimum NFIP requirements participate in the CRS and are at least considered Class 10 (no flood insurance premium discount). The more that a community exceeds the minimum requirements, the lower their class number may be and the higher their premium discounts. In some embodiments, historical statistics of weather conditions in targeted areas may also reflect flood risk characteristics (e.g., if a maximum 24 hour precipitation exceeds a certain threshold or a number of hurricane events occurring at the property point during a given period (for example, past 10 years) exceeds a certain threshold). Flood risk characteristics may also include a flood frequency determined for the property point.

In some embodiments, one or more flood risk characteristics may be used to assign a flood risk score. For example, a first flood risk characteristic and a second flood risk characteristic may be used to assign a first score component and a second score component, respectively, that may be summed together to form a flood risk score. Other numbers of components (e.g., for considering additional flood risk characteristics) are also contemplated. Other ways of combining the score components are also contemplated (e.g., the score components may be averaged together). In some embodiments, the first score component may include consideration of a flood zone determination for the property point and/or a difference in elevation between the GE of the property point and the GE of a calculated point such as a calculated point on a known flood risk zone boundary or a boundary point on the known flood risk zone boundary at the associated cross-section. This may include a WSE of the known flood risk zone boundary point at the cross-section to the flood source or a corresponding BFE (e.g., interpolated from two neighboring BFEs) of the point (on a known flood risk zone boundary) to the property point. In some embodiments, the second score component may include, for example, factors that account for proximity of the property point to a calculated point on a known flood risk zone boundary at the associated cross section, proximity to a flood source (such as a river centerline), proximity to a water control facility (e.g., a levee, dam, or a pumping station), potential for the property point to experience coastal surge flooding, whether the property point is in a community within a given class of the NFIP CRS or a flood management program, or the community's status in a flood insurance program. In some embodiments, the second score component may be determined using historical weather information (e.g., determining if a maximum 24 hour precipitation for the property exceeds a certain threshold or if a number of hurricane events occurring at the property point during a given period (e.g., past 10 years) exceeds certain thresholds). In some embodiments, these factors may be assigned based on the degree of increase or decrease of flood risk to the property point as a result of these flood risk characteristics.

In some embodiments, flood risk scores may be provided on flood risk score reports. Flood risk score reports may be made available through a web page using an Extensible Mark-up Language (XML) interface, a portable document format (PDF) file, a web service through XML, e-mail, or e-mail of a file (e.g., a PDF or comma-delimited file), File Transfer Protocol (FTP) or Web-based Distributed Authoring and Versioning (WebDAV). Inputs may also be received through a web-interface and/or e-mail. Other methods of receiving input and sending reports are also contemplated. In various embodiments, flood risk score reports and/or flood risk scores may be delivered in singles or in batches.

In various embodiments, statistically determined points (which may be verifiably discrete) from geospatial flood risk zoning maps (e.g., adopted by communities that participate in the National Flood Insurance Program) may be used in generating a flood frequency versus flood depth (elevation) curve for reducing the uncertainty in flood risk assessment (e.g., for insurance companies calculating policy premiums).

In some embodiments, geospatial line features (e.g., flood elevation lines) for flood elevations at different flood frequency levels may be defined and created based on elevation datasets (e.g., elevation maps) and flood risk zoning maps from hydrologic and hydraulic (HH) models and field surveys. In some embodiments, hydraulic analysis, utilizing modeling software such as Hydrologic Engineering Centers River Analysis System (HEC-RAS) environmental simulation modeling, may be performed in areas (such as communities and counties) that have previously not been modeled (e.g., that FEMA has not performed a hydrologic and hydraulic study to determine 1% or 0.2% annual chance flood polygons). This additional modeling may assist in providing more coverage of probabilistic flood polygons (e.g., nation-wide coverage). In some embodiments, the elevation datasets and flood zoning maps may be digital. In some embodiments, a manual method may be used to overlay the flood zoning map with the elevation datasets and flood elevation lines may be determined and/or digitized for flood elevations based on hydraulic principles. In some embodiments, a river centerline or coastal line may be used to guide determination of flood elevation lines (e.g., a substantially perpendicular line to flood source line features). In some embodiments, pre-determined flood elevation lines (e.g., base flood elevation lines) may be extended to form additional flood elevation lines to other flood frequency boundaries. In some embodiments, slopes of new flood elevation lines may be determined based on slopes of the pre-determined flood elevation lines. In various embodiments, flood elevation lines may thus be extrapolated between or near existing flood elevation lines.

In some embodiments, the WSEs on a flood risk zone boundary at the associated cross-section or flood elevation lines may be used to calculate flood frequency versus flood depth curves, flood frequency versus damage curves, and flood risk ratings. In some embodiments, these may be derived for a specific property, a geocoded point location, or a point of interest (POI). For example, base flood risk ratings may be derived from the computed flood frequency versus depth (elevation) curve. As another example, flood risk adjustments (risk load) may be made to the base flood risk rating for flood related hazards (e.g., hurricanes, landslides, tsunamis, flash flooding, damage to a levee, or damage to a dam).

In some embodiments, a flow path method (e.g., a "water drop" method) may be used for determining and/or validating correct flood zone boundary points that are used in WSE determination. For example, in some sections of a river system, a flow path method may be used to select flood zone boundaries related to targeted property points. In some embodiments, the flow path method may select flood zone boundaries on the property side of flood sources.

In various embodiments, a flood frequency versus flood elevation curve for a property point may be derived using points of flood elevation for corresponding flood frequency derived from flood maps (e.g., geospatial flood risk zoning maps). The points may be statistically determined points that are verifiably discrete. The derived flood frequency versus flood elevation curves may be used to reduce the uncertainty in flood risk assessment (e.g., for insurance companies calculating policy premiums).

In some embodiments, points may be generated using geospatial point/line/polygon/surface features (e.g., flood elevation lines) for flood elevations at different flood frequency levels. The geospatial point/line/polygon/surface features may be defined and created based on elevation datasets (e.g., digital elevation maps) and flood maps. The geospatial point/line/polygon/surface features may be created/redefined in locations where there previously were inconsistencies between the elevation datasets and the flood maps that were generated, for example, from computer models and field surveys. In some embodiments, the elevation datasets and flood maps may be digital. In some embodiments, a manual method may be used to overlay the flood map with the elevation datasets (e.g., an elevation map) and flood elevation lines may be determined and/or digitized for flood elevations (e.g., determined using hydraulic modeling). In some embodiments, a flood source line feature (e.g., a waterway centerline or a coastal line) may be used to determine flood elevation lines. In some embodiments, pre-existing flood elevation lines (e.g., base flood elevation lines) may be extended to form additional flood elevation lines (e.g., for other flood frequency boundaries). In some embodiments, slopes of new flood elevation lines may be determined based on slopes of other flood elevation lines. In various embodiments, flood elevation lines may thus be created for points between or near existing flood elevation lines.

In various embodiments, flood elevation lines and/or flood boundaries (e.g., pre-existing or derived) may be adjusted to improve the accuracy of the derived points. For example, flood elevation lines may be adjusted on top of digital elevation maps to correlate the endpoints of the flood elevation line with points on the digital elevation map with similar elevations as the elevation associated with the flood elevation line. In some embodiments, this may include overlaying the maps to adjust for any inconsistencies. In some embodiments, other points on the flood elevation lines and/or other points on the flood map may be adjusted using the digital elevation map. In some embodiments, flood boundaries may also be corrected (e.g., by using the endpoints of corrected flood elevation lines).

In some embodiments, the flood elevation lines (e.g., pre-existing and/or derived) and flood boundary lines may be used to calculate flood frequency versus flood elevation curves, flood frequency versus damage curves, and flood risk ratings. In some embodiments, these curves and flood risk ratings may be derived for a specific property, a geocoded point location, or a point of interest (POI). For example, base flood risk ratings may be derived from the computed flood frequency versus flood elevation curve. As another example, flood risk adjustments (risk load) may be made to the base flood risk rating for flood related hazards (e.g., hurricanes, landslides, tsunamis, flash flooding, damage to a levee, or damage to a dam).

In some embodiments, a limited number of statistically and geospatially known flood elevations (such as 100-year and 500-year flood elevations) that may have been verified by detailed hydrologic and hydraulic (HH) studies may be used to predict and extrapolate unknown flood elevations by using accurate digital elevation data, hydrologic methods, and GIS (Geographic Information System) technology at any given geospatial location in a flood risk area.

In some embodiments, FEMA's Flood Insurance Rate Maps may have 100-year flood elevation lines printed on them for some areas. In some embodiments, FEMA maps may have the 500-year flood boundary printed on them for some areas, but may not have 500-year flood elevation lines printed on them. In some embodiments, the 100-year and/or 500-year flood elevation lines may be determined or provided from other flood map sources (e.g., a FEMA Flood Insurance Study (FIS)).

In some embodiments, a property point for analysis may be provided by a user. The property point may correspond to an address, a geocoded point, a point of interest, a building on a property, etc. In some embodiments, the property point may include the address of a targeted portfolio from a mortgage company, public sector entity (e.g., FEMA, municipalities, states, etc.), capital market entity, insurance company, or reinsurance company. The property point may be geocoded by the system. For example, an x,y coordinate (such as a latitude/longitude) may be determined for the property point. In some embodiments, the 100-year base flood elevation and the 500-year flood elevation may be determined for the property point. In some embodiments, a WSE on the 100 year flood boundary and/or 500 year boundary at the cross-section may be determined for the property point. A determination may be made as to whether the property point is within a 100-year flood zone, a 500-year flood zone, or neither. If the property point is within the 100-year flood zone and/or the 500-year flood zone, the 100-year and 500-year flood elevation lines and the associated WSEs for the property point may be determined. In some embodiments, if flood risk zone boundaries exist, associated WSEs may be determined. If the 100-year base flood elevation lines exist near the property point, the 100-year base flood elevation for the point may be interpolated from the existing 100-year base flood elevation lines (e.g., from two adjacent 100-year base flood elevation lines). If the 100-year base flood elevation lines are not provided near the point, the 100-year base flood elevation lines may be created near the point and the 100-year base flood elevation line for the point may be interpolated. If the 500-year flood elevation lines exist near the property point, the 500-year flood elevation for the point may be interpolated from the existing 500-year flood elevation lines. If the 500-year flood elevation lines are not provided near the point, the 500-year flood elevation lines may be created near the point and the 500-year flood elevation line for the point may be interpolated. If the property point is outside the 100-year and 500-year flood elevation lines, the 100-year and 500-year flood elevation lines may be determined for the point using various methods.

The flood frequency versus elevation curve may then be determined at the property point. Using the 100-year and 500-year flood elevation points, a distribution may be calculated which may provide the flood elevations at other flood frequencies (e.g., 10 year, 50 year, 1000 year, etc.). A flood frequency versus flood loss relationship may be determined for the property point using the flood frequency versus flood elevation curve, flood depth versus flood loss relationship (vulnerability curve) and additional property data (e.g., provided by the user about the property point). The information may be used to provide a flood risk assessment report to the user.

BRIEF DESCRIPTION OF THE DRAWINGS

A better understanding of the present invention may be obtained when the following detailed description is considered in conjunction with the following drawings, in which:

FIGS. 8a-b illustrates an embodiment of a map and chart used to determine missing flood elevation lines using gage station data.

FIGS. 17a-d illustrates various flood data charts used in calculating a flood frequency versus damage curve, according to an embodiment.

FIG. 18b illustrates an embodiment of a chart calculating an average annual loss.

FIG. 19 illustrates a chart of risk scores, according to an embodiment.

FIG. 29 illustrates an embodiment of a method for forming a flood elevation line for a point between two pre-existing flood elevation lines.

FIG. 30 illustrates an embodiment of a method for forming a flood elevation line for a point using two pre-existing flood elevation lines.

FIG. 32 illustrates an embodiment of a web-based method for providing a flood risk assessment for a point.

FIG. 37c illustrates a cross section data chart, according to an embodiment.

FIG. 38a illustrates an embodiment of a plot of N-segment discrete hydrological data series.

FIG. 38b illustrates an embodiment of sorted gage station data for use in determining the N-segment discrete hydrological data series.

FIG. 39 illustrates a flowchart of a method for assigning a flood risk score, according to an embodiment.

FIGS. 41a-e illustrates equations and identifiers for calculating a flood risk score, according to an embodiment.

FIGS. 42a-b illustrates embodiments of flood risk score assignment charts.

FIGS. 43a-d illustrates embodiments of flood risk score assignment charts.

FIG. 44 illustrates embodiments of flood risk score assignment charts.

FIGS. 46-48 illustrate a flood risk score report, according to an embodiment.

FIG. 49 illustrates a flood risk factor chart, according to an embodiment.

FIG. 50 illustrates flood risk scores for a batch of properties, according to an embodiment.

FIGS. 58a-b illustrates example rasters used in the water drop method, according to an embodiment.

Figure 1:
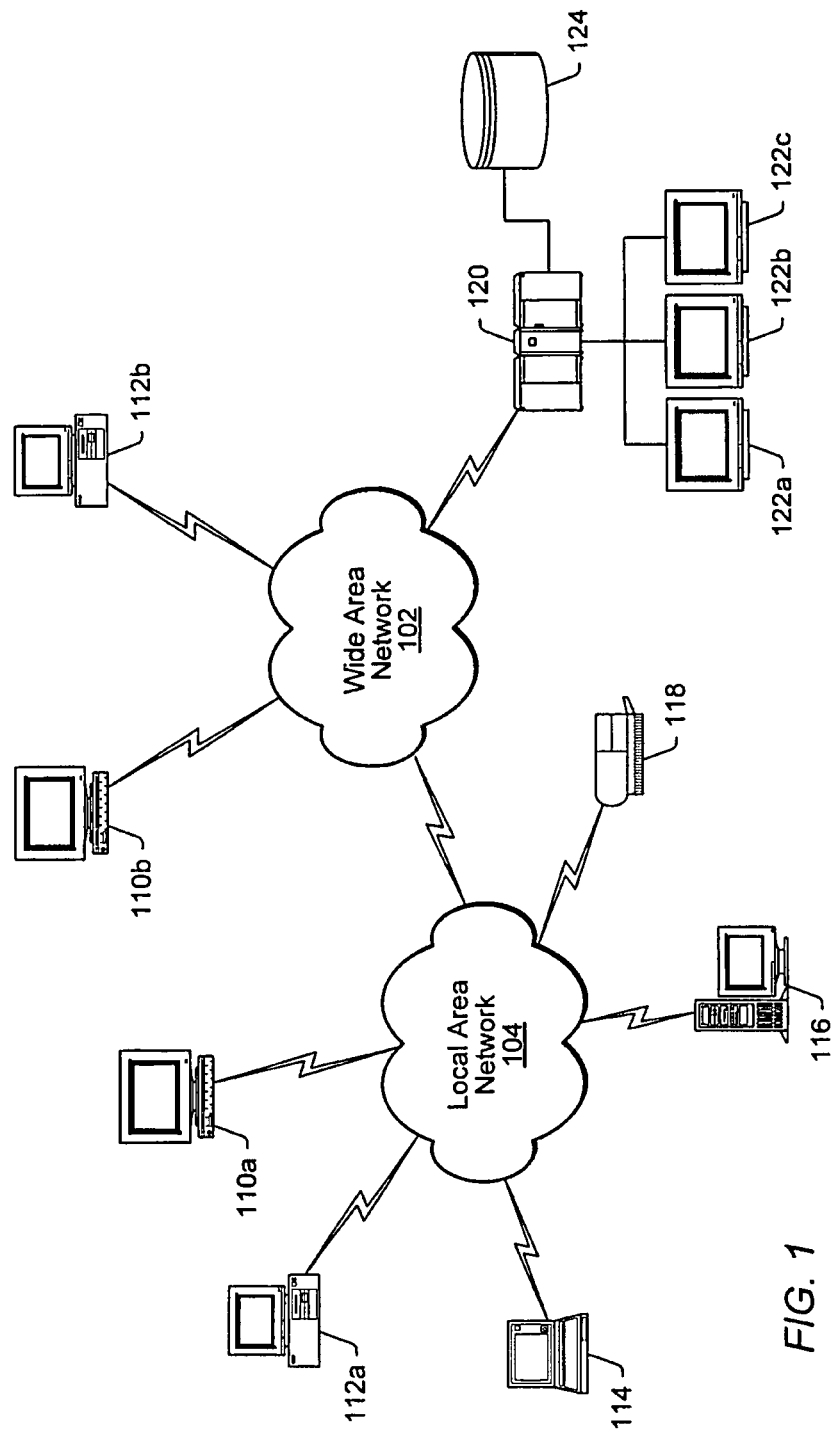
FIG. 1 illustrates an embodiment of a wide area network (WAN) and a local area network (LAN).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

FIG. 1 illustrates an embodiment of a WAN 102 and a LAN 104. WAN 102 may be a network that spans a relatively large geographical area. The Internet is an example of a WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 may be coupled to WAN 102. LAN 104 may be a network that spans a relatively small area. Typically, LAN 104 may be confined to a single building or group of buildings. Each node (i.e., individual computer system or device) on LAN 104 may have its own Central Processing Unit (CPU) with which it may execute programs. Each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices. For example, LAN 104 may include one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104. For example, workstation 110b and personal computer 112b may be connected to WAN 102. For example, WAN 102 may include computer systems that may be geographically remote and connected to each other through the Internet.

Figure 2:
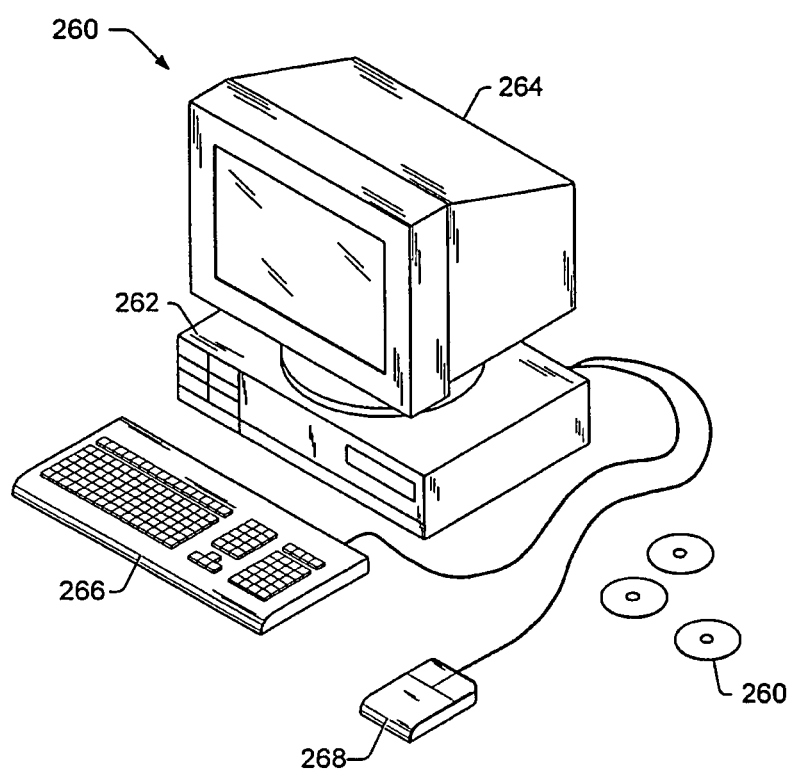
FIG. 2 illustrates an embodiment of computer system that may be suitable for implementing various embodiments of a system and method for quantifying flood risk.

FIG. 2 illustrates an embodiment of computer system 250 that may be suitable for implementing various embodiments of a system and method for quantifying flood risk. Each computer system 250 typically includes components such as CPU 252 with an associated memory medium such as Compact Disc Read-Only Memories (CD-ROMs) 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for quantifying flood risk.

Computer system 250 may include a memory medium on which computer programs according to various embodiments may be stored. The term "memory medium" is intended to include an installation medium, e.g., floppy disks or Compact Disc Read Only Memories (CD-ROMs) 260, a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for quantifying flood risk. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

In various embodiments, a flood risk score may be determined for a property point (e.g., a specific coordinate location, a parcel, an address, etc.) that provides a comprehensive assessment of the property point's risk of flooding. As used herein, "property point" may refer to an entire property (e.g., designated by an address), a geocoded point location defined using geospatial coordinates (e.g., a latitude and a longitude), a georeferenced point (e.g., referenced to a coordinate system and/or specific coordinate locations on a property), different latitude/longitude coordinate locations corresponding to specific points on a property, a specific building on the property, etc. Other property point types (e.g., other points of interest (POI)) are also contemplated. Determining the flood risk score may include determining one or more flood risk characteristics for the property point and assigning a flood risk score that corresponds to the one or more flood risk characteristics. In some embodiments, flood risk characteristics may include a difference in elevation between the ground elevation (GE) of the property point and an elevation of a calculated point such as a calculated point on a known flood risk zone boundary (e.g., a FEMA SFHA), a boundary point on a known flood risk zone boundary at an associated cross-section (e.g., cross section 4013 in FIG. 40) to its flood source (e.g., which may correspond to a base flood elevation (BFE), an interpolated BFE (e.g., using two surrounding BFEs), or a water surface elevation (WSE) on the known flood risk zone boundary at the cross-section). In some embodiments, "cross-section" (e.g., cross section 4013) refers to a plane (e.g., a vertical plane) through a flood source (e.g., a river) that may be at a right angle to the flood source flow direction. In some embodiments, "cross-section" may be used to reference a cross-section at the targeted property point. In some embodiments, BFEs/WSEs as calculated, for example, in FIGS. 7, 8a, and 10-16, for or near the property point may be used to determine the elevation difference between the GE of the property point and the associated BFE/WSE (which may be nearest BFE/WFE). In some embodiments, WSE may be estimated by using a nearest point on a known flood risk zone boundary with some additional validations (such as ground slope). While some examples throughout this description refer to, for example, a "nearest point", "nearest known flood risk zone boundary", and a "nearest SFHA", it is to be understood that a different point may be used (e.g., the second nearest point, the second nearest SFHA, a point on a non-SFHA, etc.). In some embodiments, a cross-section (e.g., see FIG. 40), a radius search method, a water drop method (e.g., see FIGS. 57-59), and/or a surface method (e.g., see FIGS. 55-56) may be used to determine the associated BFE or WSE (e.g., of the calculated point hydrologically and hydraulically associated with the property point). The difference in elevation between the GE of the property point and the elevation of the calculated point may indicate a risk that the property point will experience flooding. In some embodiments, the "flood risk score" may be referred to by a different name (e.g., a "flood risk assessment", "flood risk classification", etc.).

Flood risk characteristics may also include a flood zone determination for the property point and/or a proximity of the property point to a known flood risk zone boundary (e.g., the nearest SFHA) or to a flood source (such as a river centerline, coastline, or large water body). Other flood risk characteristics are also contemplated. For example, the flood risk characteristics may include proximity of the property point to a water control facility (e.g., a levee, dam, or pumping station), potential for the property point to experience coastal surge flooding, or whether the property point is in a community within a given class of the NFIP CRS or another insurance or flood management program. Participation in the CRS program may indicate that the property point is in a community that performs flood plain management to mitigate flood risks (these projects may lower the flood risk faced by properties in the community in return for lower insurance rates through NFIP). An additional flood risk characteristic may include the community's status in a flood insurance program. For example, if the property point is in a community that has been suspended in a flood insurance program, this may indicate an increase in flood risk (e.g., the community may have been suspended for failing to take certain flood prevention precautions). Flood risk characteristics may also include a flood frequency determined for the property point.

In some embodiments, the information on a Letter of Map Amendment (LOMA), Letter of Map Revision (LOMR), and/or an elevation certification for the property point may be considered in developing the flood risk score. In some embodiments, flood risk characteristics may take into account alluvial fan flooding. In some embodiments, a flood elevation surface (e.g., a nation-wide flood elevation surface) may be created using an elevation surface (e.g., through a Triangulated Irregular Network (TIN) method) based on flood elevation line features (such as BFEs) (e.g., nation-wide flood elevation line features) and/or flood boundaries (such as SFHA boundaries). In some embodiments, an elevation variance dataset (e.g., a nation-wide elevation variance dataset) may be created by subtracting the respective property point ground elevation values from the national flood elevation surface (e.g., from SFHAs). In some embodiments, ground elevation values may be derived from a digital elevation model (DEM) (e.g., a national DEM). The elevation variances may be used to derive flood risk scores. In some embodiments, a nation wide elevation variance data set (or smaller/larger elevation variance data set) may be created to reduce real-time computation time when a flood risk score request is received for a property point.

In some embodiments, one or more flood risk characteristics may be used to assign a flood risk score. For example, a first flood risk characteristic and a second flood risk characteristic may be used to assign a first score component and a second score component, respectively, that may be summed together to form a flood risk score. Other numbers of components (e.g., for considering additional flood risk characteristics) are also contemplated. Other ways of combining the score components are also contemplated (e.g., the score components may be averaged together). In some embodiments, the first score component may include consideration of a difference in elevation between the GE of the property point and the elevation of a calculated point such as a calculated point on a known flood risk zone boundary or a point on the known flood risk zone boundary at the associated cross-section 4013. This may include a corresponding WSE or a corresponding BFE (e.g., interpolated from two neighboring BFEs) to the property point. In some embodiments, the first score component may include consideration of a flood zone determination for the property point. In some embodiments, the flood zone determination (and/or other flood risk characteristics) may be used as a control parameter to define the range of flood risk scores. For example, if a property point is in a SFHA, the flood risk score for the property point may be selected between 600 to 900. If a property point is outside of a SFHA, the flood risk score for the property point may be selected between 100 to 600. As another example, if the property is in a 500 year flood zone, the flood risk score for the property point may be selected between 300-600 (other ranges are also contemplated). In some embodiments, D and X zones may also receive flood risk score considerations based on the zone type. Other zone considerations and other flood risk score ranges are also contemplated. In various embodiments, certain ranges of flood risk scores may be applicable to certain flood zone determinations (while other ranges may be used for other flood zone determinations).

In some embodiments, the second score component may include, for example, factors that account for proximity of the property point to a known flood risk zone boundary (e.g., a nearest known flood risk zone boundary), proximity of the property point to a flood source (e.g., river centerline, river bank, coastline, or large water body), proximity to a water control facility (e.g., a levee, dam, or a pumping station), potential for the property point to experience coastal surge flooding (e.g., based on a history of coastal surge flooding at the property), or whether the property point is in a community within a given class of the NFIP CRS (or, for example, another flood insurance program or a flood management program). In some embodiments, the second score component may be determined using historical weather information (e.g., determining if a maximum 24 hour precipitation for the property exceeds a certain threshold or if a number of hurricane events occurring at the property point during a given period (e.g., past 10 years) exceeds certain thresholds). In some embodiments, these factors may reflect the degree of increase or decrease of flood risk to the property point as a result of these flood risk characteristics. For example, the flood risk score may reflect a higher degree of risk for a property point near a dam (and/or, for example, downstream from the dam) than a similar property point that is not near a dam (and/or, for example, upstream from the dam). In some embodiments, the location of the property point near a dam may be weighted more than, for example, the property point's inclusion in a community that participates in a CRS. While several flood risk characteristics may be listed herein for "first score components" and other flood risk characteristics listed for "second score components", it is to be understood that flood risk characteristics listed for "first score components" may be considered as "second score components" and/or flood risk characteristics listed for "second score components" may be considered as "first score components". Other designations are also contemplated.

In some embodiments, a consistent national scheme may be developed for flood risk scores (based on various flood risk characteristics). For example, a nation-wide flood risk zoning map (which may be seamless), a national digital elevation dataset, a national hydrologic dataset (NHD), and other nation-wide datasets analyzed to determine flood risk characteristics may be used to develop standardized flood risk scores. Flood risk assessments may then provide a more detailed flood risk classification (e.g., using a score of 100-900) (other flood risk score ranges are also contemplated). Other non-national datasets/coverage may be used (e.g., county-wide, state-wide, etc.).

In some embodiments, the flood risk score (and, for example, the first score component and the second score component) may be numerical. In some embodiments, "quantifying" the flood risk may include using a letter or alphanumeric flood risk score. For example, a label of "A", "B", or "C" may be used to designate a flood risk score in place of or in addition to a numeric flood risk score. Other flood risk score types are also contemplated. For example, the flood risk score may be derived from a percent chance that a given property point will experience a flood in a given year. The flood risk score may also be modeled based on a return flood period (e.g., property may flood once every 78 years). In some embodiments, the flood risk score may be provided as a range of these values (e.g., as a range of percent chances or a range of return flood periods). In some embodiments, interests such as primary carriers (residential and commercial), brokers, re-insurers in the insurance industry, capital markets, commercial and residential lenders, risk solution value added resellers, corporate risk managers, and management consulting firms may request flood risk scores for one or more property points in the scope of their business.

In various embodiments, a flood frequency versus flood elevation (flood depth) curve may be computed for a property point (e.g., in a flood risk area) for use in determining one or more flood risk characteristics for the property point. In some embodiments, the flood frequency versus flood elevation curves may be determined for several property points in a portfolio. While FEMA is suggested as a possible source of flood maps herein, it is to be understood that the methods described herein may be used for property points worldwide (e.g., not constrained to the United States). For example, other flood map sources may be used to assist in analyzing property points located outside the United States. The flood frequency may refer to a flood level that has a specified percent chance of being equaled or exceeded in a given year. For example, a 100-year flood may occur on average once every 100 years and thus may have a 1-percent chance of occurring in a given year. In some embodiments, the flood frequency may be in decimal format (e.g., 0.01 for the 100 year flood (0.01=1/100 years) or a maximum flood event occurring statistically once every 100 years, 0.002 for the 500 year flood (0.002=1/500 years) or a maximum flood event occurring statistically once every 500 years). In some embodiments, exceedance probability may be used instead of or in addition to flood frequency. Exceedance probability may refer to a probability of a value exceeding a specified magnitude in a given time period. For example, the data on a flood frequency curve may also be plotted as an exceedance probability curve. Other flood frequencies and flood frequency formats are also contemplated. Flood elevation may indicate an elevation of the surface of flood waters during the corresponding flood event. For example, if the flood water surface rises to an elevation of 180 m (e.g., above sea level) at a property point during a flood event occurring statistically once every 100 years, the 100 year flood elevation for the property point may be 180 m. Other flood elevation formats are also contemplated (e.g., the flood elevation may be represented as a flood depth of the flood waters above the ground surface (e.g., 10 feet above the ground surface), etc.).

Initial flood datasets may be provided by several sources. For example, datasets may be provided from flood maps such as digital flood zoning maps (for example, Digital Flood Insurance Rate Maps (DFIRM) (e.g., from the Federal Emergency Management Agency (FEMA)). Flood maps may include flood risk zoning maps adopted by communities that participate in the National Flood Insurance Program. Other flood maps are also contemplated. Flood maps may be stored in geospatial databases. Other sources of initial flood map datasets are also contemplated (e.g., datasets may originate from flood elevation lines or from flood elevation raster images). Additional data may be derived from 1-10 m Digital Elevation datasets ("1-10 m" may indicate a resolution of the maps), USGS (United States Geological Survey) gage station records, and flood source features from USGS National Hydrologic Datasets. Other resolution (e.g., higher resolution) digital elevation datasets are also contemplated. These initial datasets may only provide a single point at a flood frequency versus flood elevation curve for a given geographic location (e.g., a given property point) in a flood risk area (e.g., the 100-year base flood elevation). For example, these datasets may provide the flood elevation line for a 100-year (and/or 500-year) flood (100-year and 500-year refer to flood frequency) for a set of points. In some embodiments, the flood frequency versus flood elevation curve may be computed for geospatial points (e.g., property points) based on, for example, two statistically determined discrete points (such as 100-year and 500-year flood elevations) derived from a flood map (e.g., a digital flood risk boundary map), flood elevation lines for flood elevations, and digital elevation data. In some embodiments, the two points may not be statistically determined discrete points. Based on these determined points, flood frequency versus damage curves may be calculated to assist in flood risk assessment (e.g., to assist in insurance premium determinations for a property point). In some embodiments, prior to calculating the two points, missing data (e.g., missing flood elevation lines and/or flood boundaries) may be computed (e.g., using the methods described herein). In some embodiments, existing or derived flood elevation lines and/or flood boundaries may also be corrected (e.g., using the methods described herein).

In various embodiments, a flood frequency versus elevation (flood depth) curve may be computed for a property, a geocoded point location (e.g., using geospatial coordinates, such as a latitude and a longitude), or points of interest (POI) in a flood risk area. Initial flood datasets may be provided by several sources. For example, datasets may be provided from digital flood zoning maps such as a Digital Flood Insurance Rate Maps (DFIRM) (e.g., from the Federal Emergency Management Agency (FEMA)). These may be stored in geospatial databases. Other sources of initial datasets are also contemplated (e.g., datasets may originate from flood elevation lines or from flood elevation raster images). Additional data may be derived on the order of centimeters or meters. For example, in one embodiments, Digital Elevation datasets of 10 m ("10 m" may indicate an accuracy of the maps) and USGS (United States Geological Survey) gage station records may be used. Other accuracies are also contemplated (e.g., on the order of millimeters). These initial datasets may only provide a single point at an exceedance probability versus flood elevation curve for a given geographic location in a flood risk area (e.g., the 100-year base flood elevation). For example, these datasets may provide the flood elevation line for a 100-year (and/or 500-year) flood (100-year and 500-year refer to flood frequency) for a set of points. In some embodiments, the flood frequency versus flood depth (elevation) curve may be computed for geospatial points based on, for example, two statistically determined discrete points (such as 100-year and 500-year flood elevations) derived from digital flood risk boundary map, flood elevation lines for flood elevations, and digital elevation data. Based on these determined points, flood frequency versus damage curves may be calculated to assist in flood risk assessment (e.g., to assist in insurance premium determinations for a property).

Figure 3:
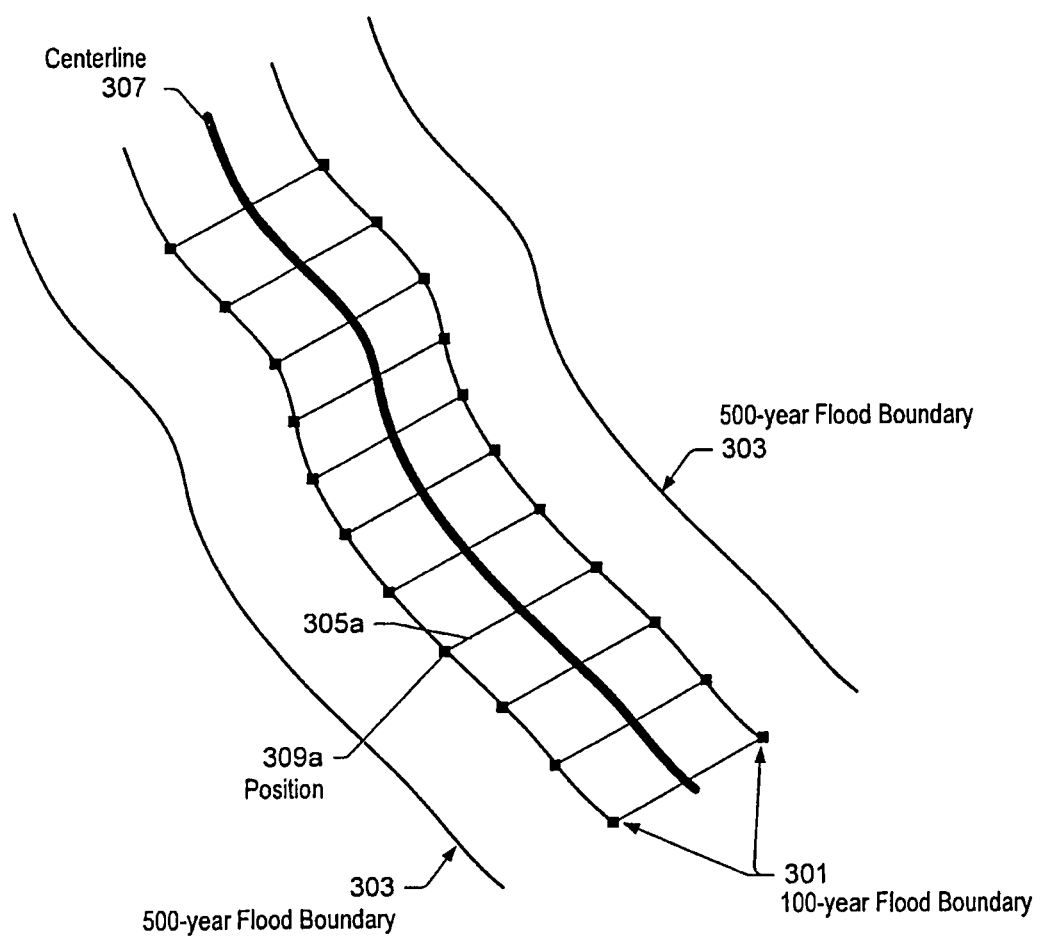
FIG. 3 illustrates an embodiment of an example flood map.
Figure 4A:
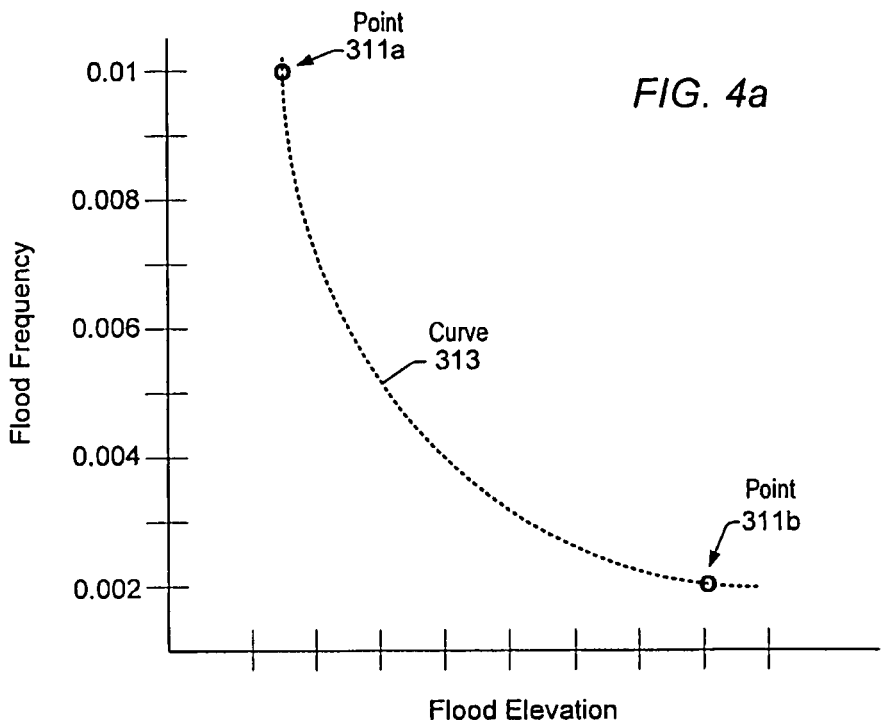
FIGS. 4a-b illustrates embodiments of a plot for a flood elevation point on the example map.
Figure 4B:
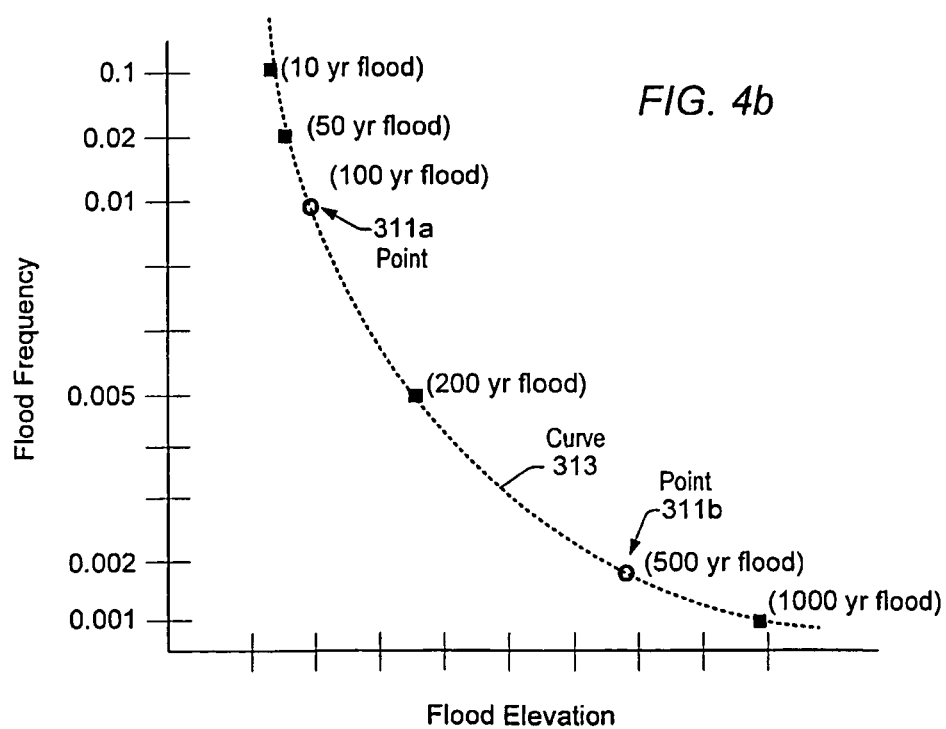

FIGS. 3, 4a, and 4b illustrate an embodiment of an example flood map and plotted curves of a flood elevation versus flood frequency points on the example flood map. As seen in FIG. 3, flood elevation lines 305 (e.g., base flood elevation (BFE) line 305a) maybe provided for a position (e.g., position 309a corresponding to a property point) on the 100-year flood boundary 301 from a flood source line feature (for example, a waterway centerline 307 (e.g., a river centerline)). For example, plot point 311a (see FIGS. 4a-b) may represent the flood elevation for position 309a for the 0.01 flood frequency (100-year flood frequency). To build a curve for flood frequency versus flood elevation for a position (e.g., position 309a), a second point 311b (e.g., for the 0.002 flood frequency (at the 500-year flood boundary 303)) on the curve 313 may be needed (several embodiments for determining the first point 311a and/or second point 311b are described herein). For example, if second point 311b is known or calculated, the curve 313 for flood frequency versus flood elevation may be calculated, using a curve fitting algorithm, for position 309a that may show other flood frequency versus flood elevations for position 309a (several embodiments for calculating the curve 313 are also described herein). FIG. 4b also shows other points on the flood frequency versus flood elevation curve 313 (with modified axis to show additional flood frequencies versus flood elevations).

As defined by the National Flood Insurance Program (NFIP), base flood elevation (BFE) is "the elevation shown on the Flood Insurance Rate Map for Zones AE, AH, A1-A30 . . . V1-V30 and VE that indicates the water surface elevation resulting from a flood that has a one percent chance of equaling or exceeding that level in any given year." The BFE is the elevation of the water projected to occur in association with the base flood, which by definition is a "flood having a one percent chance of being equaled or exceeded in any given year" see 44 C.F.R. 59.1. As used herein "flood elevations" and "flood elevation lines" are used to refer to the elevation of floods and lines representing these elevations for various flood frequencies (e.g., 500-year flood). "Flood elevation line" for the 100-year flood frequency may be used interchangeably with the term "BFE".

Figure 5:
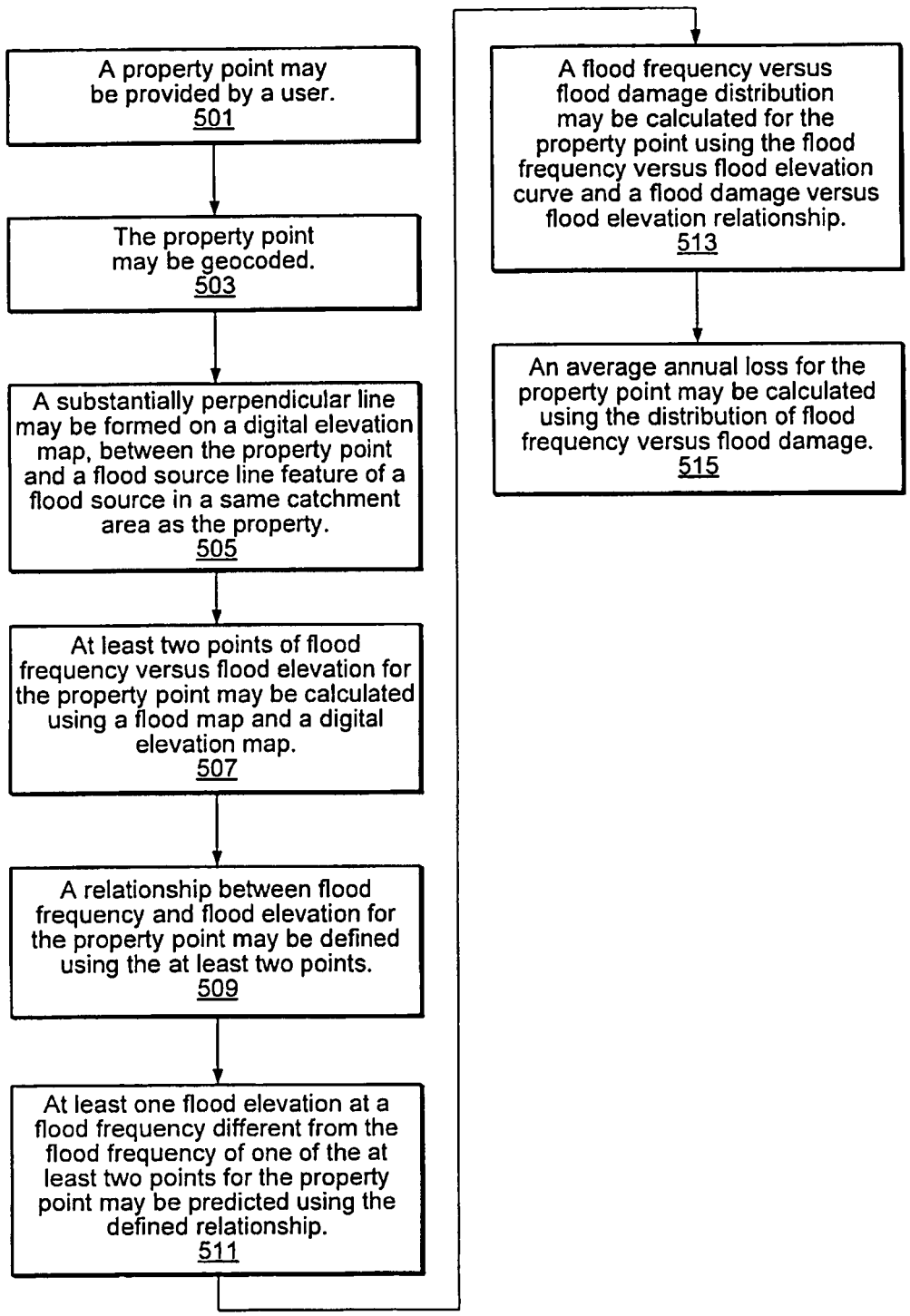
FIG. 5 illustrates an embodiment of a method for providing a flood risk assessment for a property point.

FIG. 5 illustrate an embodiment of a method for providing a flood elevation and flood risk assessment for a property point. It should be noted that in various embodiments of the methods described below, one or more of the elements described may be performed concurrently, in a different order than shown, or may be omitted entirely. Other additional elements may also be performed as desired.

At 501, a property point may be provided by a user (e.g., the address of a targeted portfolio from a mortgage company, public sector entity (e.g., FEMA, municipalities, states, etc.), capital market entity, insurance company, or reinsurance company).

At 503, the property point may be geocoded (e.g., an x,y coordinate (such as a latitude/longitude) may be determined by the system).

At 505, a substantially perpendicular line may be formed on a digital elevation map, between the property point and a flood source line feature of a flood source in a same catchment area as the property. The substantially perpendicular line may be used to associate the property point with the flood source line feature and one or more flood boundaries. The perpendicular line may also be formed as a cross section through the property point (e.g., in three dimensional space). Other uses of the perpendicular line/cross section are also contemplated.

At 507, at least two points of flood frequency versus flood elevation for the property point may be calculated using a flood map and a digital elevation map. As described herein, calculating the at least two points may include statistically determining the at least two flood frequency versus flood elevation points. For example, the 100-year flood elevation and the 500-year flood elevations may be determined for the property point (e.g., according to flood elevation lines, corresponding to flood frequency boundaries, crossing through the property point). In some embodiments, other flood elevations may be determined for the property point in addition to or instead of the 100-year base flood elevation and the 500-year flood elevation. Flood maps may include maps of flood zones (defined by flood boundaries) and a plurality of pre-existing flood elevation lines. For example, FEMA Flood Insurance Rate Maps may have 100-year flood elevation lines printed on them for some areas. In some embodiments, FEMA maps may have the 500-year flood boundary printed on them for some areas, but may not have 500-year flood elevation lines printed on them. In some embodiments, the 100-year and/or 500-year flood elevation lines may be determined or provided from other flood map sources (e.g., a FEMA Flood Insurance Study (FIS)). Digital elevation maps may include digital elevation models and/or digital elevation datasets. Other maps and datasets may also be used for elevation.

Figure 6:
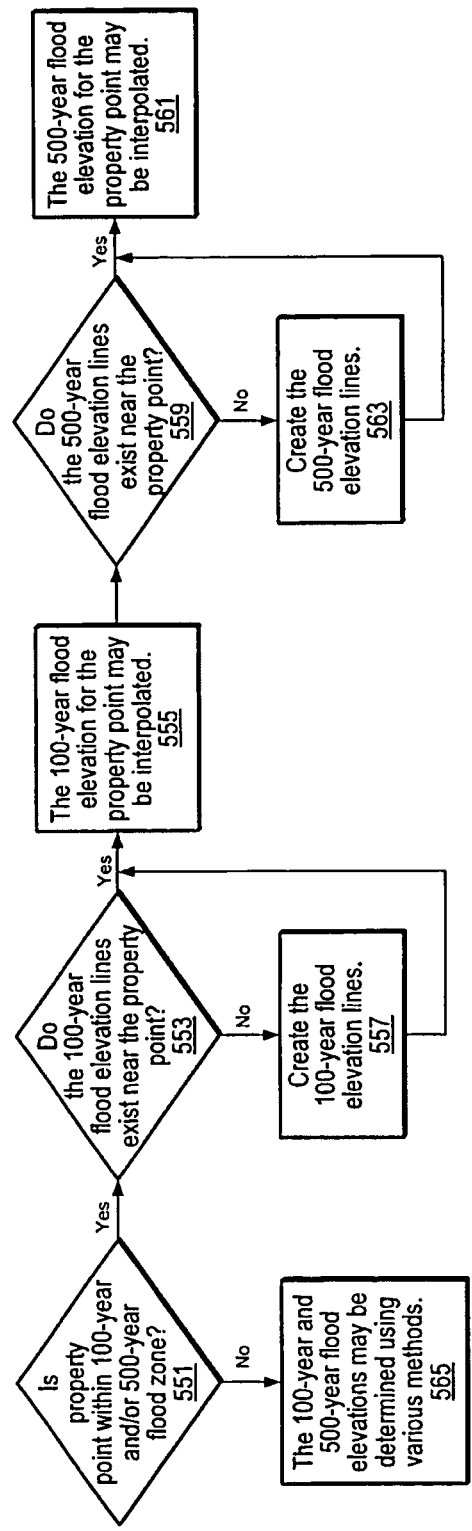
FIG. 6 illustrates an embodiment of a method for interpolating/extrapolating flood elevations for a property point.
Figure 36A:
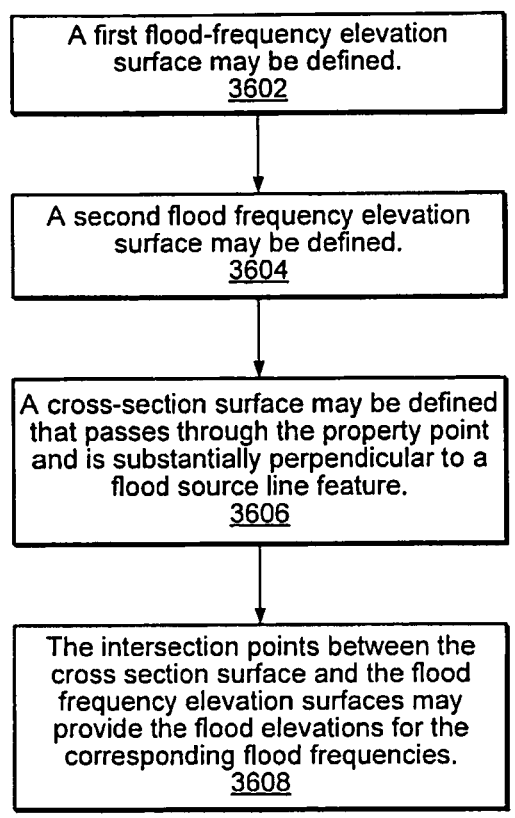
FIGS. 36a-b illustrates an embodiment of a method for determining flood frequency versus flood elevation points using three dimensional surfaces.

In some embodiments, the 100-year and 500-year flood elevations/flood elevation lines for a region (e.g., a state or the nation) may be determined using, for example, the process designated in FIG. 6 prior to receiving the property point request. These predetermined flood elevations may be stored in 100-year and 500-year flood elevation layers. These layers may then be queried after the property point request is received. In some embodiments, the 100-year and 500-year flood elevations may be determined during runtime (e.g., after the property point request is received) using the process designated, for example, in FIG. 6. Determining the 100-year and 500 year flood elevation lines may be automated or may be manual. Again, while several examples are provided using the 100-year and 500-year flood elevations, it is to be understood that other flood elevations may be used instead. Other methods are also contemplated and described herein. For example, at least two points of flood frequency versus flood elevation for the property point may be determined at the intersection of a cross section, through the property point, and flood frequency surfaces (e.g., the 100 year flood surface and the 500 year flood surface) (e.g., see FIGS. 36a-b). As another example, corresponding flood elevations for flood frequencies may be determined at an intersection of a line (through the property point and substantially perpendicular to a flood source line feature) and the corresponding flood boundaries (e.g., see FIGS. 13-14). As yet another example, the at least two points of flood frequency versus flood elevation for the property point may be calculated using cross section data on a flood profile (e.g., see FIG. 37). Other method are also contemplated.

Figure 4C:
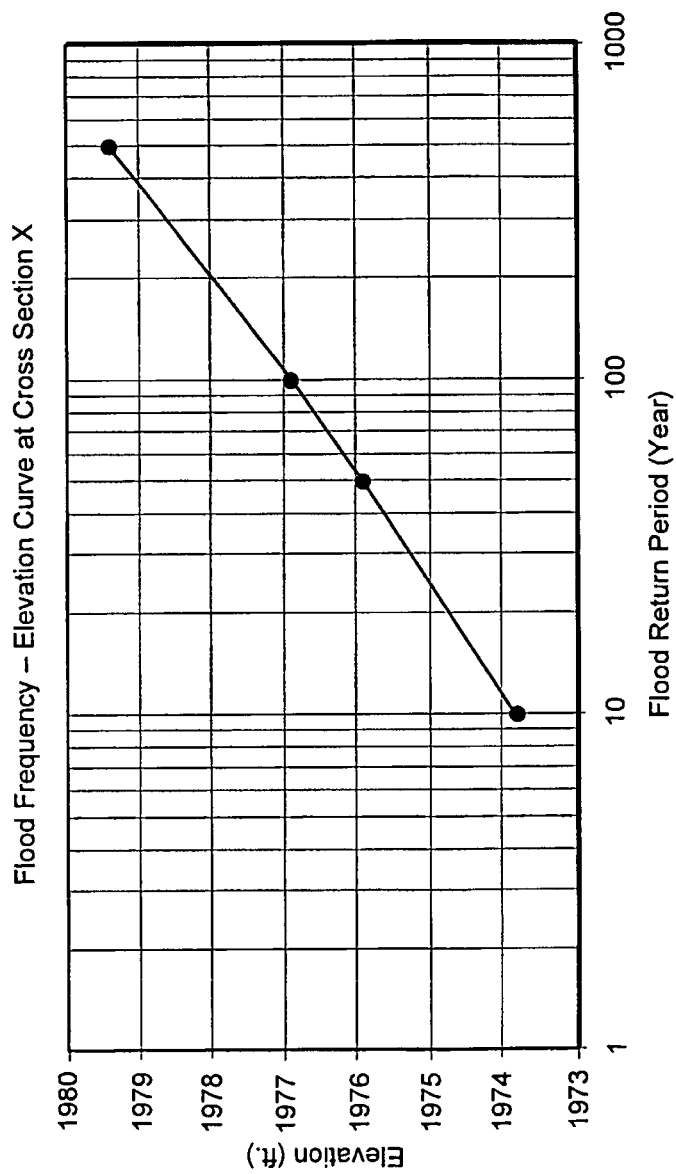
FIG. 4c illustrates an embodiment of a flood elevation versus flood return period for a property point.

At 509, a relationship between flood frequency and flood elevation for the property point may be defined using the at least two points. For example, a flood frequency versus flood elevation curve may be determined at the property point. Using the 100-year and 500-year flood elevation points, a distribution may be calculated. The distribution may provide the flood elevation at other flood frequencies (e.g., 10 year, 50 year, 1000 year, etc.). For example, the distribution may be a logarithmic relationship (e.g., see FIG. 4c). One logarithmic relationship that may be used is:

Flood Elevation=$a$ Log(flood return period)+$b$ where flood return period=1/flood frequency and where a and b are defined by solving the equation for the at least two calculated points of flood frequency versus flood elevation. To develop this linear relationship (e.g., see FIG. 4c), several data sets for different areas were analyzed. Other logarithmic relationships are also contemplated (e.g. see below).

At 511, at least one flood elevation at a flood frequency different from the flood frequency of one of the at least two points for the property point may be predicted using the defined relationship. For example, if the relationship is represented as a curve, a flood elevation at a corresponding flood frequency may be determined from the curve. If the relationship is defined as an equation, a flood elevation for a corresponding flood frequency may be determined using the defined equation. Other relationships are also contemplated.

At 513, a flood frequency versus flood damage distribution may be calculated for the property point using the flood frequency versus flood elevation curve and a flood damage versus flood elevation relationship (e.g., a vulnerability curve provided by the user). Additional data may also be used (e.g., provided by the user about the property point).

At 515, an average annual loss for the property point may be calculated using the distribution of flood frequency versus flood damage (e.g., by interpolation). In some embodiments, information may be used to provide a flood risk assessment report to the user. In some embodiments, a flood elevation versus percent damage relationship may be defined (e.g., using one or more flood studies for the property area) and the average annual loss for the property point may be determined using the flood elevation versus percent damage relationship.

As seen in FIG. 6, at 551, a determination may be made as to whether the property point is within a 100-year flood zone, a 500-year flood zone, or neither. Other flood frequency flood zones may also be used. If the property point is within the 100-year flood zone and/or the 500-year flood zone, the 100-year and 500-year flood elevations for the property point may be determined. Other flood elevations are also contemplated. At 553, a determination may be made whether the 100-year base flood elevation lines exist near the property point. At 555, if the 100-year base flood elevation lines exist near the property point, the 100-year base flood elevation for the point may be interpolated from the existing 100-year base flood elevation lines (e.g., see FIG. 13). At 557, if the 100-year base flood elevation lines are not provided near the point, the 100-year base flood elevation lines may be created near the point (e.g., see FIGS. 7a-8b, and 11-12) and the 100-year base flood elevation for the point may be interpolated. At 559, a determination may be made whether the 500-year flood elevation lines exist near the property point. At 561, if the 500-year flood elevation lines exist near the property point, the 500-year flood elevation for the point may be interpolated from the existing 500-year flood elevation lines (e.g., see FIG. 14). At 563, if the 500-year flood elevation lines are not provided near the point, the 500-year flood elevation lines may be created near the point (e.g., see FIGS. 10-12) and the 500-year flood elevation for the point may be interpolated. At 565, if the property point is outside the 100-year and 500-year flood elevation lines, the 100-year and 500-year flood elevations may be determined for the point using various methods such as extrapolation/interpolation (e.g., see FIG. 16) and/or using the nearest 100-year/500-year flood elevation lines. In some embodiments, the 100-year and 500-year flood elevation lines may be determined for an area (e.g., a nationwide area) at one time. The 100-year and 500-year flood elevations may then be interpolated for the property points as needed. In some embodiments, existing or derived flood elevation lines and/or flood boundaries may also be corrected (e.g., see FIGS. 33-36).

Referring back to FIG. 3, in some embodiments, different probability distributions may be used to calculate the curve 313 with two or more points 311a and 311b (which may be statistically determined flood elevation points). For example, the Log Pearson Type III distribution, the Log Normal distribution, and/or the Extreme Value Type I distribution may be used. Other distributions may also be used. The magnitude of a flood event (flood elevation) and the corresponding flood frequency may have a non-linear relationship. The flood elevation in the relationship may change more significantly during smaller flood frequencies (e.g., 5, 10-year return periods) than longer flood frequencies (e.g., 500 year return periods). In some embodiments, the relationship between flood elevations and flood frequency in a range of flood frequency between approximately 50 years to 1000 years may be near-linear after applying a logarithm transform on the flood frequency base. In some embodiments, a logarithm relationship between flood elevation and flood frequency may be defined at a cross section through the property point (and perpendicular to the flood source line feature) as:

Flood Elevation=a Log(flood return period)+b

In this relationship "a" may be the slope and "b" may be a constant that may be determined by solving the relationship with two flood elevation/flood frequency point pairs. In some embodiments, for a 100 year flood frequency point and a 500 year flood frequency, the relationship may be:

Flood Elevation=1.431*(Elev500−Elev100)*
  Log(flood return period)+3.862*(Elev100)−
  2.862*Elev500 where Elev100 is the flood elevation at flood frequency of 0.01 (the 100 year flood) and Elev500 is the flood elevation at the 0.002 flood frequency (500 year flood). The relationship may provide a flood elevation for a given flood frequency at the property point. The relationship may account for hydrologic, hydraulic, and statistical characteristics of flood elevation versus flood frequency. In some embodiments, the cross section through the property point (and perpendicular to the flood source line feature) may associate the property point with the flood source based on characteristics of watershed, elevation, and/or flow direction.

In some embodiments, the curve 313 may be calculated using the Log Pearson Type III distribution. The Log Pearson Type III distribution may include two parameters (a scale parameter and a shape parameter) and an initial hydrologic condition factor (such as initial discharge or a reference elevation). The Log Pearson Type III distribution may be calculated as follows:

$$P(y) := \frac{\lambda^{\beta} * (y)^{\beta-1} * \exp[-\lambda * (y)]}{\Gamma(\beta)} \quad \Gamma(\beta+1) = \beta!$$

where λ is a scale parameter and β is a shape parameter. The scale and shape parameters may be determined using the two points 311a and 311b (for example, the two points may provide two sets of values for (P(y),y) resulting in two equations (with specified initial conditions) of two unknowns (the scale parameter and shape parameter)). In some embodiments, P(y) may represent, for example, the flood frequency and y may represent the flood elevation (e.g., P(y)=0.01, y=120 ft). The determined scale parameter and shape parameter may then be used to calculate the curve 313 (for a specified initial condition).

In some embodiments, the Lognormal Distribution may be used to calculate the curve 313. A variable X may be lognormally distributed if Y=LN(X) is normally distributed with "LN" denoting the natural logarithm. The general formula for the probability density function of the lognormal distribution may be:

$$f(x) = \frac{e^{-((\ln((x-\theta)/m))^2/(2\sigma^2))}}{(x-\theta)\sigma\sqrt{2\pi}} \quad x \geq \theta; m, \sigma > 0$$

where σ is the scale parameter, θ is the location parameter and m is the shape parameter. In some embodiments, points 311a and 311b may be used to solve for at least two of θ, σ, and m. The case where θ equals zero may be referred to as the 2-parameter low normal distribution. In some embodiments, additional points of flood frequency versus flood elevation may be used. The points 311a and 311b may be used to solve for a and m to calculate the curve 313 (e.g., by providing two sets of values for (f(x),x) resulting in two equations of two unknowns.) In some embodiments, f(x) may represent the probability and x may represent the flood elevation. The case where θ=0 and m=1 may be referred to as the standard lognormal distribution. The equation for the standard lognormal distribution may be:

$$f(x) = \frac{e^{-((\ln x)^2/(2\sigma^2))}}{x\sigma\sqrt{2\pi}} \quad x \geq 0; \sigma > 0$$

In some embodiments, either point 311a and 311b may be used to solve for a in the standard lognormal distribution to calculate the curve 313. The general form of probability functions may be expressed in terms of the standard distribution.

In some embodiments, the Extreme Value Type I distribution may be used:

$$f(x) = \frac{1}{\beta} e^{\frac{x-\mu}{\beta}} e^{-e^{\frac{x-\mu}{\beta}}} \quad -\infty < x < \infty, \beta > 0$$

$$F(x) = 1 - e^{-e^{\frac{x-\mu}{\beta}}} \quad -\infty < x < \infty, \beta > 0$$

In some embodiments, points 311a and 311 b may be used to solve for (β and t to calculate the curve 313 (e.g., by providing two sets of values for (f(x),x) resulting in two equations of two unknowns.) In some embodiments, f(x) may represent the probability and x may represent the flood elevation. In some embodiments, the Log Pearson Type III distribution, the Log Normal distribution, and/or the Extreme Value Type I (or another distribution) may be used to calculate the curve 313. Once the parameters are solved for the distribution (e.g., using the points 311a and/or 311b), flood elevations at different flood frequency levels (e.g., 2 year, 5 year, 10 year, 50 year, 100-year, 200 year, 500-year, and 1000 year) may be determined using the distribution.

For example, in some embodiments, discrete values of the flood frequency versus flood elevation relationship at two known points (e.g., (FF1, Elev1), (FF2, Elev2)) may be entered into the selected probability distribution with two unknown parameters (e.g., shape parameter and scale parameter) to form two equations with two unknown variables:

FF1=F(Elev1,Shape Parameter,Scale Parameter)

FF2=F(Elev2,Shape Parameter,Scale Parameter)

The equations may be solved mathematically for deriving the values of those parameters (e.g., the shape parameter and scale parameter). After those two parameters are determined, the flood frequency versus elevation relationship may be presented as the following:

FF=F(Elev,Shape Parameter,Scale Parameter)

With this equation, the flood elevation at different flood frequencies (e.g., 2, 10 yr, 50, 200, 1000 . . . ) may be computed.

In some embodiments, other relationships may be used. For example, as seen in FIG. 38a, hydrological parameters may be calculated using N-segment discrete hydrological data series derived from hydrologic gage station data. Gage station data may include date, gage height, and stream flow data. The average discharge and coefficient of variation (a normalized standard deviation) for an n-segment hydrologic dataset may be calculated using the following formulas:

$$\overline{Q}_n = \frac{1}{N_n}\left[\sum_{x=1}^{m_n} Q_x + (N_n - m_n)\overline{Q}_{n-1}\right]$$

$$C_{V_n} = \left\{\frac{1}{N_n - 1}\left[\sum_{x=1}^{m_n}\left(\frac{Q_x}{\overline{Q}_n} - 1\right)^2 + (N_n - m_n - 1)C_{V_{n-1}}^2\right]\right\}^{\frac{1}{2}}$$

$$S_n = \overline{Q}_n C_{V_n}$$

$N_i$=number of years in the ith time period from right to left, i=0, 1, 2, ... n; and,
$m_i$=number of floods in the ith discrete segment from right to the left i=0, 1, 2, ... n
Where $\overline{Q}_n$=mean discharge of the hydrologic dataset; $C_{V_n}$=coefficient of river discharge; and $S_n$=standard deviation. Curve fitting on the standard probability distributions may be used to determine three key hydrologic parameters by using hydrologic datasets: mean discharge ($\overline{Q}_n$), standard deviation ($S_n$), and skew coefficient. The skew coefficient may be derived from the mean discharge and its standard deviation. The Log-Pearson Type III deviate may be obtained by using the skew coefficient. Using the mean discharge, coefficient of river discharge and standard deviation, the scale parameter λ and shape parameter β of the Log Pearson Type III distribution may be determined (e.g., from statistical look-up tables). The derived probability distribution may present a relationship between the flood frequency and discharge. By using the relationship between the discharge and flood elevation (rating curve) from the gage station data (see FIG. 38*b*), the flood frequency versus flood elevation relationship may be derived.

In some embodiments, gage station data over a series of years may be sorted by discharge and/or gage height in order of largest flood event first, second event second, etc. (e.g., see FIG. 38*b* with a partial listing). The number of years covered by the gage station may be used to determine probability of a flood event happening in a given flood frequency. For example, the conditional probability (corresponding to flood frequency) may be provided by the following formulas:

$$P_n = \frac{m}{N_n - 1}, \quad m = 1, 2, \ldots, m_n$$

$$P_{n-1} = P_n \left| m_n + \frac{Nn - mn}{N_n} * \frac{m}{N_{n-1} + 1}, \quad m = 1, 2, \ldots, m_{n-1}\right.$$

$$P_1 = P_2 \left| m_2 + \frac{N2 - m2}{N_2} * \frac{m}{N_1 + 1}, \quad m = 1, 2, \ldots, m_1\right.$$

$$P_0 = P_1 \left| m_1 + \frac{N1 - m1}{N_1} * \frac{m}{N_0 - K + 1}, \quad m = 1, 2, \ldots, m_0\right.$$

$N_i$=number of years in the ith time period from right to left, i=0, 1, 2, ... n; and,
$m_i$=number of floods in the ith discrete segment from right to the left i=0, 1, 2, ... n
K=number of the floods which were taken to a extreme flood segment FIG. 38*b* illustrates a partial listing of flood frequencies computed using the above formulas. The gage height may be converted into flood elevation by adding the gage datum (which may be the elevation of the gage station above sea level). In some embodiments, two or more points of flood frequency versus flood elevation may thus be computed using gage station data for a property point.

In some embodiments, these hydrologic parameters may be computed to be used in detailed HH studies and modeling in areas where flood mapping and flood engineering data may be missing. HH studies may include hydrologic studies (e.g., using water cycles and water movement modeling) and hydraulic studies (e.g., using gravity and water flow modeling) to determine approximate locations of flood boundaries, flood source line features, and/or flood elevation lines.

In some embodiments, data may be used (e.g., from DFIRM studies) to evaluate which of the three distributions may be best for a specific region or regions. In some embodiments, one distribution may be used. In some embodiments, different distributions may be used for different regions. The algorithm to derive the parameters for the distributions by using the two points (e.g., at the 100-year and the 500-year flood elevations) may be performed by a computer system or performed manually. The output of the distribution (e.g., the flood elevation at the 2 year, 5 year, 10 year, 50 year, 100-year, 200 year, 500-year, and 1000 year, etc. flood frequencies) may be provided for additional flood analysis.

Figure 7A:
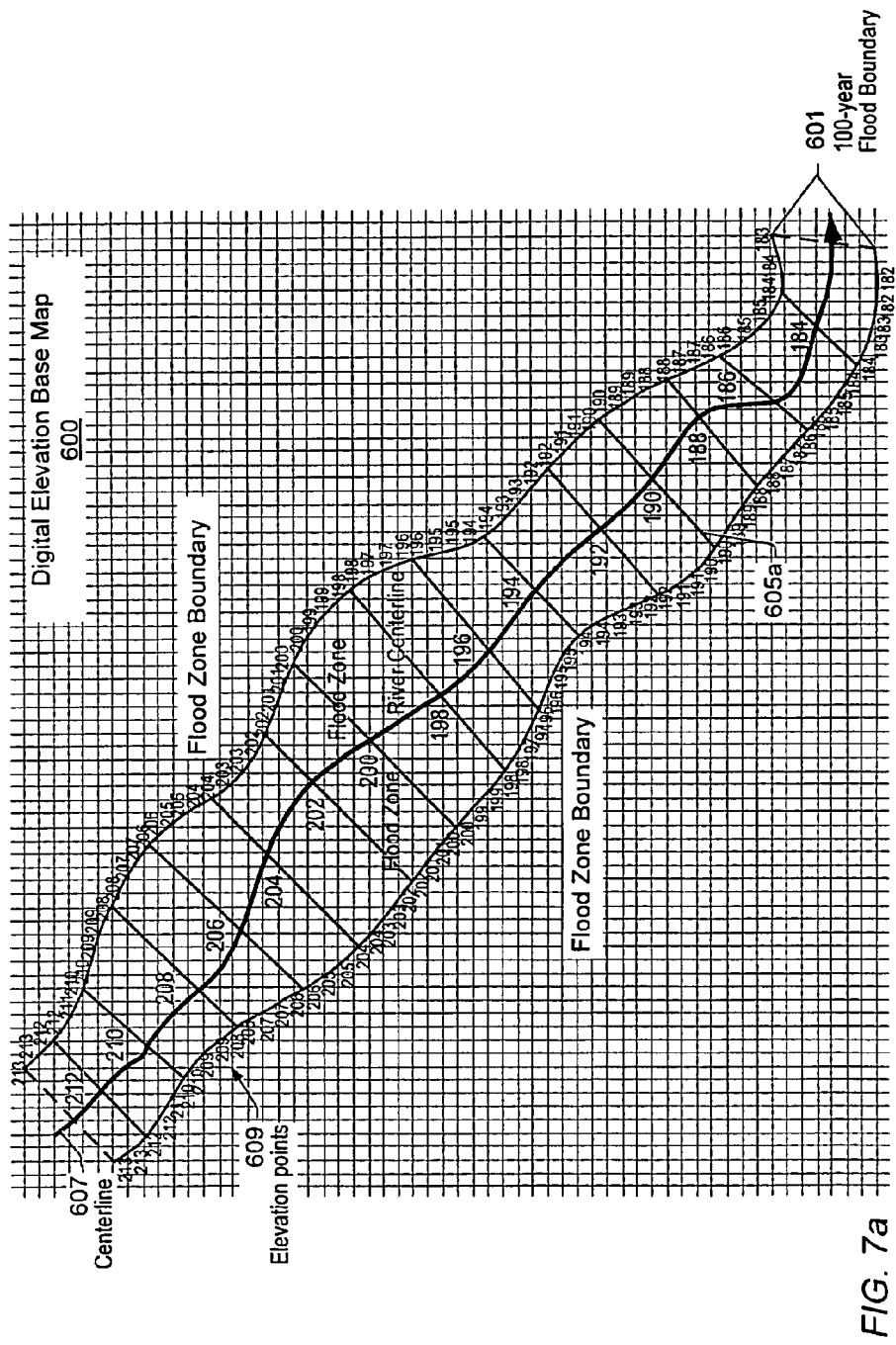
FIG. 7a illustrates a digital elevation base map with a river centerline and a 100-year flood boundary with flood elevation lines and elevation labels.

In various embodiments, the data for points 311*a* and 311*b* may be derived from flood elevation lines on flood maps from various datasets. For example, FIG. 7*a* illustrates a digital elevation base map 600 (which may have a resolution of 10 m (other resolutions are also contemplated)) with a river centerline 607, 100-year flood boundary 601 with flood elevation lines 605 (e.g., flood elevation line 605*a*) and elevation labels 609. The flood elevation lines 605 may be drawn by connecting points of similar elevations on the flood zone boundaries. For example, flood elevation line 605*a* is drawn connecting 190 ft elevations on the 100-year flood boundary 601. This may be drawn manually by physically drawing the lines or drawing the lines manually using a computer, or may be done automatically (e.g., software implemented). In some embodiments, the line may not actually be drawn, but instead data associated with the lines may be stored (e.g., in a database). In some embodiments, the elevations at the flood zone boundary may be labeled to assist in the flood elevation line 605 formation.

Figure 7B:
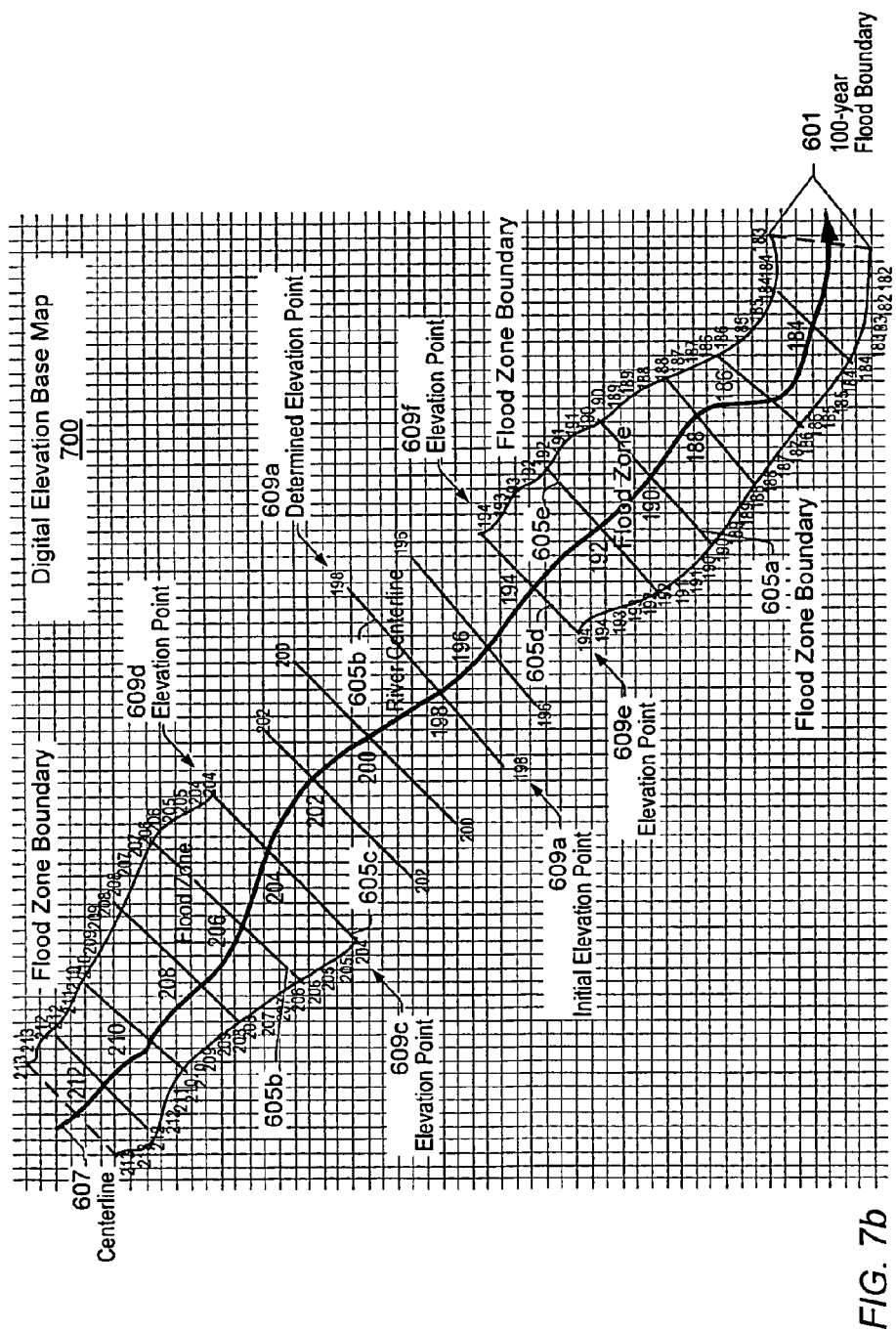
FIG. 7b illustrates an embodiment of a map used to determine missing flood elevation lines between pre-existing flood elevation lines.

As seen in FIG. 7*b*, in some embodiments, several flood elevation lines and/or portions of the 100-year flood boundary 601 (or other corresponding flood boundary) may be missing. In some embodiments, these data gaps in the flood risk zoning datasets may be filled (e.g., to build national coverage of flood elevation lines). Gaps may include data gaps between adjacent communities, large gaps between upstream communities and downstream communities, and no data areas. In some embodiments, the missing flood elevation lines and/or flood boundary may be created/redefined to assist in determination of the two points of flood frequency versus flood elevation for a property point (e.g., a property point in the region of missing flood elevation lines and/or flood boundary). In some embodiments, existing flood elevation lines (e.g., flood elevation lines 605*b-e*) on flood map 700 may be used to guide the orientation and/or size of the missing flood elevation lines (e.g., flood elevation line 605*0*. In addition, the last known upstream elevation points 609*c,d* of the 100-year flood boundary 601 and the first known downstream elevation points 609*e,f* of the 100-year flood boundary 601 may be used to determine the approximate initial elevation points for the missing flood elevation lines. For example, elevation point 609*c* may be 204 ft and elevation point 609*e* may be 194 ft. The placement of missing flood elevation lines may be based on the general slope of the flood profile in from upstream or downstream areas where HH studies exist. Initial elevation points every 2 ft between these two points could be used (e.g., elevation points at 202 ft, 200 ft, 198 ft, 196 ft) for the missing elevations needed for the missing flood elevation lines. Other elevation intervals may also be used. In some embodiments, a flood map may be overlaid (e.g., geographically aligned using one or more similar geographic features or coordinates between the two maps) on an elevation map (e.g., a digital elevation map). In some embodiments, the flood map and the elevation map may be digital maps. In some embodiments, overlaying the maps may include aligning digital coordinates of the maps (e.g., on graphical maps and/or respective data sets). In some embodiments, drawing, connecting, moving, adjusting points/lines on the digital maps may include drawing, connecting, moving, adjusting points/lines on one or both the digital elevation map and flood map. The placements of the indicated elevations (e.g., elevation points 202 ft, 200 ft, 198 ft, 196 ft) on both sides of the centerline 607 may be, for example, highlighted and connected (e.g., flood elevation line 605*f* may be drawn connecting elevation points 198 ft on either side of the centerline 607). The slope and size of existing flood elevation lines (e.g., flood elevation lines 605*c* and 605*d*) may be used to search for corresponding elevation points on opposing sides of the centerline 607 to connect. For example, an area approximately the length of flood elevation line 605*c* away from (and at a slope of 605*c*) the initial elevation point 609*a* may be searched for a similar elevation point (e.g., elevation point 609*b*) for creating the missing flood elevation line 605*f*. This may be helpful especially if there are several similar elevation points on the opposing side of the centerline 607.

In some embodiments, the slope and length of a temporary line used to search for a matching elevation point may be determined based on a weighted average of the length and slope of flood elevation line 605*c* and 605*d*. For example, the closer the initial elevation point 609*a* is to flood elevation line 605*c*, the more a temporary line may resemble the flood elevation line 605*c* in length and slope. In some embodiments, a length of the temporary line (length_temp) may be determined as follows (with distance to flood elevation line 605*c*=dist605*c*; distance to flood elevation line 605*d*=dist605*d*; length of flood elevation line 605*d*=length605*d*; and length of flood elevation line 605*c*=length605*c*):

$$\text{length\_temp} = \frac{dist605c}{dist605c + dist605d} * \text{length}605d + \frac{dist605d}{dist605c + dist605d} * \text{length}605c$$

The distance between the point and the flood elevation line may equal the shortest distance between the initial elevation point 609*a* and the flood elevation line. Other distances are also contemplated. In some embodiments, the slope of the temporary line (slope_temp) may be determined as follows (with slope of flood elevation line 605*c*=slope605*c* and slope of flood elevation line 605*d*=slope605*d*):

$$\text{slope\_temp} = \frac{dist605c}{dist605c + dist605d} * \text{slope}605d + \frac{dist605d}{dist605c + dist605d} * \text{slope}605c$$

Other methods of determining ratios for slopes and/or lengths are also possible. The temporary line may be drawn using the calculated slope and length. The elevation points on the other side of the flood elevation line may then be searched for an elevation point approximately the same as the initial elevation point 609*a*. The flood elevation line 605*f* from the initial elevation point 609*a* to the determined elevation point 609*b* may then replace the temporary line. The flood elevation line 605*f* may be assigned an elevation approximately equal to the average of the initial elevation point 609*a* and the determined elevation point 609*b*.

In some embodiments, (e.g., at the 100 year flood frequency) the placement of new BFE lines may be based on a general slope (e.g., based on hydraulic principles) between upstream BFEs, downstream BFEs, and the elevation data. For example:

Slope=(Upstream BFE–Downstream BFE)/Distance between the two BFE lines

Figure 37A:
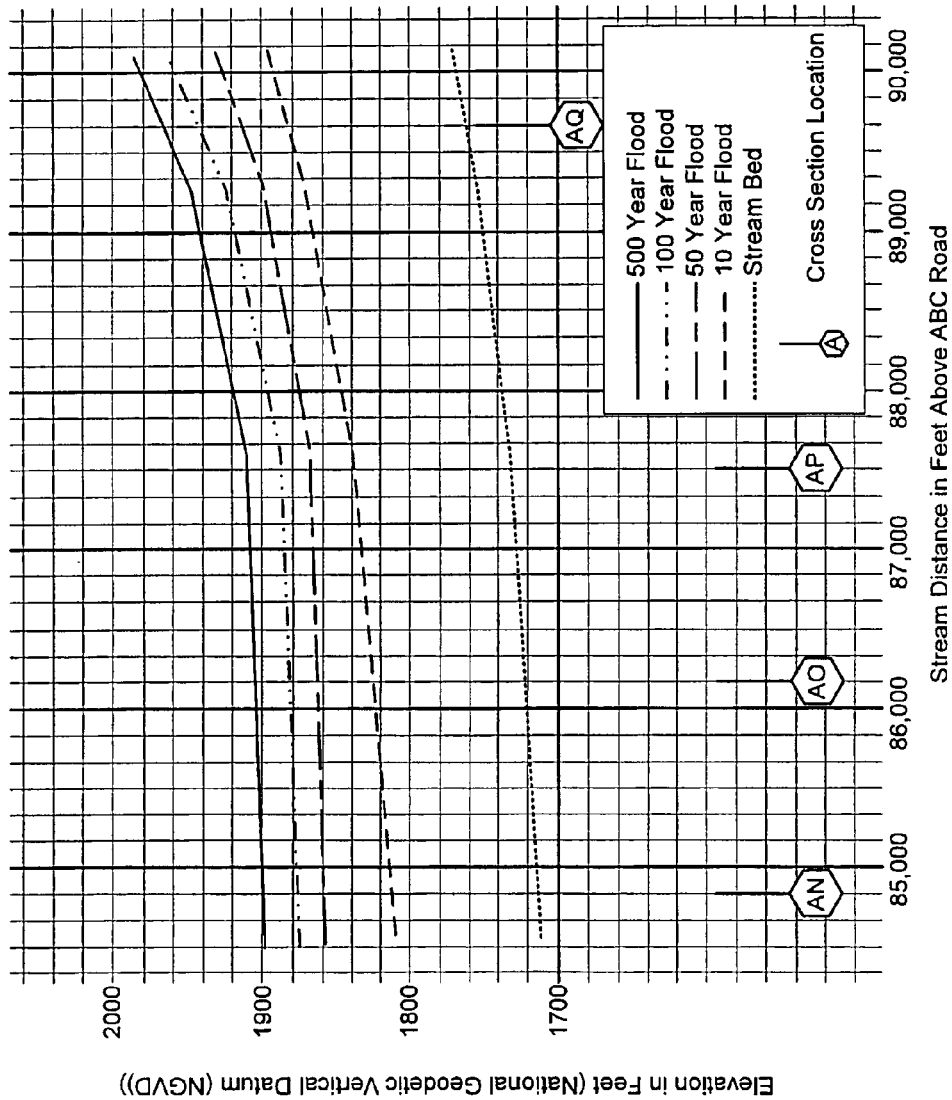
FIG. 37a illustrates an embodiment of a flood water surface profile.

In some embodiments, if the location is known upstream and downstream and the 500 year water surface elevations are available, the placement of new 500 year water elevation line features may be based on a general slope (e.g., based on hydraulic principles) between the known upstream and downstream water surface elevation locations and the elevation data. For example:

Slope=(Upstream Water Surface Elevation–Downstream Water Surface Elevation)/Distance between two known surface elevation locations If the 500 year slope is not available, the 100 year flood profile slope may be used (e.g., see FIG. 37). Example elevation profiles (e.g., from FEMA studies) among different flood frequencies may be presented to show how the water surface may be extrapolated between two known points.

Figure 8A:
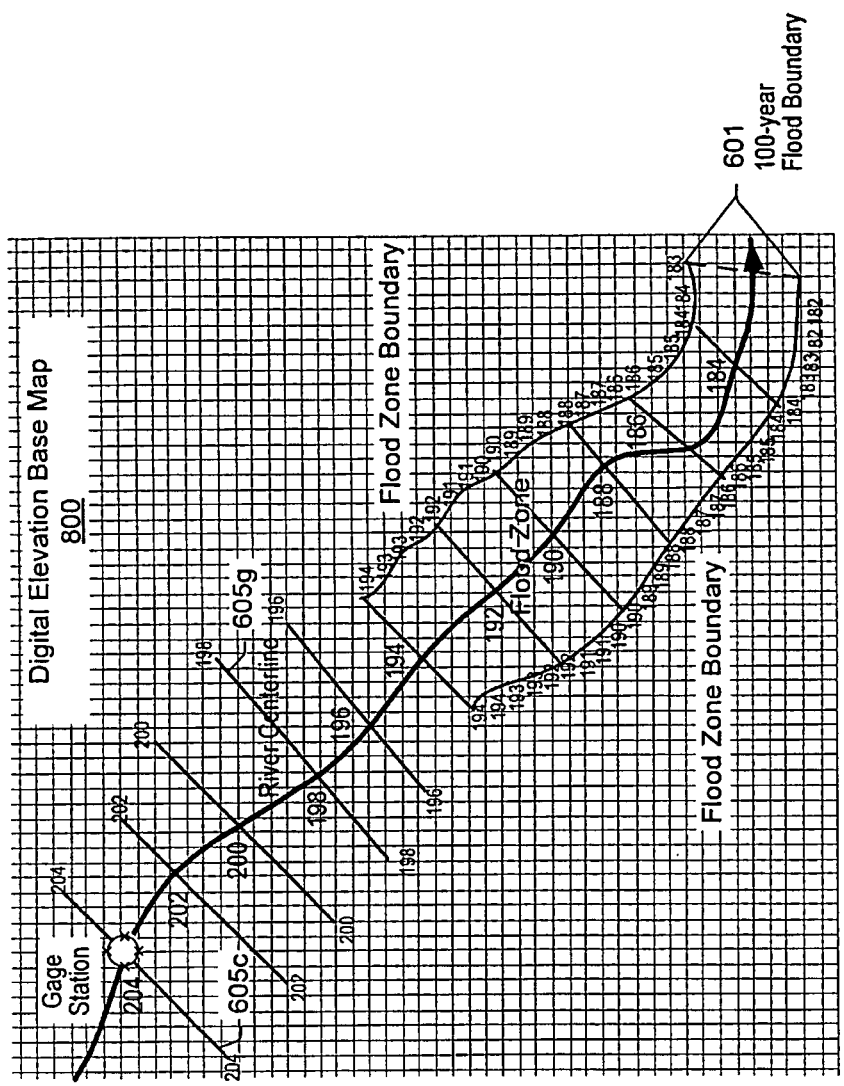

As seen in FIG. 8*a*, in some embodiments, if the flood zone boundary and/or the flood elevation lines are not available for an area, United States Geological Survey (USGS) gage station data may be used to chart and analyze stream discharge records, build the flood frequency versus discharge curve, build the discharge versus stage curve, and derive the flood frequency versus stage relationship. For example, data from gage station 801 is charted in FIG. 8*b*. Flood event 1 may have been an actual flood recorded at gage station 801. Flood event 1 may have corresponded to a flood elevation of 124.5 ft. By looking at the flood data for the gage station over time, an annual probability of occurrence (i.e., probability that a similar flood of similar elevation will occur in a given year) and a corresponding flood frequency (i.e., probability a flood elevation will exceed the flood elevation in a given year) may be developed for the flood events. This data may be used with elevation data (e.g., in flood map 800) in a statistical and hydrologic analysis to predict the flood elevations (e.g., 100-year and/or 500-year flood elevations) for various flood boundaries (e.g., the 100-year flood boundary 601 and/or the 500-year flood boundary.) This data may also be used to provide flood boundaries (e.g., the 100-year flood boundary and/or 500-year flood boundary). In some embodiments, discharge rates could be determined to assist in the hydrologic and hydraulic analysis. In addition, other data (e.g., downstream flood zone boundaries) may also be used in the analysis to predict the missing flood elevation lines (e.g., flood elevation line 605*g*). In some embodiments, other model data (e.g., FEMA HAZUS-MH (Hazards US Multi-Hazards), Watershed Information System (WISE), and HEC-RAS flood model data with DEM (Digital Elevation Model)) (e.g., with a resolution of I Om) may also be used. Other resolutions may also be used. In some embodiments, a high resolution DEM may be used (e.g., a high resolution digital elevation map).

Figure 9:
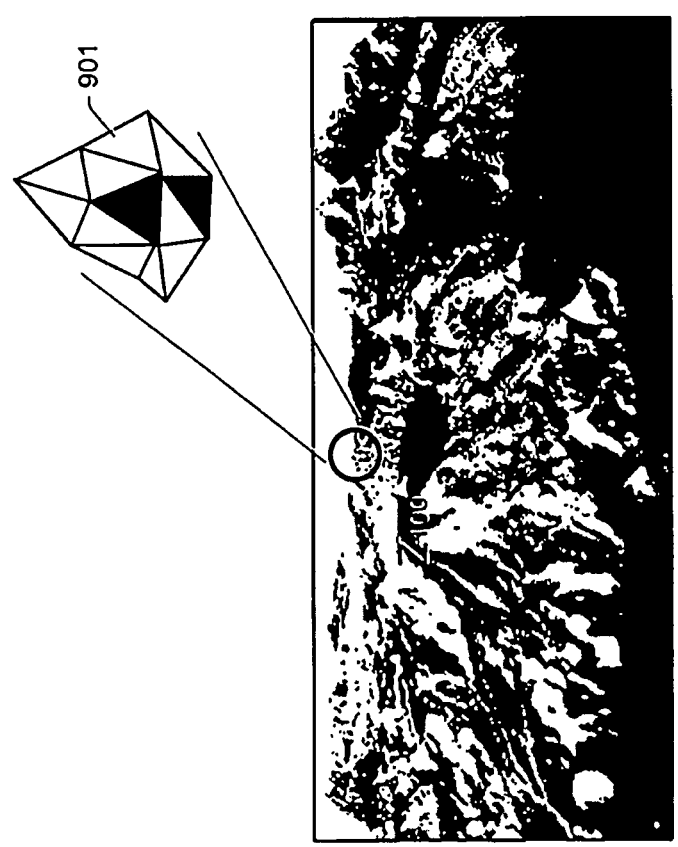
FIG. 9 illustrates an embodiment of using raster images to calculate raster layers for 100-year and 500-year flood elevations.

FIG. 9 illustrates an embodiment of using raster images to calculate raster layers for 100-year and 500-year flood elevations. For example, GIS software may use surface analysis and modeling capabilities to create extrapolated surfaces based on attribute values at points and flood elevation lines. In some embodiments, these raster layers may be used to determine flood elevations for points on the flood frequency versus flood elevation curve.

In some embodiments, to create raster layers for 100-year flood elevations, the flood elevation lines and associated flood elevation values may be used as input for a surface model (such as a TIN surface) to create a raster surface 901 for 100-year flood elevations. In some embodiments, for the areas without the 100-year flood elevation lines, but with 100-year flood boundaries, the 100-year flood boundaries may be overlaid on top of the digital elevation data (e.g., overlaid on the digital elevation map), and points on the 100-year flood boundary lines (e.g., the point elevations) from the digital elevation data may be used as inputs for the surface model to create the raster surface 901 for the 100-year flood elevations. For example, points on the 100-year flood boundary lines may be connected to form the raster surface 901. Other raster surfaces are also contemplated.

In some embodiments, if both 100-year flood elevation lines and flood boundaries are missing for an area, USGS gage data may be used along with an HH study or USGS national flood frequency curves (NFF) to obtain 100-year flood elevations at a location or area. This data may be combined with known 100-year flood elevations (e.g., downstream or upstream) and used as input for the surface model to create the raster surface 901 for 100-year flood elevations.

In some embodiments, for areas with 500-year flood boundaries, the 500-year flood boundaries may be overlaid on top of the digital elevation data and the elevations of the points along the 500-year flood boundary lines may be used as input for a surface model to create the raster surface 901 for 500-year flood elevations.

In some embodiments, for areas without the 500-year flood boundaries, USGS gage data may be used with hydrologic analysis or USGS national flood frequency curves (NFF) to obtain 500-year flood elevation at areas to combine with known 500-year flood elevations (e.g., downstream or upstream) as input for a surface model to create the raster surface 901 for 500-year flood elevations.

In some embodiments, these raster surfaces may be queried to determine sets of flood elevations versus flood frequencies for a property point (e.g., an address). These sets may be used in the distribution to determine the curve for the flood frequency versus flood elevation for the property point.

In various embodiments, once the flood elevations lines are available near an property point, these flood elevations may be used to interpolate/extrapolate at least two flood frequency/flood elevation points for the distribution. Several methods of interpolating/extrapolating these points are described herein.

Figure 10:
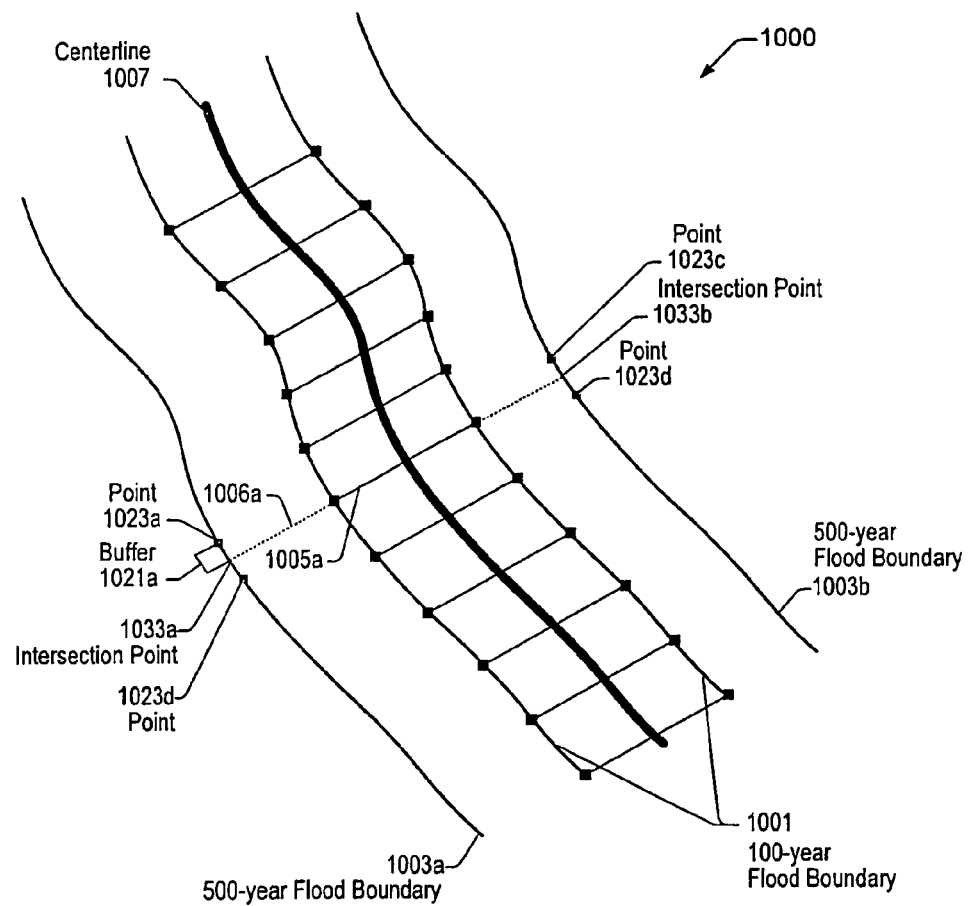
FIG. 10 illustrates an embodiment of extending flood elevation lines using existing flood elevation lines.

FIG. 10 illustrates an embodiment of a map 1000 for extending new flood elevation lines using existing flood elevation lines (e.g., BFEs). In some embodiments, flood elevation lines 1005 (e.g., flood elevation line 1005a (a BFE) on 100-year flood boundary 1001 around centerline 1007) may be extended (e.g., along their slope) to the 500-year flood boundary 1003 (e.g., extended flood elevation line 1006a indicated with a dashed line). In some embodiments, the intersection 1033a of the extended flood elevation line may be buffered (e.g., buffer 1021a 10 ft on either side of the intersection point 1033a for a DEM map (e.g., with a resolution of 10 m)) upstream and downstream at the 500-year flood boundary 1003. The elevation points between the buffered points 1023a and 1023b may be compared with the elevation points between the buffered points 1023c and 1023d (resulting from a buffer around intersection point 1033b). In some embodiments, an elevation point at each end (e.g., with the smallest difference) may be selected as the endpoints of the extended flood elevation line 1006a at the 500-year flood boundary 1003. The average of the selected elevation points may be assigned to the new flood elevation line 1006. In some embodiments, the buffer amount may be based on the resolution of the digital elevation map. In some embodiments, buffers may not be used and the new flood elevation line 1006 may be assigned an average approximately equal to the two intersection points 1033a,b.

Figure 11:
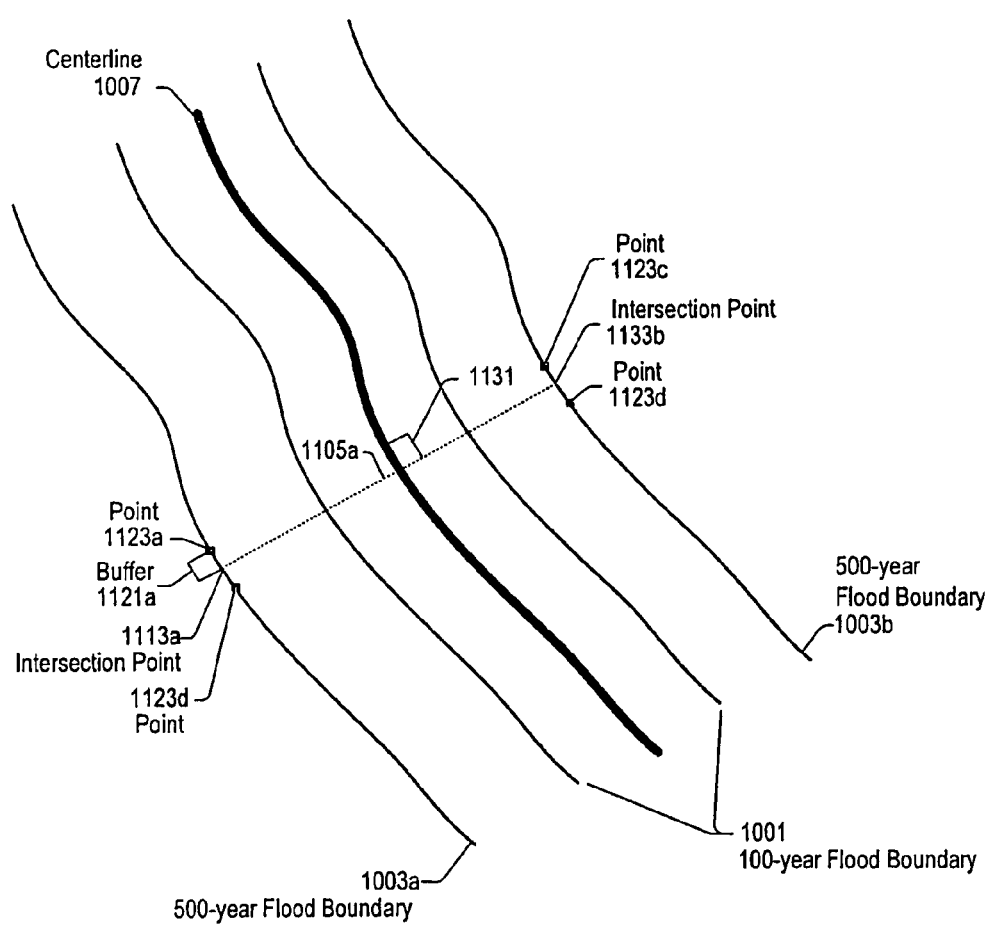
FIG. 11 illustrates an embodiment of forming a flood elevation line using a flood source line feature.

FIG. 11 illustrates an embodiment of forming a flood elevation line using a flood source line feature (e.g., a centerline). In some embodiments, flood elevation line 1105a may be drawn substantially perpendicular to the centerline 1007 (i.e., at a right angle 1131 to the centerline 1007 at a point on the centerline 1007). In some embodiments, the intersections 1133a,b of the drawn flood elevation line 1105a may be buffered in a similar manner as described above with respect to FIG. 10 to derive adjusted endpoints for the flood elevation line 1105a (e.g., by applying buffer 1121a to the intersections 1133a,b to get buffered points 1123a-d, selecting approximately equivalent elevation points on either end, and connecting the selected elevation points to reform the flood elevation line 1105a). In some embodiments, the ends of flood elevation line 1105a may not be buffered (e.g., the elevations at the intersections 1133a,b may be used as the endpoints of the flood elevation line 1105a without adjustment (the flood elevation line 1105a may be assigned a value approximately equal to the average of the two intersected points 1133a,b)). In some embodiments, the flood elevation line may be intersected with flood boundaries (e.g., the 100 year and/or 500 year flood boundaries). The elevation (e.g., from a DEM reading) of the intersection points (e.g., on the property point side of the centerline 1007) may be used to move the endpoints on the opposite side of the centerline to points of similar elevation (e.g., points collinear with the flood elevation line). The flood elevation line may then be provided with endpoints of matching elevation. In some embodiments, moving an endpoint may include moving a digital point on a digital map (e.g., a digital flood map or digital elevation map).

Figure 12:
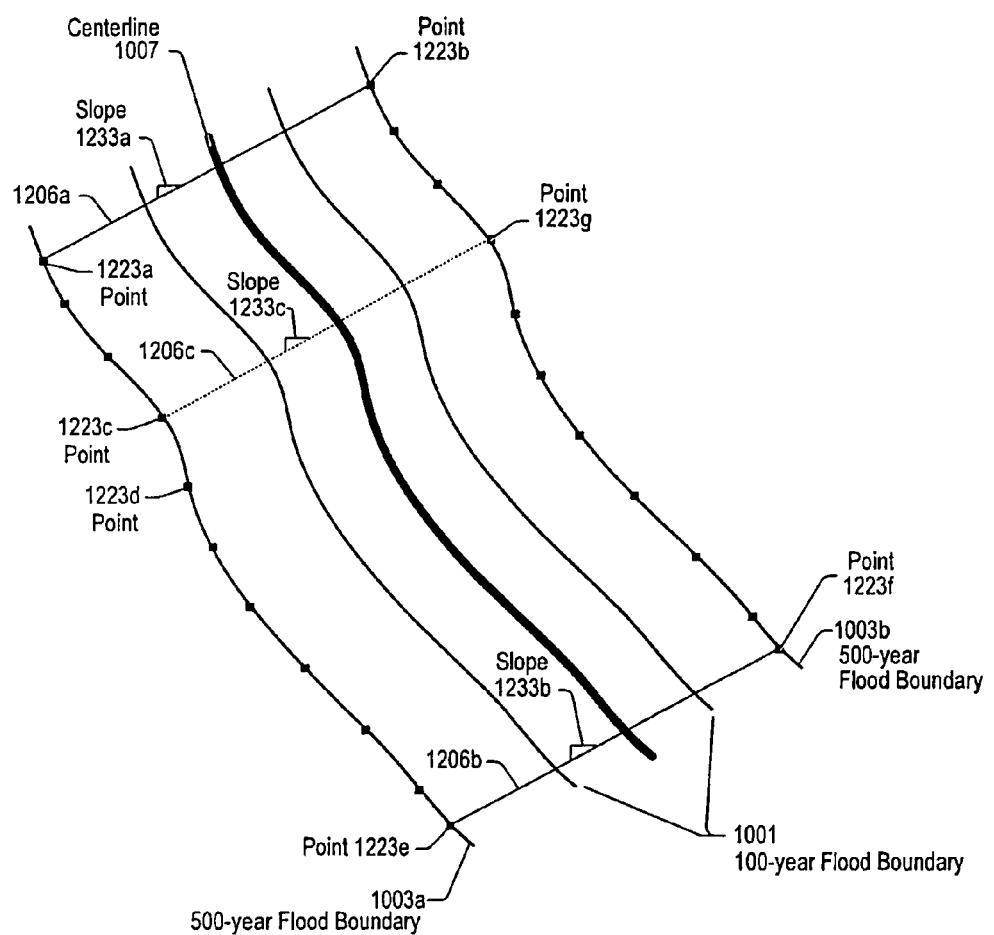
FIG. 12 illustrates an embodiment of forming flood elevation lines using two pre-established flood elevation lines.

FIG. 12 illustrates an embodiment of a map for forming flood elevation lines using pm-established flood elevation lines. In some embodiments, a user may choose points 1223a and 1223b on either side of centerline 1007 to form flood elevation line 1206a. The user may carefully choose these points (e.g., guided by elevations and/or other map details) to define an accurate flood elevation line 1206a. In some embodiments, a computer may determine these points. In some embodiments, a flood elevation line 1206b may be similarly defined (e.g., by selecting points 1223e,f). Using the two defined flood elevation lines 1206a,b, additional flood elevation lines may be formed between them using the slope and/or lengths of the flood elevation lines 1206a,b and the elevation values corresponding to the 500-year flood boundary 1003 (or other flood boundary such as the 100-year flood boundary 1001). Points (e.g., points 1223c,d) may be selected at intervals along one side of the flood boundary (e.g., along the left side of the 500-year flood boundary 1003). Slopes and/or lengths of the missing flood elevation lines between the pre-established flood elevation lines 1206a,b may be estimated using the slopes and/or lengths of the pre-established flood elevation lines 1206a,b (e.g., by weighting an average of the slopes and/or lengths of the pre-established flood elevation lines 1206a,b according to, for example, a distance of the flood elevation line to be drawn from the pre-established flood elevation lines 1206a,b.) For example, flood elevation lines closer to flood elevation line 1206a may have a slope similar to slope 1233a and flood elevation lines closer to flood elevation line 1206b may have a slope similar to slope 1233b. Using the estimated slope (e.g., slope 1233c), a corresponding location on the opposing flood boundary may be determined. A point 1223g of similar elevation as the initial point (e.g., initial point 1223c) may be determined (e.g., using the buffer technique described above with respect to FIG. 10). In some embodiments, the closest similar elevation point may be used. A flood elevation line (e.g., flood elevation line 1206c) may be drawn between the determined points and an average elevation (e.g., average of the two opposing points) may be assigned to the flood elevation line 1206c.

In some embodiments, the slope and length of a temporary line used to search for a matching elevation point may be determined based on a weighted average of the length and slope of flood elevation line 1206a,b. For example, the closer the initial elevation point 1223c is to flood elevation line 1206a, the more a temporary line may resemble the flood elevation line 1206a in length and slope.

In some embodiments, a length of the temporary line (length_temp) may be determined as follows (with distance to flood elevation line 1206a=dist1206a; distance to flood elevation line 1206b=dist1206b; length of flood elevation line 1206a=length1206a; and length of flood elevation line 1206b=length1206b):

$$\text{length\_temp} = \frac{dist1206a}{dist1206a + dist1206b} * \text{length}1206b +$$
$$\frac{dist1206b}{dist1206a + dist1206b} * \text{length}1206a$$

The distance between the point and the flood elevation line may equal the shortest distance between the initial elevation point 1223c and the flood elevation line. Other distances are also contemplated.

In some embodiments, the slope of the temporary line (slope_temp) may be determined as follows (with slope of flood elevation line 1206a=slope1206a and slope of flood elevation line 1206b=slope1206b):

$$\text{slope\_temp} = \frac{dist1206a}{dist1206a + dist1206b} * \text{slope}1206b +$$
$$\frac{dist1206b}{dist1206a + dist1206b} * \text{slope}1206a$$

Other methods of determining ratios for slopes and/or lengths are also possible. The temporary line may be drawn using the calculated slope and length. The elevation points on the other side of the flood elevation line may then be searched for an elevation point approximately the same as the initial elevation point 1223c. The flood elevation line 1206c from the initial elevation point 1223c to the determined elevation point 1223g may then replace the temporary line. The flood elevation line 1206c may be assigned an elevation approximately equal to the average of the initial elevation point 1223c and the determined elevation point 1223g.

In some embodiments, other flood elevation line creation methods may be used. In some embodiments, combinations of the methods described herein may be used.

Figure 13:
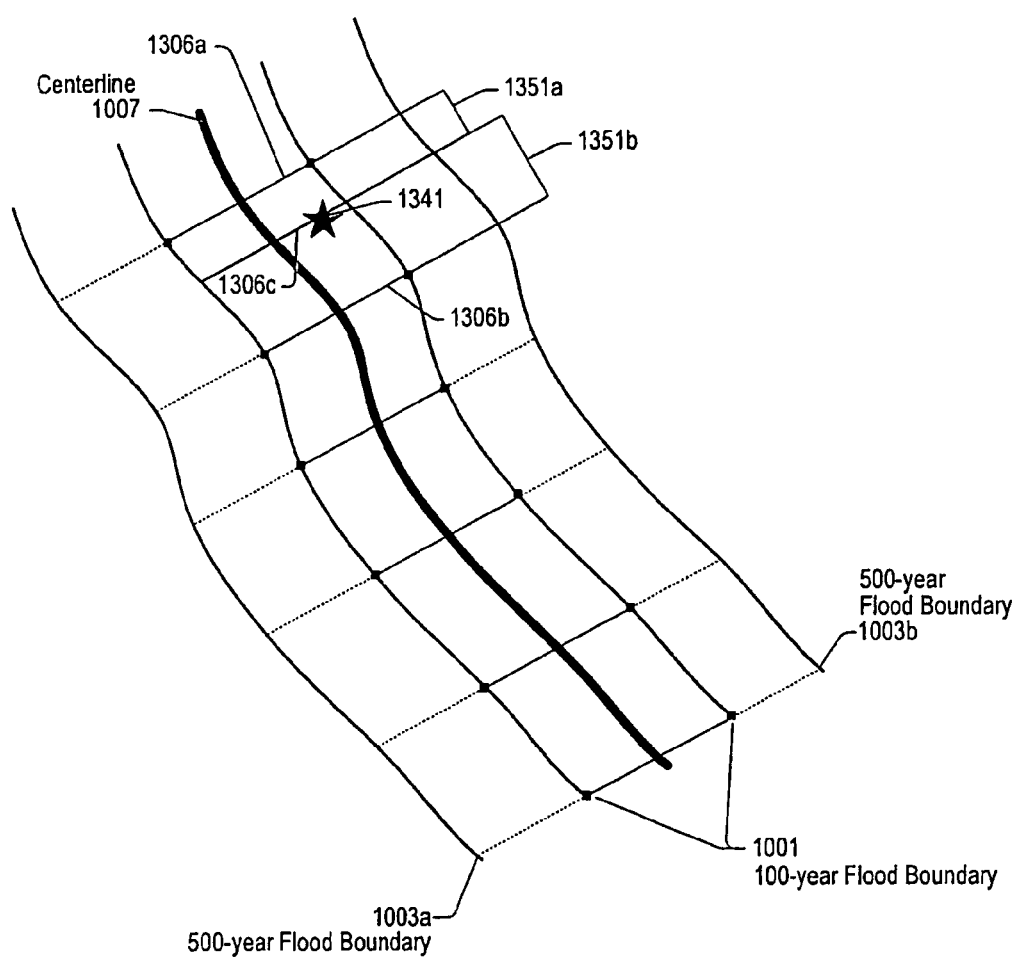
FIG. 13 illustrates an embodiment of approximating a flood elevation line for a point between two flood elevation lines for 100-year flood boundaries.

FIG. 13 illustrates an embodiment of approximating a flood elevation for a point 1341 between two flood elevation lines (e.g., BFE lines 1306a,b) for the 100-year flood boundaries 1001. The property point 1341 may be a specific property, a geocoded point location, or a point of interest (POI). In some embodiments, a substantially perpendicular line 1306c may be formed, on the digital elevation map, between the property point 1341 and a flood source line feature (e.g., centerline 1007) of a flood source in a same catchment area as the property point 1341. To calculate the flood elevation for the point 1341 between two BFE lines 1306a,b, distances 1351a,b may be calculated between the BFEs 1306a,b and the substantially perpendicular line 1306c. In some embodiments, distances 1351a,b may be calculated between the BFEs 1306a,b and the point 1341 (e.g., a shortest distance between the point 1341 and the BFE or a distance along a line on a right angle to the BFE and through the point 1341). In some embodiments, based on the distances 1351a,b, an elevation between the two BFEs 1306a,b may be extrapolated for the point 1341. For example, if BFE 1306a is 200 ft, BFE 1306b is 210 ft, distance 1351a (dist1351a) is 100 ft and distance 1351b (dist1351b) is 200 ft (totaldist=300 ft), the BFE for 1341 may be calculated as follows:

$$BFE = \frac{dist1351b}{totaldist} * BFE1306a + \frac{dist1351a}{totaldist} * BFE1306b$$

$$BFE = \frac{200}{300} * 200 \text{ ft} + \frac{100}{300} * 210 \text{ ft} = 133.33 \text{ ft} + 70 \text{ ft} = 203.33 \text{ ft}$$

Therefore, the BFE 1306c may be 203.33 ft (which may be rounded to 203 ft). Other methods of calculating a weighted average for the BFE 1306c for point 1341 are also contemplated. In some embodiments, at least two points of flood frequency versus flood elevation for the property point may be calculated by determining the flood elevation for the point at two flood frequencies (e.g., by approximating a flood elevation for the property point between two flood elevation lines for the 100 year flood zone and two flood elevation lines for the 500 year flood zone). In some embodiments, the substantially perpendicular line 1306c may be a substantially perpendicular cross section through the property point.

Figure 14:
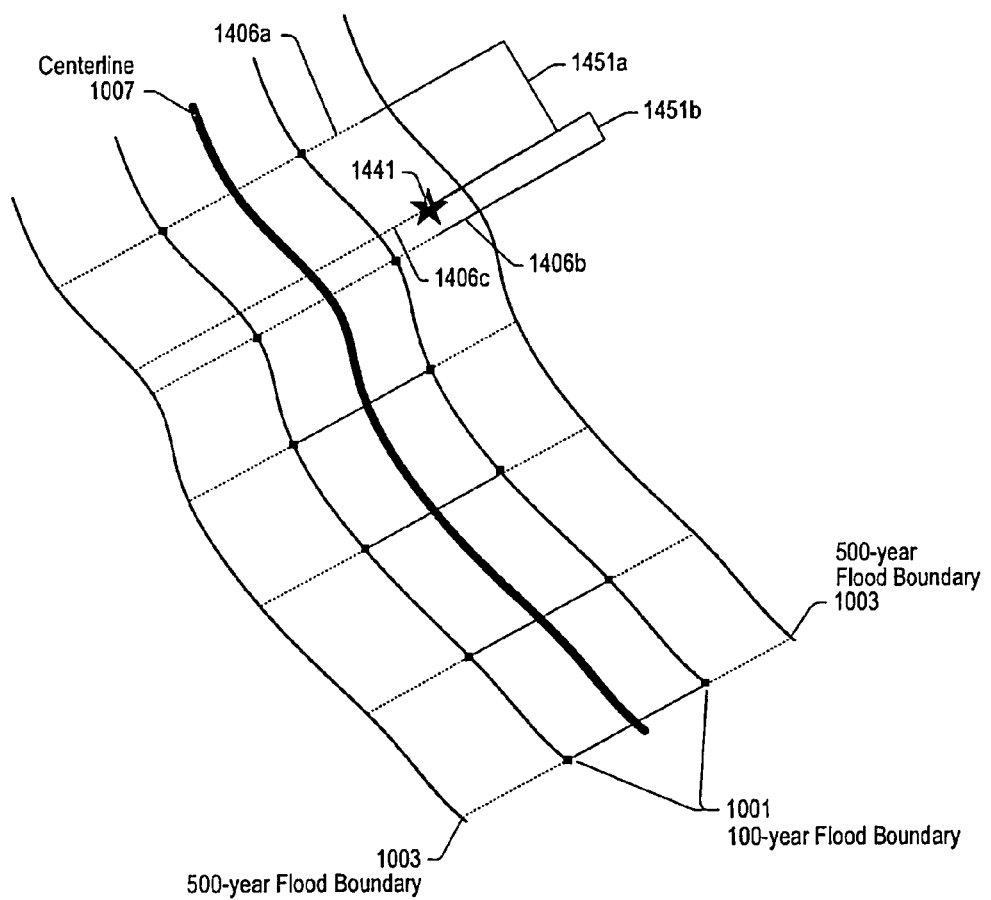
FIG. 14 illustrates an embodiment of approximating a flood elevation line for a point between two flood elevation lines for the 500-year flood boundaries.

FIG. 14 illustrates an embodiment of approximating a flood elevation line for a property point 1441 between two flood elevation lines (e.g., flood elevation lines 1406a,b) for the 500-year flood boundaries 1003. In some embodiments, a substantially perpendicular line 1406c may be formed, on the digital elevation map, between the property point 1441 and a flood source line feature (e.g., centerline 1007) of a flood source in a same catchment area as the property point 1441. To calculate the flood elevation line for a property point 1441 between two flood elevation lines 1406a,b, distances 1451a,b may be calculated between the flood elevation lines 1406a,b and the substantially perpendicular line 1406c. In some embodiments, distances 1451a,b may be calculated between the flood elevation lines 1406a,b and the property point 1441. In some embodiments, based on the distances 1451a,b, an elevation between the two flood elevation lines 1406a,b may be extrapolated for the property point 1441. For example, if flood elevation line 1406a (FE_I406a) is 240 ft, flood elevation line 1406b (FE 1406b) is 250 ft, distance 1451a (dist1451a) is 250 ft and distance 1451b (dist1451b) is 50 ft (totaldist=300 ft), the flood elevation for 1441 (FE_1441) may be calculated as follows:

$$FE\_1441 = \frac{dist1451b}{totaldist} * FE\_1406a + \frac{dist1451a}{totaldist} * FE\_1406b$$

$$FE\_1441 = \frac{50}{300} * 240 \text{ ft} + \frac{250}{300} * 250 \text{ ft} = 40 \text{ ft} + 208.33 \text{ ft} = 248.33 \text{ ft}$$

Therefore, the flood elevation line 1406c may be 248.33 ft (which may be rounded to 248m). Other methods of calculating a weighted average for the flood elevation line 1406c are also contemplated. In some embodiments, flood elevation line 1406c may be formed as a substantially perpendicular line 1306c or a substantially perpendicular cross section through the property point 1441.

Figure 15:
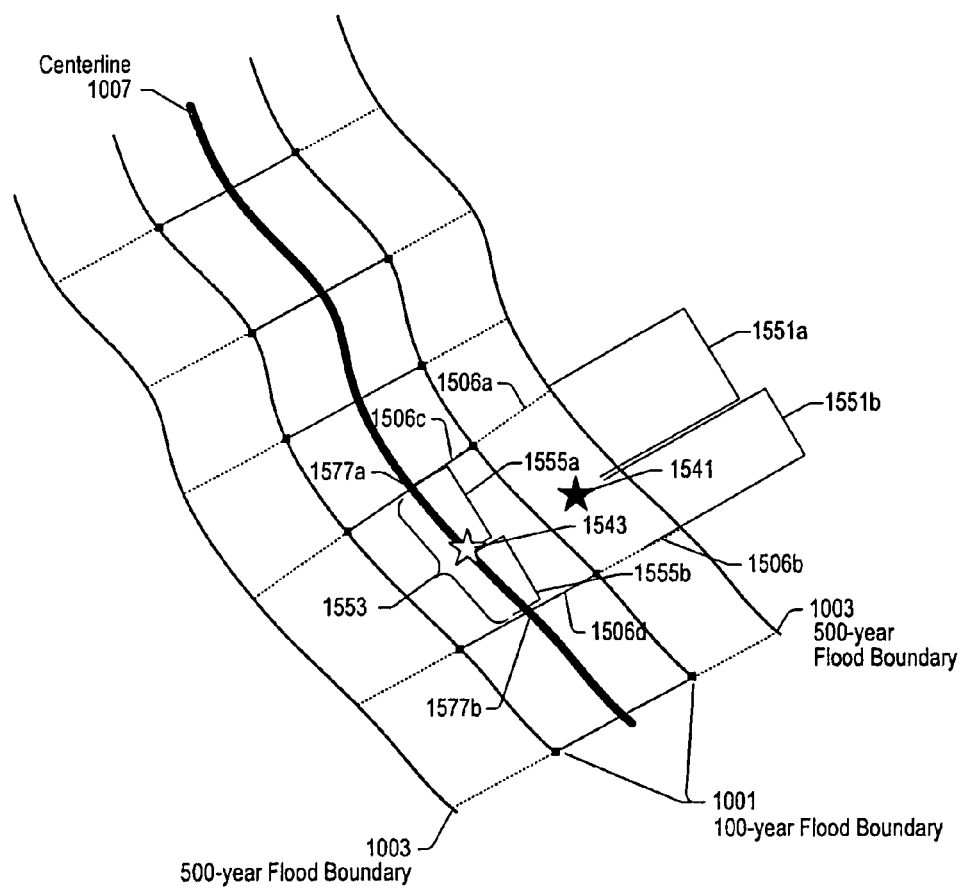
FIG. 15 illustrates another embodiment for calculating a flood elevation line for a point between two flood elevation lines.

FIG. 15 illustrates another embodiment for calculating a flood elevation line for a property point between two flood elevation lines. In some embodiments, distances 1551a and 1551b between property point 1541 and, for example, the nearest flood elevation lines (e.g., flood elevation lines 1506a,b). The property point 1541 may be a specific property, a geocoded point location, or a point of interest (POI). Distances 1551a and 1551b may be used to place a dummy point 1543 between the 100-year flood boundary flood elevation lines on the centerline 1007. If the centerline 1007 does not exist, a dummy point may be placed between the two middle points 1577a,b of the flood elevation lines 1506a,b. Other locations for the dummy point are also contemplated. Distances 1551a,b may be the shortest distance between the property point 1541 and the nearest point on the flood elevation lines 1506a,b or a distance along a line on a right angle to the flood elevation lines 1506a,b and through the property point 1541. A ratio of the relative distances may be used to place the dummy point 1543. For example (distance to 1551a=dist1551a; distance to 1551b=dist1551b; distance to 1555a=dist1555a; total distance between 1577a and 1577b=tot dist1553; and distance to 1555b=dist1555b):

$$dist1555a = \frac{dist1551a}{dist1551a + dist1551b} * tot\_dist1553$$

$$dist1555b = \frac{dist1551b}{dist1551a + dist1551b} * tot\_dist1553$$

The 100-year flood elevation line for the dummy point 1543 may then be calculated using the nearest flood elevation lines for the 100-year flood boundary 1001 using the method as seen in FIG. 13. This 100-year flood boundary flood elevation line may then be used for the property point 1541.

Figure 16:
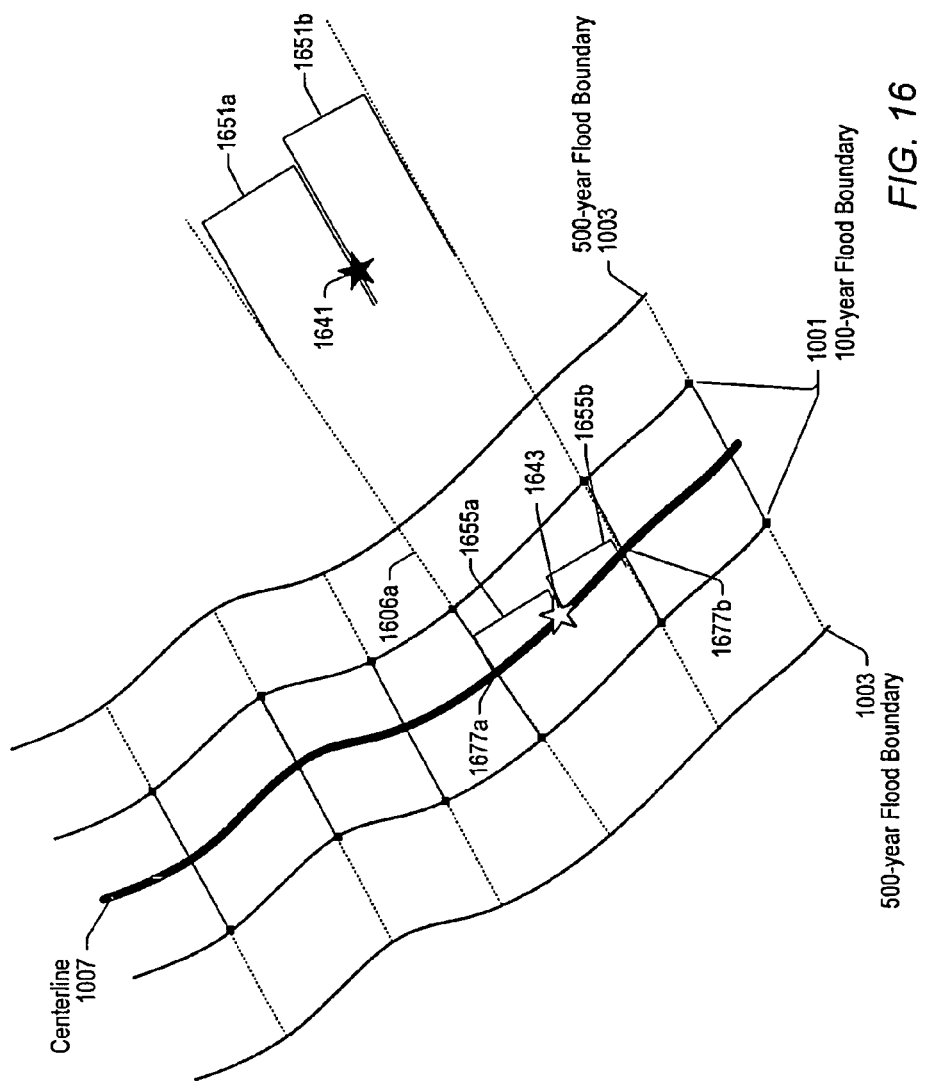
FIG. 16 illustrates an embodiment of determining a flood elevation line for a point outside of the 500-year flood boundary.

FIG. 16 illustrates an embodiment of determining a flood elevation line for a property point outside of the 500-year flood boundary 1003. In some embodiments, the nearest flood elevation lines (e.g., flood elevation lines 1606a,b) may be extended past the property point 1641 by extending their lines along the directions of the respective lines. The nearest distances 1651a,b to each extended flood elevation line may be calculated (e.g., a shortest distance between the property point 1641 and the flood elevation line or a distance along a line on a right angle to the flood elevation line and through the property point 1641) and used to place a dummy point 1643 on the centerline 1007 (or between the middle points 1677a,b of two flood elevation lines 1606a,b). For example, the relative distances 1655a,b may be calculated based on the distances 1651a,b. The 100-year flood boundary flood elevation line for the dummy point 1643 may then be calculated using the nearest flood elevation lines for the 100-year flood boundary 1001 using the method as seen in FIG. 13. This 100-year flood boundary flood elevation line may then be used for the property point 1641.

In some embodiments, substantially seamless national coverage (and/or global coverage) for 100-year and 500-year flood elevation lines (and/or other flood elevation frequencies) and flood boundaries may be determined using the methods described herein. The flood frequency versus flood loss curve may be derived based on the computed flood frequency versus flood elevation curve, digital elevation datasets, and/or collected damage curves at a property point, a geocoded point or a point of interest (POI). In some embodiments, elevation surfaces (e.g., TIN surfaces) may be created using the determined flood elevation lines and flood zone boundaries. The elevation surfaces may then be recomputed when FEMA DFIRM datasets are updated. In some embodiments, once a flood elevation line is established for a property point, the 100-year flood elevation line and 500-year flood elevation line for the property point (or elevations of the flood at other flood frequency marks) may be used as points on a flood frequency versus flood elevation curve. These points may also be used with a probability distribution (e.g., the Log Pearson Type III distribution, the Log Normal distribution, and/or the Extreme Value Type I distribution as described above) to calculate other points on the curve. Once the curve is calculated, the flood elevation at other flood frequencies may be determined (e.g., flood elevation at the 2 year, 10 year, 50 year, 100-year, 200 year, 500-year, and 1000 year).

Figure 18A:
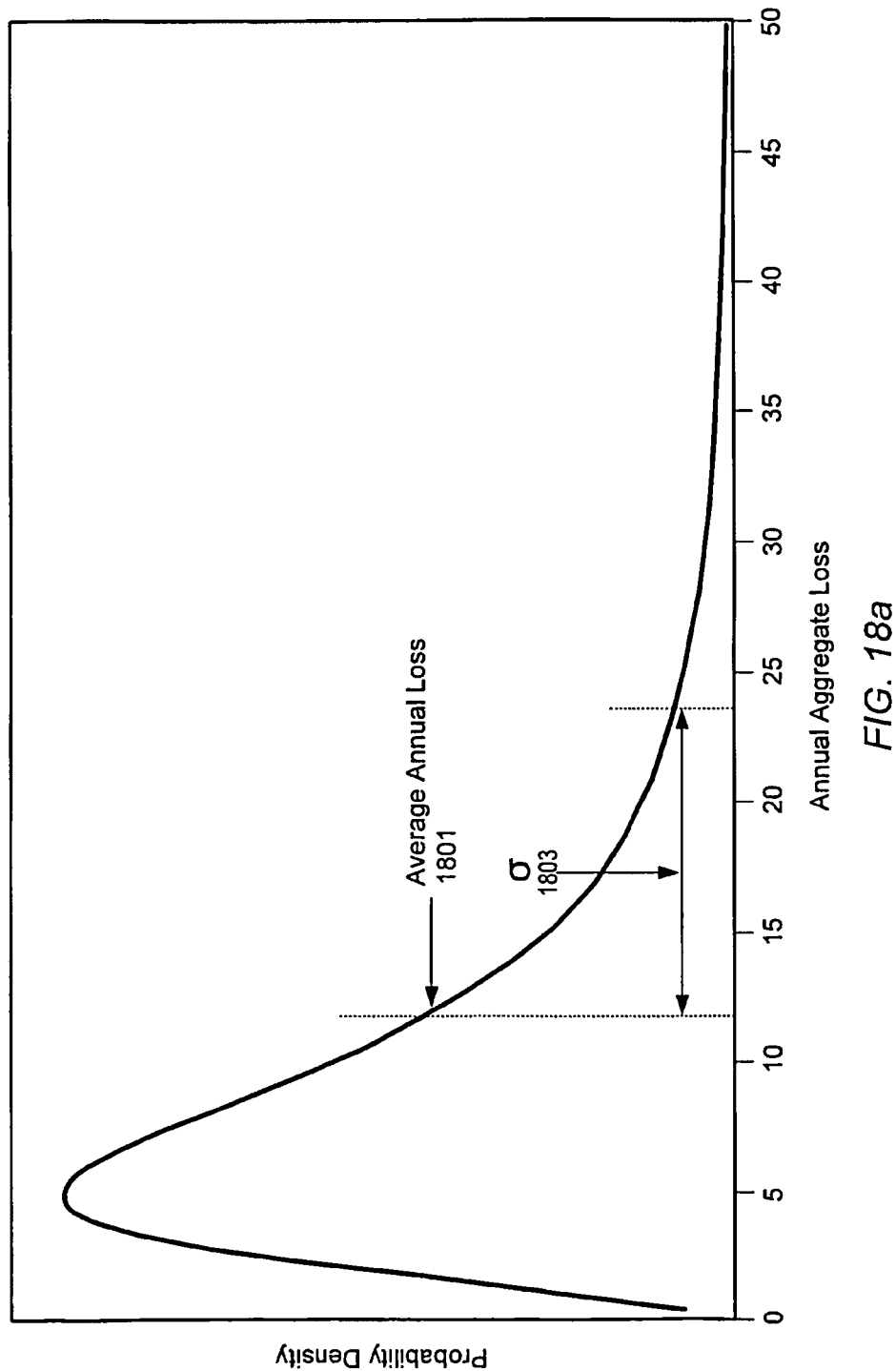
FIG. 18a illustrates an embodiment of a distribution for average annual loss.

Once the flood frequency versus flood elevation curve is calculated, a flood frequency versus damage curve may be created. Users may enter the total value of property at the property point (e.g., commercial property) and associated property characteristics (e.g., property type). A ground elevation may be determined at the property point (e.g., using the DEM data) and the latitude/longitude of the property point. The flood depths for the property point may be calculated by subtracting the ground elevation of the property point from the flood elevations during different flood frequency floods. For example:

flood elevation=flood depth−ground elevation of the property point where flood depth may equal the depth of the flood water above the ground at the property point (flood elevation may be the elevation of the flood water surface above sea level). If flood depths is negative, a 0 may be used. This data may be entered in a chart and/or plot (e.g., see FIG. 17a). A damage curve may also be determined or provided by a user (e.g., using the building type) (e.g., see FIG. 17b). Using the data from the flood frequency versus flood elevation table (FIG. 17a), the flood damage curve (FIG. 17b), and the property value, the flood frequency versus flood damage curve (FIG. 17c) can be calculated. For example:

Flood damage at flood frequency=total property point value*% of Damage at the related flood depth In some embodiments, this information may be used to calculate the average annual loss for the property point. For example:

average annual loss for the property point=SUM(probability that a flood event occurs*the associated loss where SUM may be a summation over several flood events. FIG. 17d also shows a relationship between calculated loss value and flood frequency. FIG. 18a illustrates an embodiment of a distribution for average annual loss and FIG. 18b illustrates an embodiment of a chart calculating an average annual loss. Sample average annual loss 1801 is shown as a line on the annual aggregate loss with a standard deviation 1803. The probable maximum loss may equal the maximum associated loss for the property point due to flood (e.g., 53,345,000). This may represent the largest economic loss likely to occur for a given policy or a set of policies when a catastrophic flood event occurs. For a commercial property, this may represent an estimate of the largest loss that a building or a business in the building is likely to suffer. In some embodiments, the potential premium for the property point may equal the average annual loss plus a risk load plus an expense load where the risk load may be a number representing the uncertainty of the average annual loss (e.g., risk of damage to a levee or dam, inaccuracy in the flood model, etc.). The expense load may equal the expenses of administering a flood insurance program and other fees.

In some embodiments, an adjustment rate may be calculated to adjust the average annual loss by an adjustment rate representative of other factors. For example:

adjusted average annual loss=average annual loss*(1+ adjustment rate)

In some embodiments, several different associated adjustment scores may be used to adjust the average annual loss. In some embodiments, a cap may be applied to the adjustment scores. For example, adjusted average annual loss=average annual loss*(1+ adjustment cap*sum(associated adjustment scores)/maximum possible sum of the adjustment scores)

As an example (e.g., as seen in FIG. 19), a flood risk rating may be assigned as follows: if the property point is impacted by 2-10 year flood, the flood risk rating may be 6.0 (there may be some repetitive loss associated with the property point); if the property point is impacted by 10-50 year flood, the flood risk rating may be 5.0 (there may be some potential repetitive loss associated with the property point); if the property point is impacted by 50-100-year flood, the flood risk rating may be 4.0; if the property point is impacted by 100-200 year flood, the flood risk rating may be 3.0; if the property point is impacted by 200-500-year flood, the flood risk rating may be 2.0; if the property point is impacted by 500-1000 year flood, the flood risk rating may be 1.0; if the property point is not impacted by flood, the flood risk rating may be 0. Other flood risk ratings are also possible. Other risk adjustments are also contemplated. For example, if the property point could be impacted by damage to a levee, add 1.0 risk adjustment to the total flood risk rating (the probability of damage to a levee could increase the overall possibility of flooding); if the property point could be impacted by damage to a dam, add 0.5 risk adjustment to the total flood risk rating (the probability of damage to a dam could increase the overall possibility of flooding); if the property point could be impacted by hurricanes, add 1.0 risk adjustment to the total flood risk rating; if the property point could be impacted by a landslide, add 0.5 risk adjustment to the total flood risk rating; if the property point could be impacted by a tsunami, add 0.5 risk adjustment to the total flood risk rating; if the property point could be impacted by flash flooding, add 0.5 risk adjustment to the total flood risk rating. Other risk adjustments are also possible. In some embodiments, the adjustment rate may equal the flood risk rating divided by 10. Other flood risk ratings and divisors are also contemplated. In some embodiments, the flood risk ratings and adjustment rates may be modifiable (e.g., by an insurance company).

In some embodiments, a system may be provided to perform one or more methods described herein. The system could be a web-based system that integrates multiple geospatial datasets, flood damage computation, and the flood risk rating. The system may generate a flood risk assessment report with commercial property information, including a property point address and company information. The report may further include the 100-year and 500-year flood determination, a FEMA flood zone map, ground elevation of the commercial building, property point values (including contents, equipment, etc.) for the commercial building, flood frequency versus flood elevation curve, flood frequency versus flood loss curve, average annual loss, probable maximum loss, flood risk rating, historical hazard events for the property point, and a reporting date. The report may be delivered to a client through a web service (e.g., through Extensible Markup Language (XML)).

Figures 20, 21:
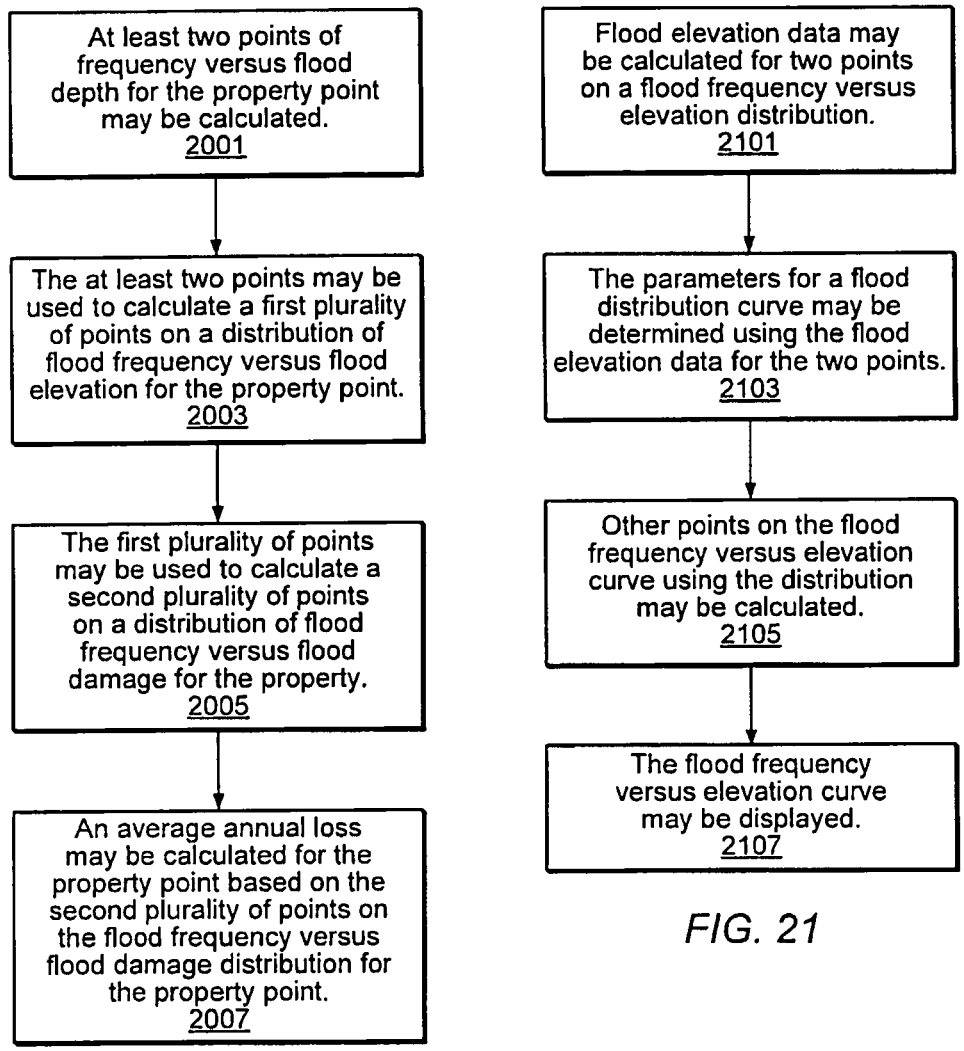
FIG. 20 illustrates an embodiment of a method for calculating the average annual loss due to flooding at a property point.
FIG. 21 illustrates an embodiment of a method for using flood elevation data to calculate a distribution for flood frequency versus flood elevation.

FIG. 20 illustrates an embodiment of a method for calculating the average annual loss due to flooding at a property point. It should be noted that in various embodiments of the methods described below, one or more of the elements described may be performed concurrently, in a different order than shown, or may be omitted entirely. Other additional elements may also be performed as desired.

At 2001, at least two points of flood frequency versus flood elevation for the property point may be calculated. These points may be derived, for example, from flood elevation lines on a flood map, from derived flood elevation lines on the flood map (e.g., derived from pre-existing flood elevation lines on the flood map), and/or gage station data near the property point.

At 2003, the at least two points may be used to calculate a first plurality of points (e.g., a curve) on a distribution of flood frequency versus flood elevation for the property point. For example, if flood elevation data exists for flood elevation lines on the 100-year flood boundary (frequency=0.01) and the 500-year flood boundary (frequency=0.002), this information may be used to calculate the distribution of flood frequency versus flood elevation for the property point. In some embodiments, the Log Pearson Type III distribution, the Log Normal distribution, and/or the Extreme Value Type I distribution may be used. Other distributions may also be used.

At 2005, the first plurality of points may be used to calculate a second plurality of points (e.g., a curve) on a distribution of flood frequency versus flood damage for the property point.

At 2007, an average annual loss may be calculated for the property point based on the second plurality of points on the flood frequency versus flood damage distribution for the property point (e.g., see FIG. 18*b*). Calculating the average annual loss may include weighting the calculated average annual loss with a flood risk rating determined for the property point. For example, the flood risk rating may be at least partially dependent on the flood frequency of flooding at the property point or whether the property point may be impacted by damage to a levee, damage to a dam, a hurricane, a storm surge, a landslide, a tsunami, or a flash flood. In some embodiments, the flood risk ratings may be adjustable to increase or decrease the relative effect on the annual average loss of the flood risk ratings. The effect of the flood risk ratings may also be capped.

FIG. 21 illustrates an embodiment of a method for using flood elevation data to calculate a distribution for flood frequency versus flood elevation. It should be noted that in various embodiments of the methods described below, one or more of the elements described may be performed concurrently, in a different order than shown, or may be omitted entirely. Other additional elements may also be performed as desired.

At 2101, flood elevation data may be calculated for two points on a flood frequency versus flood elevation distribution.

At 2103, the parameters for a flood distribution curve may be determined using the flood elevation data for the two points. The flood distribution may be selected from the Log Pearson Type III distribution, the Log Normal distribution, or the Extreme Value Type I distribution. Other distributions may also be used.

At 2105, other points on the flood frequency versus flood elevation curve may be calculated using the distribution.

At 2107, the flood frequency versus flood elevation curve may be displayed.

Figure 22:
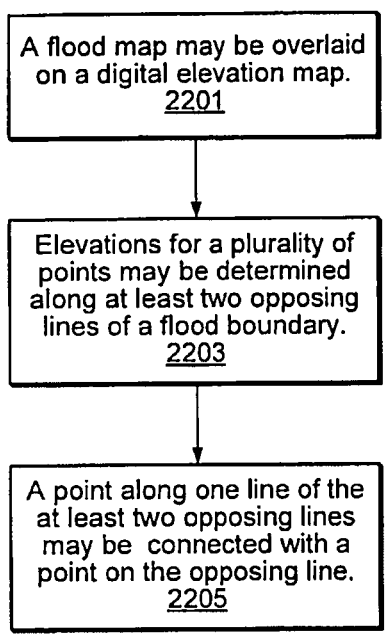
FIG. 22 illustrates an embodiment of a method for forming a flood elevation line by aligning elevations on a flood boundary.

FIG. 22 illustrates an embodiment of a method for forming a flood elevation line by aligning elevations on a flood boundary (e.g., see FIG. 7a). It should be noted that in various embodiments of the methods described below, one or more of the elements described may be performed concurrently, in a different order than shown, or may be omitted entirely. Other additional elements may also be performed as desired.

At 2201, a flood map may be overlaid on a digital elevation map. For example, the flood map and the digital elevation map may be aligned (e.g., geographically aligned).

At 2203, elevations for a plurality of points (e.g., elevation points 609) may be determined along at least two opposing lines of a flood boundary (e.g., 100-year flood boundary 601) on the flood map.

At 2205, a point along one line of the at least two opposing lines may be connected with a point on the opposing line. The points may not actually be on the opposing lines, but may be near the opposing lines. The two connected points may be approximately the same elevation. In some embodiments, a line connecting the two points may be substantially perpendicular to the flood source line feature (e.g., centerline 607). In some embodiments, the points may not be physically connected with a line, but may instead be connected by association with each other (e.g., in a database).

Figure 23:
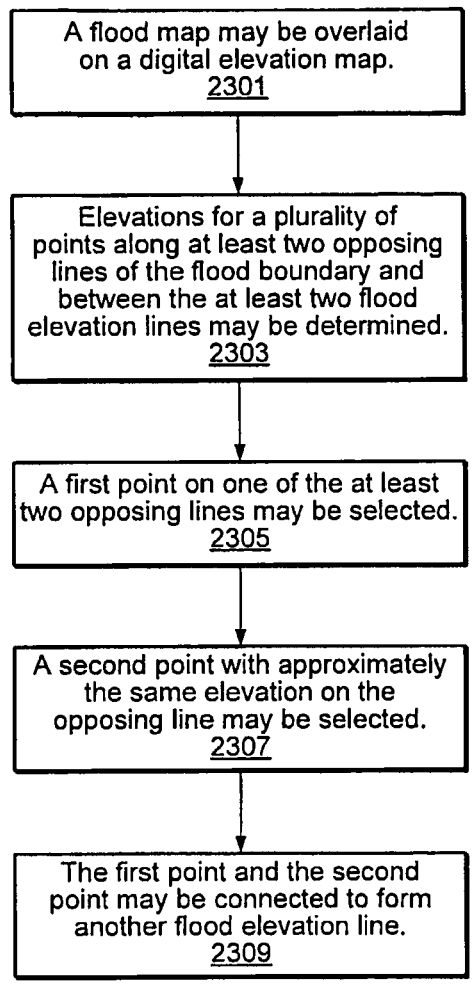
FIG. 23 illustrates an embodiment of a method for forming a flood elevation line based on a pre-existing flood elevation lines.

FIG. 23 illustrates an embodiment of a method for forming a flood elevation line based on pre-existing flood elevation lines (e.g., see FIG. 12). It should be noted that in various embodiments of the methods described below, one or more of the elements described may be performed concurrently, in a different order than shown, or may be omitted entirely. Other additional elements may also be performed as desired.

At 2301, a flood map may be overlaid on a digital elevation map. The flood map may have at least two pre-existing flood elevation lines (which may be BFEs) for a flood boundary.

At 2303, elevations for a plurality of points along at least two opposing lines 1003a,b of the flood boundary and between the at least two pre-existing flood elevation lines (e.g., flood elevation lines 1206a,b) may be determined. The plurality of points on a line of the flood boundary may be approximately equally spaced vertically based on the slope of the two pre-existing flood elevation lines. For example, the slope may be calculated as the upstream flood elevation (corresponding to the upstream flood elevation line such as flood elevation line 1206a)–downstream flood elevation (corresponding to the downstream flood elevation line such as flood elevation line 1206b)/the distance between the intersection of the upstream flood elevation line and the centerline 1007 and the intersection of the downstream flood elevation line and the centerline 1007. The slope may thus provide change in elevation/distance. The plurality of points may thus be equally spaced (e.g., along opposing lines 1003a,b which may or may not be present) at equal increments of slope. For example, if the slope is 100 to/2000 m, 9 points may be distributed along a flood boundary every 10 m/200 m (with an approximate 10 m change in elevation between points and the points approximately spaced 200 m apart).

At 2305, a first point 1223c on one of the at least two opposing lines (e.g., flood boundary line 1003a) of the flood boundary may be selected.

At 2307, a second point 1223g with approximately the same elevation on the opposing line (e.g., flood boundary line 1003b) may be selected. The second point 1223g may include a point placed on the opposing line at 2303. For example, if the first point 1223c is the third next point (as placed at 2303) on one of the opposing lines, the second point 1223g may be the third next point (as placed in 2303) on the other opposing line. In some embodiments, the second point 1223g may be searched for such that a line passing through the first point 1223c and a region of the second point 1223g may have a slope associated with at least one of the slopes of the pre-existing flood elevation lines (e.g., the slope between the first point 1223c and the second point 1223g may be approximately the same slope as a pre-existing flood elevation line or may be a weighted slope (e.g., using the distance from the first point 1223c to each of the two pre-existing flood elevation lines and the slopes of each of the two pre-existing flood elevation lines)). In some embodiments, the second point 1223g may be searched for such that a line passing through the first point 1223c and a region of the second point 1223g may be substantially perpendicular to the centerline 1007 (at the point the line intersects the centerline 1007).

At 2309, the first point 1223c and the second point 1223g may be connected to form another flood elevation line 1206c.

Figure 24A:
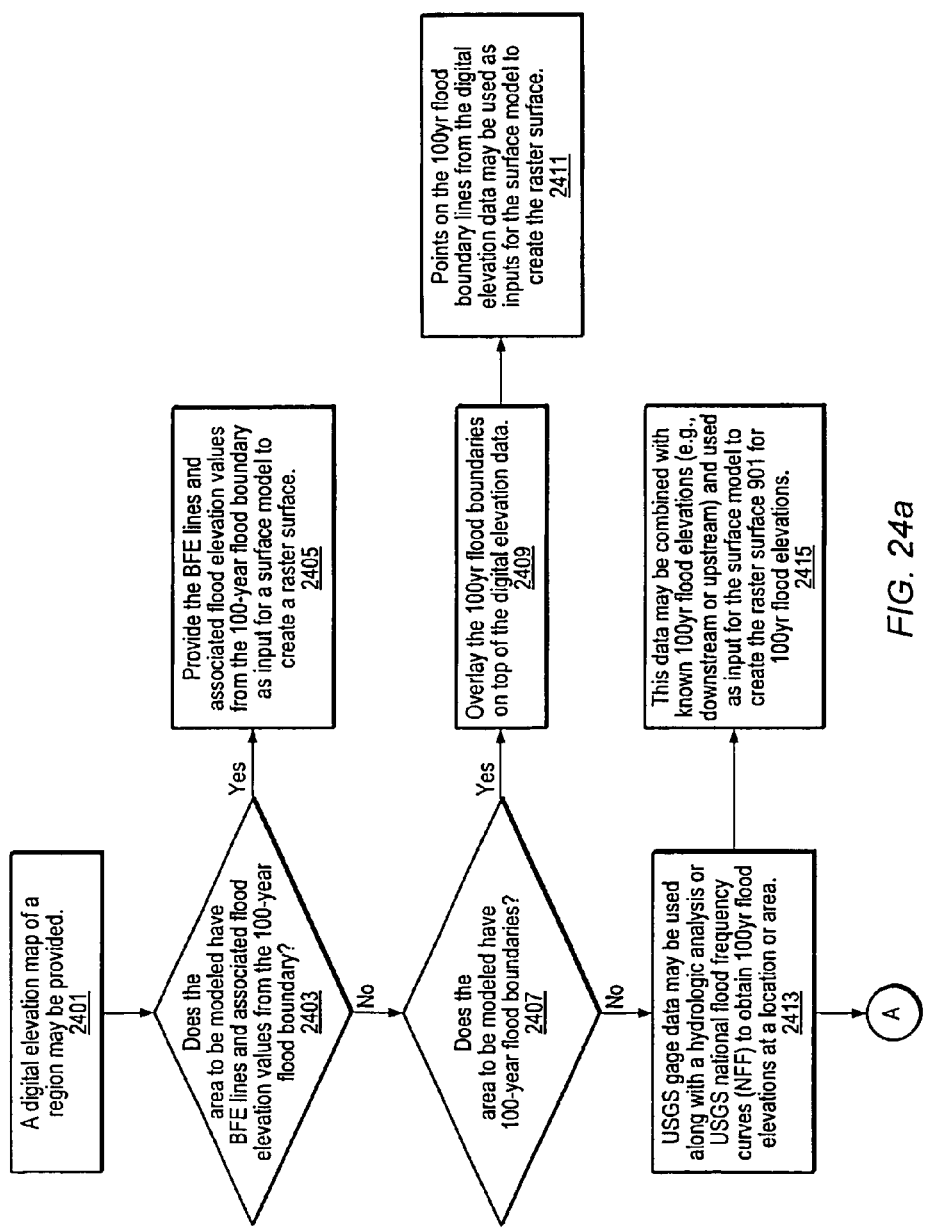
FIG. 24a-b illustrates an embodiment of a method for forming a raster surface based on flood elevations.
Figure 24B:
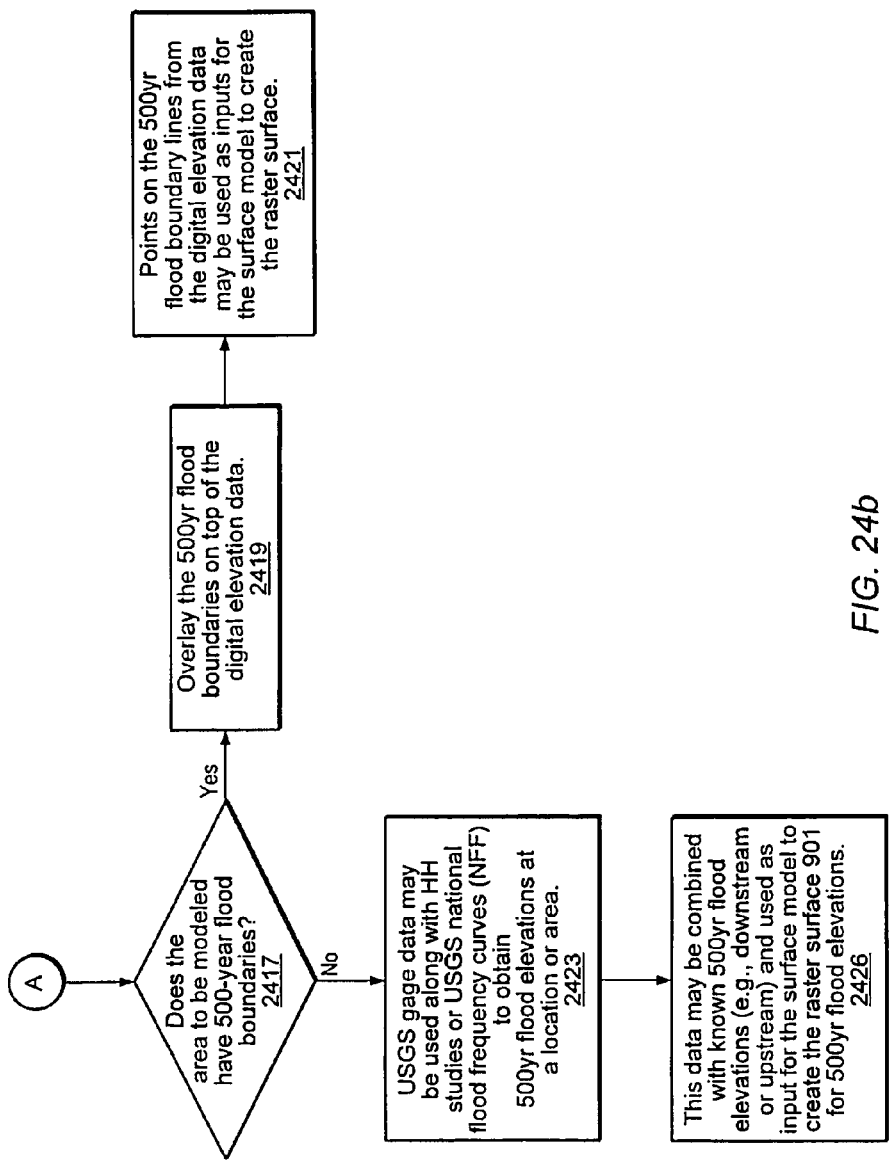

FIGS. 24a-b illustrate an embodiment of a method for forming a raster surface (e.g., see FIG. 9) based on flood elevations. It should be noted that in various embodiments of the methods described below, one or more of the elements described may be performed concurrently, in a different order than shown, or may be omitted entirely. Other additional elements may also be performed as desired.

At 2401, a digital elevation map of a region (e.g., an area to be modeled) may be provided.

At 2403, a determination may be made as to whether an area to be modeled has line features and associated flood elevation values from the 100-year flood boundary.

At 2405, if the area has line features and associated flood elevation values from the 100-year flood boundary, the flood elevation lines and associated flood elevation values from the 100-year flood boundary may be provided as input for a surface model (such as a TIN surface) to create a raster surface.

At 2407, if the area does not have flood elevation lines and associated flood elevation values from the 100-year flood boundary, a determination may be made as to whether the area has 100-year flood boundaries.

At 2409, if the area has 100-year flood boundaries, the 100-year flood boundaries may be overlaid on top of the digital elevation data (e.g., overlaid on the digital elevation map), and at 2411, points on the 100-year flood boundary lines (e.g., the point elevations) from the digital elevation data may be used as inputs for the surface model to create the raster surface for the 100-year flood elevations.

At 2413, if the area does not have 100-year flood boundaries, USGS gage data may be used along with an HH study or USGS national flood frequency curves (NFF) to obtain 100-year flood elevations at a location or area. At 2415, this data may be combined with known 100-year flood elevations (e.g., downstream or upstream) and used as input for the surface model to create the raster surface 901 for 100-year flood elevations.

At 2417, a determination may be made as to whether the area has 500-year flood boundaries.

At 2419, if the area has 500-year flood boundaries, the 500-year flood boundaries may be overlaid on top of the digital elevation data (e.g., overlaid on the digital elevation map), and at 2421, points on the 500-year flood boundary lines (e.g., the point elevations) from the digital elevation data may be used as inputs for the surface model to create the raster surface for the 500-year flood elevations.

At 2423, if the area does not have 500-year flood boundaries, USGS gage data may be used along with an HH study or USGS national flood frequency curves (NFF) to obtain 500-year flood elevations at a location or area. At 2425, this data may be combined with known 500-year flood elevations (e.g., downstream or upstream) and used as input for the surface model to create the raster surface 901 for 500-year flood elevations.

Figure 25:
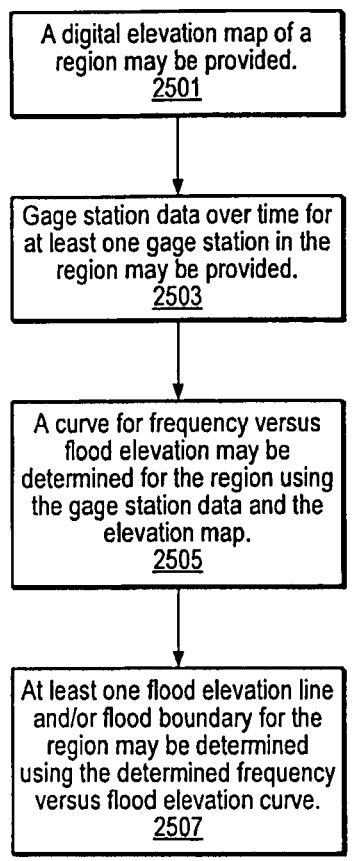
FIG. 25 illustrates an embodiment of a method for forming a flood elevation line based on gage station data.

FIG. 25 illustrates an embodiment of a method for forming a flood elevation line (e.g., a BFE) and/or a flood boundary based on gage station data (e.g., see FIGS. 8a-b). In some embodiments, if the 100-year flood boundaries and/or the 500-year flood boundaries are not provided, gage station data may be used to form one or more of these boundaries. This data may also be used to provide corresponding flood elevation lines. It should be noted that in various embodiments of the methods described below, one or more of the elements described may be performed concurrently, in a different order than shown, or may be omitted entirely. Other additional elements may also be performed as desired.

At 2501, a digital elevation map of a region may be provided.

At 2503, gage station data over time for at least one gage station in the region may be provided (e.g., see gage station data in FIG. 38b). In some embodiments, a USGS map (e.g., a USGS Hydrologic Unit Code Map) may be used to determine the hydraulic unit code for the region (e.g., by entering a geocoded point for the region or address). The gage stations assigned to that hydraulic unit code may then be used.

At 2505, a curve for flood frequency versus flood elevation may be determined for the region using the gage station data and the digital elevation map. For example, a statistical and hydrologic analysis may be applied to data from the indicated gage station(s). (As another example, see FIG. 38b and accompanying description above).

At 2507, at least one flood elevation line and/or flood boundary for the region may be determined using the determined flood frequency versus flood elevation curve. For example, the 100-year flood elevation line (corresponding to the determined 100 year flood elevation for a property point in the region) and/or the 500-year flood elevation line (corresponding to the determined 500 year flood elevation for the property point) may be provided for a property point by using the determined flood frequency versus flood elevation curve. In some embodiments, several flood elevation lines may be used to construct the corresponding flood boundary (e.g., by connecting the adjacent ends of corresponding flood elevation lines to form corresponding flood boundaries).

Figure 26:
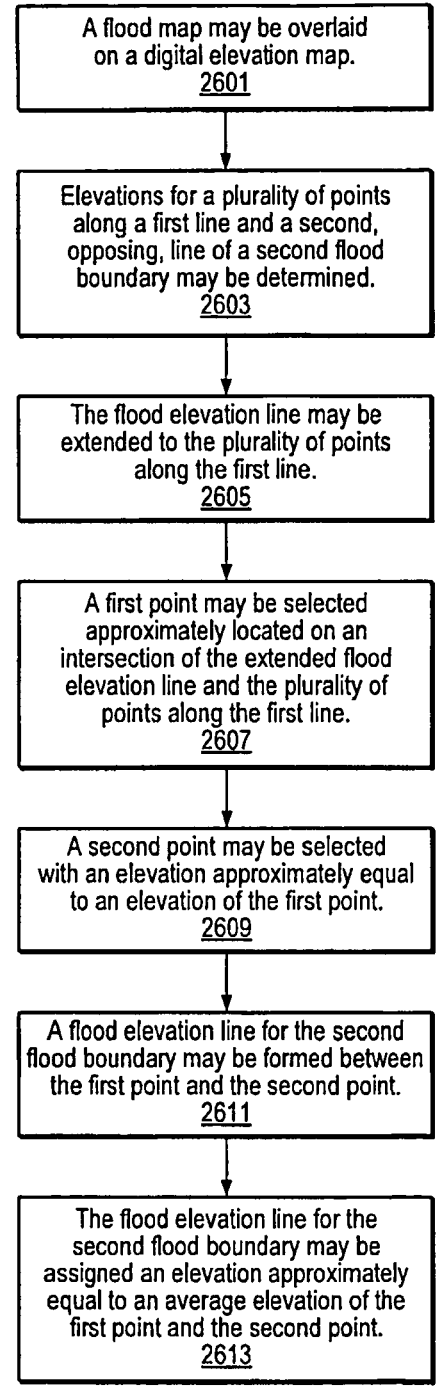
FIG. 26 illustrates an embodiment of a method for forming a flood elevation line by extending a pre-existing elevation line.

FIG. 26 illustrates an embodiment of a method for forming a flood elevation line by extending a pre-existing flood elevation line (e.g., forming a 500-year flood elevation line by extending a BFE) (e.g., see FIG. 10). It should be noted that in various embodiments of the methods described below, one or more of the elements described may be performed concurrently, in a different order than shown, or may be omitted entirely. Other additional elements may also be performed as desired.

At 2601, a flood map with a flood elevation line 1005a for a first flood boundary 1001 (e.g., a BFE 1005a for a 100-year flood boundary 1001) may be overlaid on a digital elevation map.

At 2603, elevations for a plurality of points along a first line 1003a and a second, opposing, line 1003b of a second flood boundary (e.g., opposing lines of the second flood boundary 1003) may be determined.

At 2605, the flood elevation line 1005a may be extended to the plurality of points along the first line 1003a. The flood elevation line 1005a may be extended along approximately the same direction as the flood elevation line (e.g., a BFE) for the first flood boundary.

At 2607, a first point may be selected approximately located on an intersection of the extended flood elevation line 1006a and the flood boundary 1003 (e.g., comprised of a plurality of points along the first line). The elevation value may be taken from the digital elevation dataset at the intersection point. For example, the closer of points 1023a or 1023d to intersection point 1033a may be used. In some embodiments, a point at intersection 1033a may be used as the first point.

At 2609, a second point may be selected with an elevation approximately equal to an elevation of the first point. The second point may be approximately at an intersection of the extended flood elevation line 1006a and the plurality of points along the second line 1003b. The second point may be chosen to have an elevation approximately equal to the first point elevation. For example, the point (between either point 1023c or 1023d) with the closest elevation to the first point may be selected as the second point.

At 2611, a flood elevation line 1006a for the second flood boundary 1003 may be formed between the first point and the second point.

At 2613, the flood elevation line for the second flood boundary may be assigned an elevation approximately equal to an average elevation of the first point and the second point.

Figure 27:
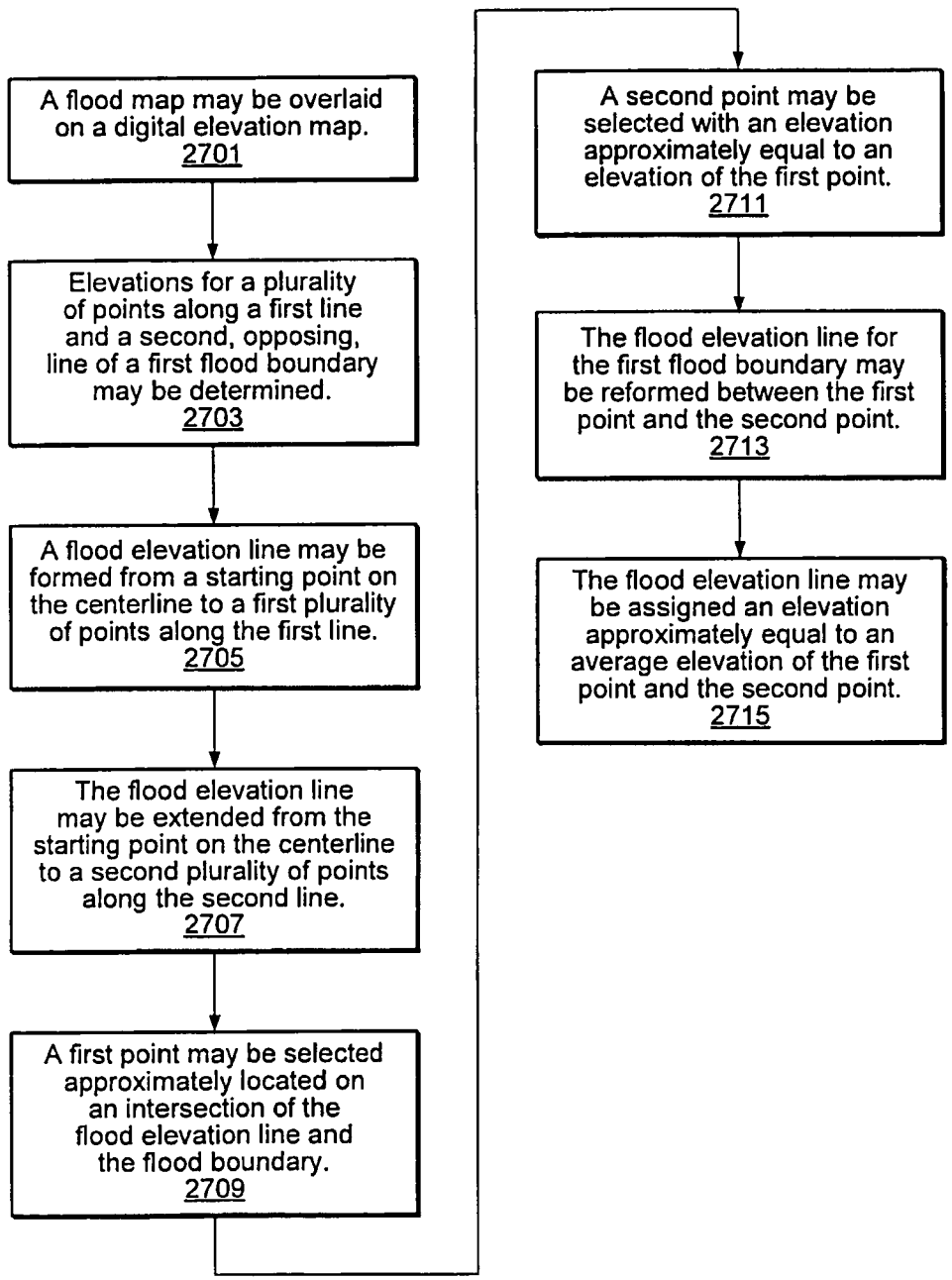
FIG. 27 illustrates an embodiment of a method for forming a base flood elevation line by using a centerline.

FIG. 27 illustrates an embodiment of a method for forming a flood elevation line by using a centerline (e.g., see FIG. 11). It should be noted that in various embodiments of the methods described below, one or more of the elements described may be performed concurrently, in a different order than shown, or may be omitted entirely. Other additional elements may also be performed as desired.

At 2701, a flood map with a centerline 1007 may be overlaid on a digital elevation map.

At 2703, elevations for a plurality of points along a first line 1003a and a second, opposing, line 1003b of a first flood boundary 1003 may be determined.

At 2705, a flood elevation line 1105a may be formed from a starting point on the centerline 1007 to a first plurality of points along the first line 1003a. The flood elevation line 1105a may be formed substantially perpendicular to the centerline 1007 at the starting point on the centerline 1007. At 2707, the flood elevation line 1105a may be extended from the starting point on the centerline 1007 to a second plurality of points along the second line 1003b. The flood elevation line 1105a may be extended substantially perpendicular to the centerline 1007 at the starting point on the centerline 1007. For example, the flood elevation line 1105a may be substantially perpendicular to the centerline 1007 at the location where the flood elevation line 1105a crosses the centerline 1007.

At 2709, a first point may be selected approximately located on an intersection of the flood elevation line 1105a and flood boundary 1003 (e.g., the plurality of points along the first line 1003a).

At 2711, a second point may be selected with an elevation approximately equal to an elevation of the first point. The second point is approximately at an intersection of the extended flood elevation line 1105a and the second plurality of points (e.g., along second line 1003b).

At 2713, the flood elevation line 1105a for the first flood boundary 1003 may be reformed between the first point and the second point.

At 2715, the flood elevation line 1105a may be assigned an elevation approximately equal to an average elevation of the first point and the second point.

Figure 28:
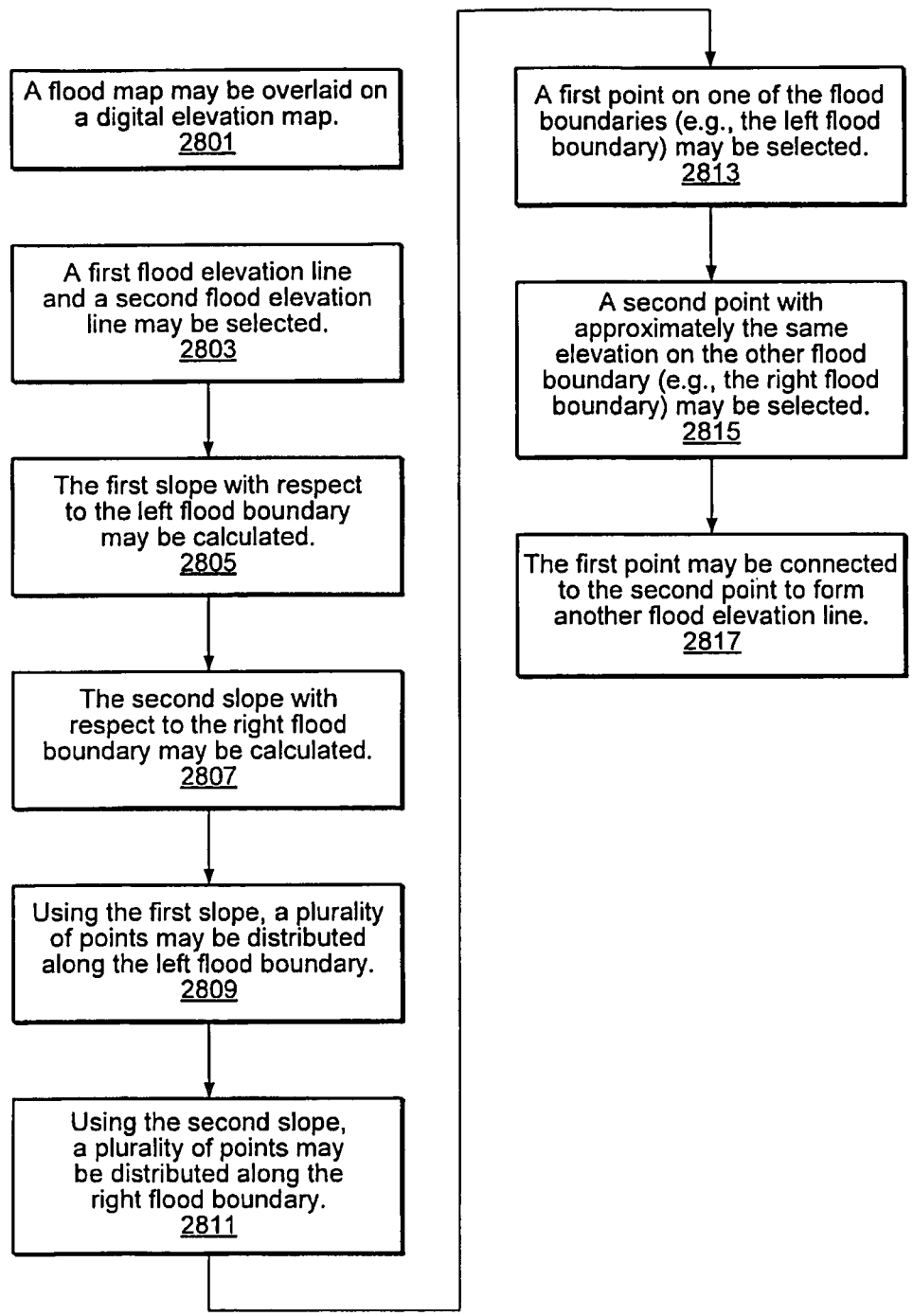
FIG. 28 illustrates an embodiment of a method for using two perimeter flood elevation lines for forming subsequent intermediary flood elevation lines.

FIG. 28 illustrates an embodiment of a method for using two perimeter flood elevation lines for forming subsequent intermediary flood elevation lines (e.g., see FIG. 12). It should be noted that in various embodiments of the methods described below, one or more of the elements described may be performed concurrently, in a different order than shown, or may be omitted entirely. Other additional elements may also be performed as desired.

At 2801, a flood map may be overlaid on a digital elevation map.

At 2803, a first flood elevation line 1206a and a second flood elevation line 1206b may be selected. In some embodiments, the first flood elevation line 1206a may be an upstream flood elevation line and the second flood elevation line 1206b may be a downstream flood elevation line. The first flood elevation line 1206a and the second flood elevation line 1206b may intersect respective flood boundaries. For example, the first flood elevation line 1206a may intersect the left flood boundary 1003a at point 1223a and the right flood boundary 1003b at point 1223b. The second flood elevation line 1206b may intersect the left flood boundary 1003a at point 1223e and the right flood boundary 1003b at point 1223f. At 2805, the first slope with respect to the left flood boundary 1003a may be calculated. For example, the slope may be calculated as the upstream flood elevation (corresponding to the upstream flood elevation line 1206a)–downstream flood elevation (corresponding to the downstream flood elevation line 1206b)/the distance between point 1223a and 1223e (distance along the left flood boundary line 1003a). The slope may thus provide change in elevation/distance corresponding to the left flood boundary line 1003a.

At 2807, the second slope with respect to the right flood boundary 1003b may be calculated. For example, the second slope may be calculated as the upstream flood elevation (corresponding to the upstream flood elevation line 1206a)–downstream flood elevation (corresponding to the downstream flood elevation line 1206b)/the distance between point 1223b and 1223f (distance along the right flood boundary line 1003b). The slope may thus provide change in elevation/distance corresponding to the right flood boundary line 1003b.

At 2809, using the first slope, a plurality of points may be distributed along the left flood boundary 1003a. The plurality of points may be equally spaced along the left flood boundary 1003a at equal increments of slope. For example, if the slope is 100 m/2000 m (flood elevation change/distance), 9 points may be distributed along the left flood boundary 1003a every 10 m/200 m (with an approximate 10 m change in elevation between points and the points approximately spaced 200 m apart).

At 2811, using the second slope, a plurality of points may be distributed along the right flood boundary 1003b. The plurality of points may be equally spaced along the right flood boundary 1003b at equal increments of slope. For example, if the slope is 120 m/2200 m (flood elevation change/distance), 9 points may be distributed along the right flood boundary 1003b every 12 in/220 m (with an approximate 10 m change in elevation between points and the points approximately spaced 200 m apart).

At 2813, a first point 1223c on one of the flood boundaries (e.g., the left flood boundary 1003a) may be selected.

At 2815, a second point 1223g with approximately the same elevation on the other flood boundary (e.g., the right flood boundary 1003b) may be selected. The second point 1223g may include a point placed on the boundary line at 2811. For example, if the first point 1223c is the third next point (as placed at 2809) on the left flood boundary 1003a, the second point 1223g may be the third next point (as placed in 2811) on the other opposing line (e.g., right flood boundary 1003b). In some embodiments, the second point 1223g may be searched for such that a line passing through the first point 1223c and a region of the second point 1223g may have a slope associated with at least one of the slopes of the pre-existing flood elevation lines (e.g., the slope between the first point 1223c and the second point 1223g may be approximately the same slope as a pre-existing flood elevation line or may be a weighted slope (e.g., using the distance from the first point 1223c to each of the two pre-existing flood elevation lines and the slopes of each of the two pre-existing flood elevation lines)). In some embodiments, the second point 1223g may be searched for such that a line passing through the first point 1223c and a region of the second point 1223g may be substantially perpendicular to the centerline 1007.

At 2817, the first point 1223c may be connected to the second point 1223g to form another flood elevation line 1206c.

In some embodiments, elevations for a plurality of points along at least two opposing lines of a flood boundary may be determined (the points of the plurality of points on a line of the flood boundary may be approximately equally spaced between the first and second flood elevation lines 1206a,b (e.g., BFEs)). A first flood elevation line 1206a (having a first slope) may be formed by connecting a first point 1223a along one line of the at least two opposing lines with a second point 1223b on the opposing line. The first point 1223a and second point 1223b may be approximately the same elevation. A second flood elevation line 1206b (having a second slope) may be formed by connecting a third point 1223e along one line of the at least two opposing lines with a fourth point 1223f on the opposing line. The third point 1223e and fourth point 1223f may be approximately the same elevation. The elevations for a plurality of points along the at least two opposing lines of the flood boundary and between the first and second flood elevation lines may be determined. In some embodiments, the elevations may be displayed. A fifth point 1223c may be selected on one of the at least two opposing lines. In some embodiments, a sixth point 1223g with approximately the same elevation on the opposing line may be searched for such that a line passing through the fifth point 1223c and a region of the sixth point 1223g may have approximately a slope (weighted_slope) equal to a sum of a weighted value of the first slope plus a weighted value of the second slope. The weighted values of the first slope and the second slope may depend on their proximity to the fifth point 1223c. For example, the weighted_slope may calculated as follows (where dist_sec_elev=distance from the second flood elevation line and disc first elev=distance from the first flood elevation line):

$$\text{weighted\_slope} = \frac{\text{dist\_sec\_elev}}{\text{dist\_first\_elev} + \text{dist\_sec\_elev}} * \text{first\_slope} +$$

$$\frac{\text{dist\_first\_elev}}{\text{dist\_first\_elev} + \text{dist\_sec\_elev}} * \text{sec\_slope}$$

FIG. 29 illustrates an embodiment of a method for forming a flood elevation line for a property point between two pre-existing base flood elevation lines (e.g., see FIG. 13). A flood elevation line through a property point may provide at least one point of flood frequency versus flood elevation. For example, the flood elevation line through the property point may correspond to a flood frequency (e.g., a 100 year flood elevation line through the property point) and may have a flood elevation associated with the flood elevation line. For example, a flood elevation line of 180 m (with each endpoint intersecting the 100 year flood boundary at the 180 m elevation) through the property point may correspond to a flood elevation of 180 m for the property point for a flood frequency of once every 100 years (0.01) for the property point. It should be noted that in various embodiments of the methods described below, one or more of the elements described may be performed concurrently, in a different order than shown, or may be omitted entirely. Other additional elements may also be performed as desired.

At 2901, a flood map, with a first flood elevation line 1306a with a first flood elevation and a second flood elevation line 1306b with a second flood elevation, may be overlaid on a digital elevation map.

At 2903, a property point 1341 may be provided between the first flood elevation line 1306a and the second flood elevation line 1306b.

At 2905, a first distance 1351a between the property point 1341 and the first flood elevation line 1306a may be determined.

At 2907, a second distance 1351b between the property point 1341 and the second flood elevation line 1306b may be determined.

At 2909, a property point flood elevation approximately equal to a weighted average of the first flood elevation (first elev) and the second flood elevation (sec_elev) may be determined. For example, if a total distance (total_dist) approximately equals the first distance (first_dist) plus the second distance (sec_dist), the weighted average (avg) for the property point flood elevation may be determined as follows:

$$avg = \left(\frac{\text{first\_dist}}{\text{total\_dist}}\right) * \text{sec\_elev} + \frac{\text{sec\_dist}}{\text{total\_dist}} \text{first\_elev}$$

Where avg=flood elevation for the property point 1341 (and, correspondingly, for a flood elevation line 1306c passing through the property point 1341.

FIG. 30 illustrates an embodiment of a method for forming a flood elevation line for a property point using two pre-existing flood elevation lines (e.g., see FIG. 15). It should be noted that in various embodiments of the methods described below, one or more of the elements described may be performed concurrently, in a different order than shown, or may be omitted entirely. Other additional elements may also be performed as desired.

At 3001, a flood map may be overlaid on a digital elevation map. In some embodiments, the flood map may include a first flood elevation line 1506c and a second flood elevation line 1506d for a first flood boundary 1001 (e.g., BFEs for a 100-year flood boundary) and a third flood elevation line 1506a and a fourth flood elevation line 1506b for a second flood boundary 1003 (e.g., flood elevation lines for a 500 year flood boundary).

At 3003, a property point 1541 may be provided between the third flood elevation line 1506a and the fourth flood elevation line 1506b.

At 3005, a first distance 1551a between the property point 1541 and the third flood elevation line 1506a may be determined.

At 3007, a second distance 1551b between the property point 1541 and the fourth flood elevation line 1506b may be determined. At 3009, a flood elevation for the property point 1541 relative to the first flood boundary 1001 may be determined as approximately equal to a weighted average of the first flood elevation (first_elev) (e.g., of the first flood elevation line 1506c) and the second flood elevation (sec_elev) (e.g., of the second flood elevation line 1506d). For example, if a total distance (total_dist) approximately equals the first distance (first_dist) plus the second distance (sec_dist), the weighted average may be determined as follows:

$$avg = \left(\frac{\text{first\_dist}}{\text{total\_dist}}\right) * \text{sec\_elev} + \frac{\text{sec\_dist}}{\text{total\_dist}} \text{first\_elev}$$

Where avg=flood elevation for the property point 1541 (and, correspondingly, for a flood elevation line passing through the property point 1541.

In some embodiments, if the flood map includes a centerline, the method may further include placing a dummy point on the centerline between the first base flood elevation line and the second base flood elevation line (e.g., see FIG. 15). The dummy point may be placed such that a ratio of the distance between the dummy point and the first base flood elevation line to the distance between the dummy point and the second base flood elevation line is approximately equal to the ratio of the distance between the first distance to the second distance.

Figure 31:
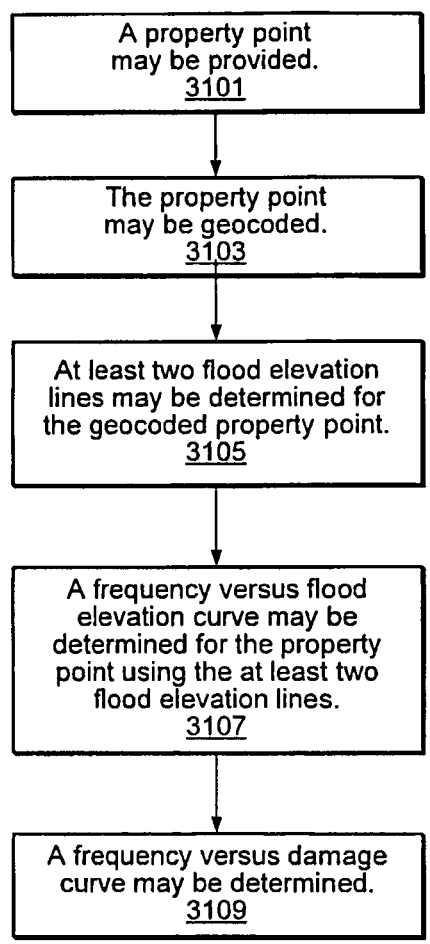
FIG. 31 illustrates an embodiment of a method for providing a flood risk assessment for a point.

FIG. 31 illustrates an embodiment of a method for providing a flood risk assessment for a point. It should be noted that in various embodiments of the methods described below, one or more of the elements described may be performed concurrently, in a different order than shown, or may be omitted entirely. Other additional elements may also be performed as desired.

At 3101, a property point may be provided.

At 3103, the property point may be geocoded (e.g., to provide an x,y coordinate for a digital elevation and/or flood map).

At 3105, at least two flood elevation lines may be determined for the geocoded property point (e.g., a BFE for the 100-year flood boundary and a flood elevation line for the 500-year boundary).

At 3107, a flood frequency versus flood elevation curve may be determined for the geocoded point using the at least two flood elevation lines.

At 3109, a flood frequency versus damage curve may be determined. For example, the user may provide flood elevation versus % damage and the value of the property point to be used with the flood frequency versus damage curve. In some embodiments, this information may be used to calculate the average annual loss (e.g., see FIG. 18b).

FIG. 32 illustrates an embodiment of a web-based method for providing a flood risk assessment for a point. It should be noted that in various embodiments of the methods described below, one or more of the elements described may be performed concurrently, in a different order than shown, or may be omitted entirely. Other additional elements may also be performed as desired.

At 3201, a property point may be entered into a web-based system (e.g., the address of a targeted portfolio may be entered into a web-based system). For example, the address of the property point may be entered by a client into an (Hyper Text Markup Language) HTML page provided by the web-based system when the client accesses the web-based system using a URL (Uniform Resource Locator).

At 3203, the property point may be geocoded (e.g., an x,y coordinate (such as a latitude/longitude)) by the system (e.g., by a web server).

At 3205, a determination may be made as to whether the property point is within a 100-year flood zone, a 500-year flood zone, or neither.

At 3207, if the property point is within the 100-year flood zone and/or the 500-year flood zone, the 100-year and 500-year flood elevations may be determined.

At 3209, the flood frequency versus elevation curve may be determined at the property point. In some embodiments, a plurality of points along the curve may be determined instead of actually drawing the curve.

At 3211, a flood frequency curve versus flood loss may be determined for the property point.

At 3213, if the property point is not within the 100-year flood zone and/or the 500-year flood zone, the system may determine the distances to the flood zones and the differences in flood elevations of these flood zones to calculate a weighted average for the property point.

At 3215, the information (including flood frequency curves, distances, elevations, etc.) may be provided to a flood hazard rating engine to determine a flood hazard rating corresponding to the information.

At 3217, the information may be used by a flood hazard rating engine to provide a flood risk assessment report. In some embodiments, other information may also be used to provide the report. The report may include, for example, commercial property information, including a property point address and company information, the 100-year and 500-year flood elevations, a FEMA flood zone map, ground elevation of the commercial building, property point values (including contents, equipment, etc.) for the commercial building, flood frequency versus flood elevation curve, flood frequency versus flood loss curve, average annual loss, probable maximum loss, flood risk rating, historical hazard events for the property point, and a reporting date. In some embodiments, the report may be provided as a downloadable file, an attachment in an email, or presented on screen for a user. Other report formats are also possible.

In various embodiments, prior to determining at least two points of flood elevation for flood frequency, available flood boundaries and/or flood elevation lines (e.g., from a flood map) may be redefined/corrected (e.g., by aligning/redrawing the flood boundaries and/or flood elevation lines on a digital elevation map). In some embodiments, endpoints of a flood elevation line feature (e.g., a BFE) created by previous flood studies may be adjusted to a 10 m or more accurate digital elevation map (e.g., see FIG. 33).

Figure 33A:
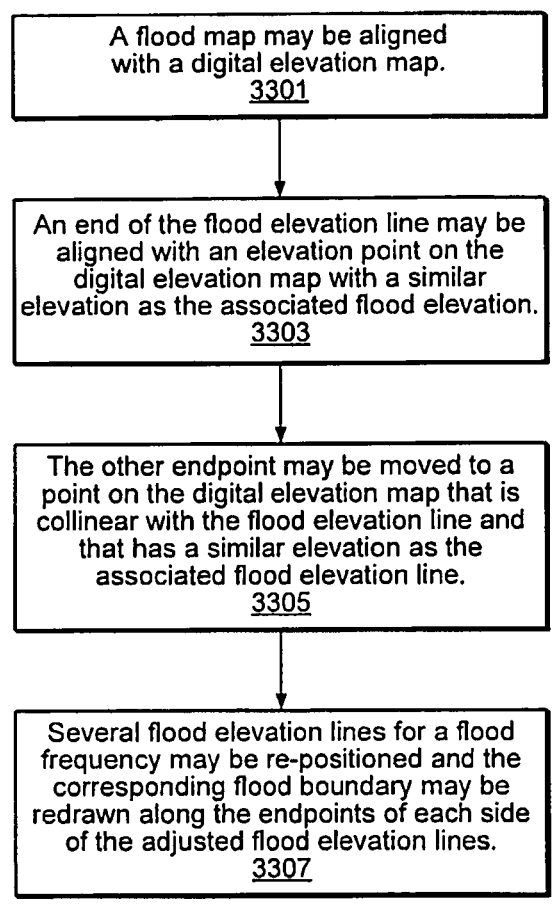
FIGS. 33a-b illustrates an embodiment of a method for correcting a flood elevation line.
Figure 33B:
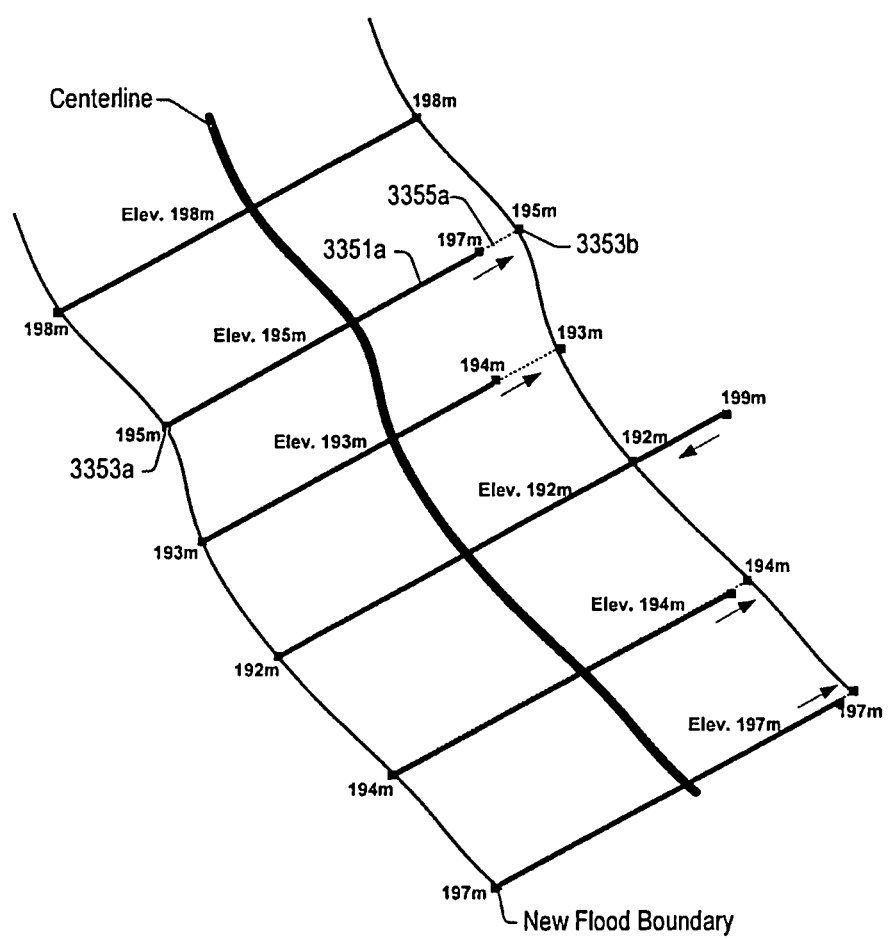

FIGS. 33*a-b* illustrates an embodiment of a method for correcting a flood elevation line. It should be noted that in various embodiments of the methods described below, one or more of the elements described may be performed concurrently, in a different order than shown, or may be omitted entirely. Other additional elements may also be performed as desired.

At 3301, a flood map may be aligned with a digital elevation map. For example, landmark features and/or set reference points may be aligned between the flood map and the digital elevation map (e.g., by overlaying these points on the flood map and digital elevation map). In some embodiments, the flood map may have at least one flood elevation line 3351*a* with two endpoints (a first endpoint 3353*a* and a second endpoint 3353*b*) and at least one associated flood elevation.

At 3303, an end (e.g., the first endpoint 3353*a*) of the flood elevation line 3351*a* may be aligned with an elevation point on the digital elevation map with a similar elevation as the associated flood elevation. For example, the elevation may be approximately the same or may be within a predetermined buffer distance (e.g., as set by a user).

At 3305, the other endpoint (e.g., the second endpoint 3353*b*) may be moved to a point on the digital elevation map that is collinear with the flood elevation line 3351*a* and that has a similar elevation as the associated flood elevation line 3351*a*. For example, the elevation of the moved second endpoint may be approximately the same or may be within a predetermined buffer distance (e.g., as set by a user). In some embodiments, a straight line object 3355*a* may be created using the second endpoint 3353*b* and an adjacent point (e.g., a closest point to the second endpoint 3353*b*) in the flood elevation line 3351*a*. The straight line object 3355*a* may then be expanded or collapsed until an elevation value from the digital elevation map matches the elevation value of the first endpoint 3353*a*. The second endpoint 3353*b* may then be moved to the new location with the similar elevation value as the first endpoint 3353*a*.

At 3307, several flood elevation lines for a flood frequency may be re-positioned and the corresponding flood boundary may be redrawn along the corrected endpoints of each side of the adjusted flood elevation lines. For example, if the corrected flood elevation lines correspond to the 100 year flood boundary, the endpoints of the corrected flood elevation lines may be connected (on either side of the flood source line feature) to create an adjusted flood boundary corresponding to the 100 year flood zone.

Figure 34:
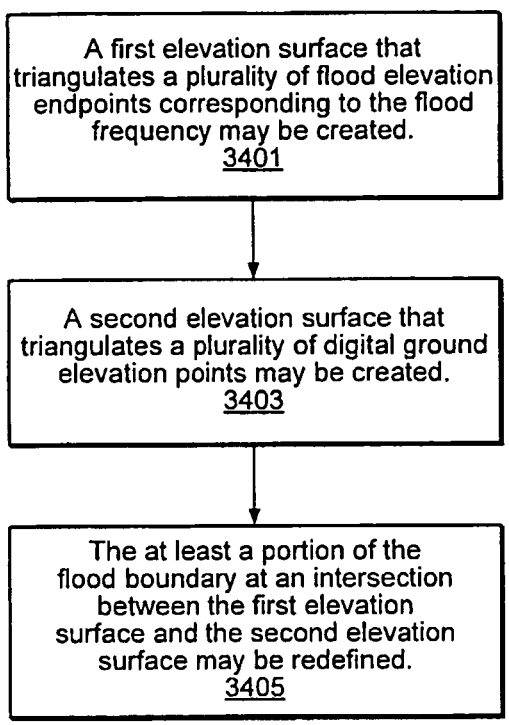
FIG. 34 illustrates an embodiment of a method for redefining at least a portion of a flood boundary.

FIG. 34 illustrates an embodiment of a method for redefining at least a portion of a flood boundary. It should be noted that in various embodiments of the methods described below, one or more of the elements described may be performed concurrently, in a different order than shown, or may be omitted entirely. Other additional elements may also be performed as desired.

At 3401, a first elevation surface (e.g., a TIN surface, grid surface, etc.) that triangulates a plurality of flood elevation line endpoints corresponding to the flood frequency may be created. In some embodiments, the plurality of flood elevation lines may be pre-defined (e.g., on a flood map) or may be formed using one of the methods described herein (e.g., FIG. 33*a*) to use in adjusting a flood boundary. Example TIN elevation surfaces may be seen in FIG. 36*b* (e.g., see TIN surfaces 3603 and 3601). In some embodiments, the surface may be defined by connecting endpoints on either side of the flood source line feature (e.g., without necessarily triangulating all of the endpoints). As with the other embodiments presented herein, the lines and surfaces may be actually drawn (e.g., manually and/or graphically), or may be represented by associations formed for corresponding data points (e.g., stored in a database). Other representations are also contemplated.

At 3403, a second elevation surface (e.g., a TIN surface, grid surface, etc.) that triangulates a plurality of digital ground elevation points may be created. For example, the second elevation surface may follow the ground surface.

At 3405, the at least a portion of the flood boundary at an intersection between the first elevation surface and the second elevation surface may be redefined. For example, the flood boundary may be formed along the points where the first elevation surface points intersect the second elevation surface (e.g., where the flood elevation line endpoints match the corresponding ground elevations).

Figure 35A:
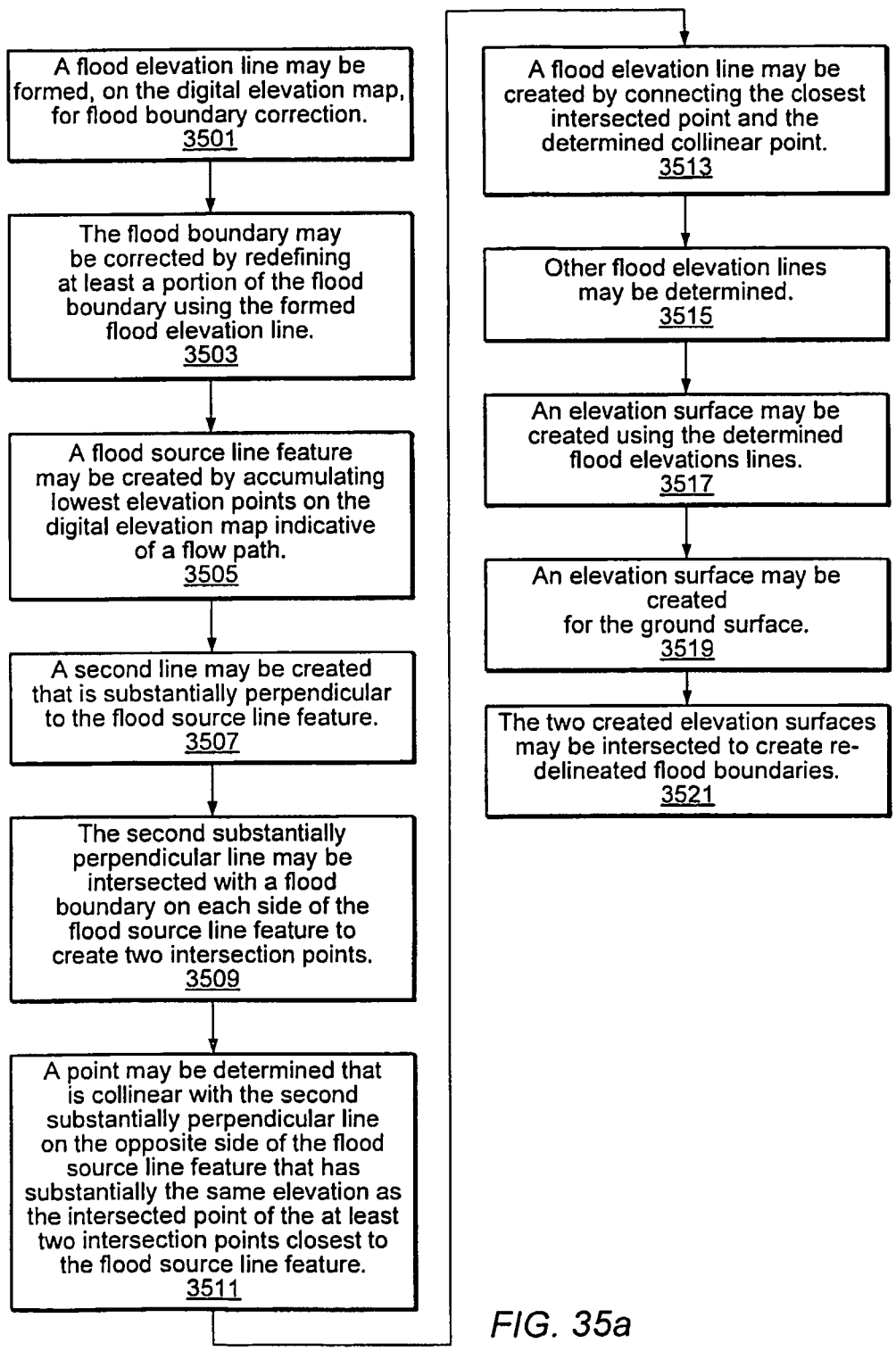
FIGS. 35a-b illustrates an embodiment of a method for correcting a flood boundary using a digital elevation map.
Figure 35B:
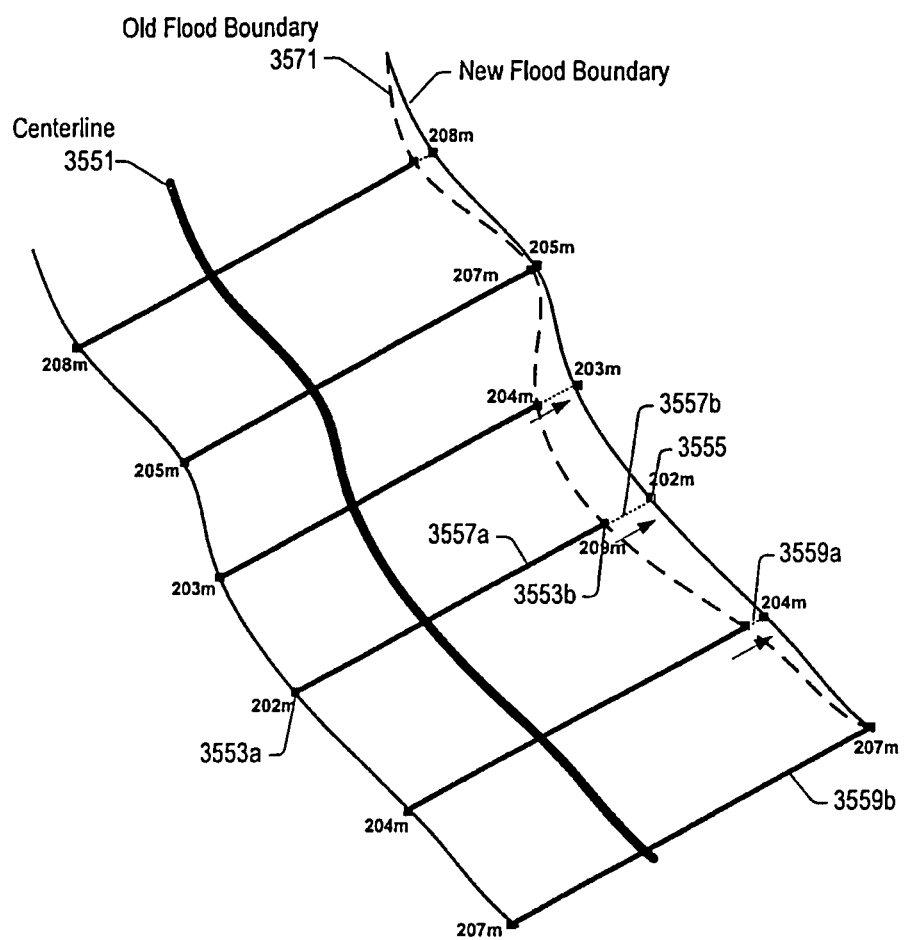

FIGS. 35*a-b* illustrate an embodiment of a method for correcting a flood boundary using a digital elevation map. For example, flood elevation lines may be created partially using existing flood boundaries, water source centerlines (or flow pass), and a digital elevation map (or other DEM dataset). This method may be used for FEMA designated "A" zones without existing flood elevation lines (such as BFEs). The method may also be used for other areas. It should be noted that in various embodiments of the methods described below, one or more of the elements described may be performed concurrently, in a different order than shown, or may be omitted entirely. Other additional elements may also be performed as desired.

At 3501, a flood elevation line may be formed, on the digital elevation map, for flood boundary correction. For example, the flood elevation line may be formed according to methods discussed above with respect to FIGS. 6-8*b*, 10-12, 14, etc.). Other flood elevation line formation techniques are also contemplated.

At 3503, the flood boundary 3571 may be corrected by redefining at least a portion of the flood boundary 3571 using the formed flood elevation line (e.g., see elements 3505-3513 below).

At 3505, a flood source line feature (e.g., centerline 3551) may be created by accumulating lowest elevation points on the digital elevation map indicative of a flow path. For example, river centerline elevation points (e.g., from a river centerline study area dataset or a computed flow path using a DEM dataset) may be used. Points corresponding to the lowest ground elevation points (e.g., along a line) may be connected and/or associated with a flow path (e.g., the ground elevation points for the floor of a river may be lower than ground elevation points along the river bank).

At 3507, a second line 3557*a* may be created that is substantially perpendicular to the flood source line feature 3551. Again, the substantially perpendicular line may be actually drawn, or an appropriate association for stored data points may be stored.

At 3509, the second substantially perpendicular line 3557*a* maybe intersected with a flood boundary on each side of the flood source line feature 3551 to create two intersection points (e.g., intersection points 3553*a,b*).

At 3511, a point 3555 may be determined that is collinear with the second substantially perpendicular line 3557*a* on the opposite side of the flood source line feature 3551 that has substantially the same elevation as the intersected point 3553*a* of the at least two intersection points closest to the flood source line feature 3551.

At 3513, a flood elevation line 3557*b* may be created by connecting the closest intersected point 3553*a* and the determined collinear point 3555. The line may actually be drawn or stored (e.g., recording the location and/or elevation (for example, from the DEM)). The flood elevation line 3557*b* may have a similar elevation at both endpoints 3553*a*, 3555.

At 3515, other flood elevation lines (e.g., 3559*a,b*) may be determined (e.g., at a distance interval of 100 feet). Other distance intervals are also contemplated.

At 3517, an elevation surface (e.g., a TIN surface, grid surface, etc.) may be created using the determined flood elevations lines (e.g., by using the endpoints of the flood elevation lines to define an elevation surface for the corresponding flood frequency).

At 3519, an elevation surface may be created for the ground surface (e.g., comprising the ground elevation points)

At 3521, the two created elevation surfaces may be intersected to create re-delineated flood boundaries (flood boundaries may occur at the intersection of the two surfaces).

FIG. 36 illustrates an embodiment of a method for determining flood frequency versus flood elevation points using three dimensional surfaces. It should be noted that in various embodiments of the methods described below, one or more of the elements described may be performed concurrently, in a different order than shown, or may be omitted entirely. Other additional elements may also be performed as desired.

At 3602, a first flood-frequency elevation surface 3601 may be defined. The flood-frequency elevation surface 3601 may be defined by respective elevation points of a water level during a flood at the respective frequency for the flood-frequency elevation surface. For example, the surface of the water during a 100 year flood may form the flood-frequency elevation surface 3601 for the 100 year flood frequency. In some embodiments, the edges of the flood-frequency elevation surface 3601 may correspond to the endpoints of the associated flood elevation lines corresponding to the designated flood frequency.

At 3604, a second flood frequency elevation surface 3603 maybe defined.

At 3606, a cross-section surface 3605 may be defined that passes through the property point 3607 and is substantially perpendicular to a flood source line feature (e.g., centerline 307). In some embodiments, the cross section 3605 may geospatially, hydrologically, and hydraulically link the property point 3607 to the flood source (e.g., centerline 307).

Figure 36B:
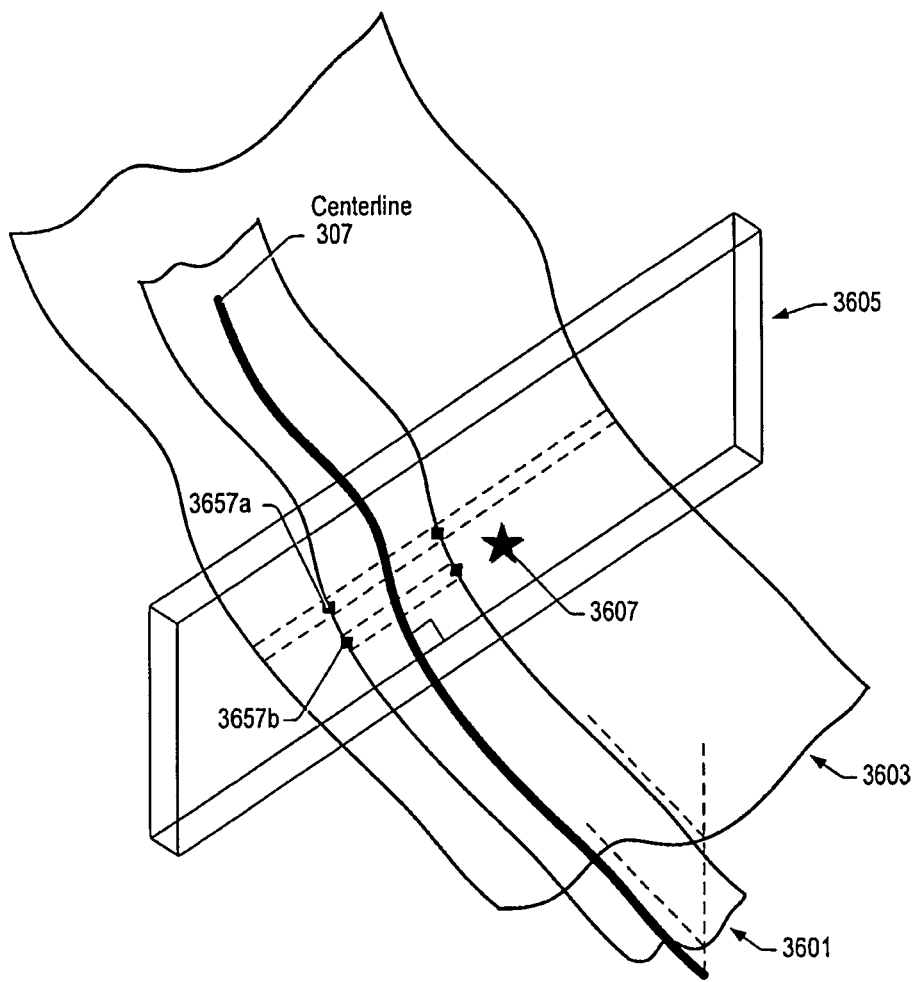

At 3608, the intersection points between the cross section surface 3605 and the flood frequency elevation surfaces 3601 and 3603 may provide the flood elevations for the corresponding flood frequencies (e.g., corresponding to the intersected flood frequency elevation surface). As seen in FIG. 36*b*, in some embodiments, two flood elevations at different flood frequencies for the property point 3607 may be derived from the flood-frequency elevation surfaces by using the elevation values at points, for example, where the first flood-frequency elevation surface 3601 and the second flood-frequency elevation surface 3603 (such as the 100 year flood elevation surface and the 500 year flood elevation surface) intersect with the cross section surface 3605 that is perpendicular to the flood source (e.g., centerline 307) where the property point 3607 is located. For example, intersection point 3657*a* (e.g., with elevation value of 198 m) between cross section 3605 and 500 year flood elevation surface 3603 may provide the elevation value at the corresponding 500 year flood frequency. Intersection point 3657*b* (e.g., with elevation value of 184 m) between cross section 3605 and 100 year flood elevation surface 3601 may provide the elevation value at the corresponding 100 year flood frequency. Intersecting lines among these three surfaces may provide flood elevation line features at different flood frequencies. In some embodiments, the flood frequency elevation surfaces may be generated based on elevation line features (e.g., BFEs) and a digital elevation map using a Triangulated Irregular Network method (e.g., see FIG. 34). Other techniques for generating the flood frequency elevation surfaces are also contemplated.

Figure 37B:
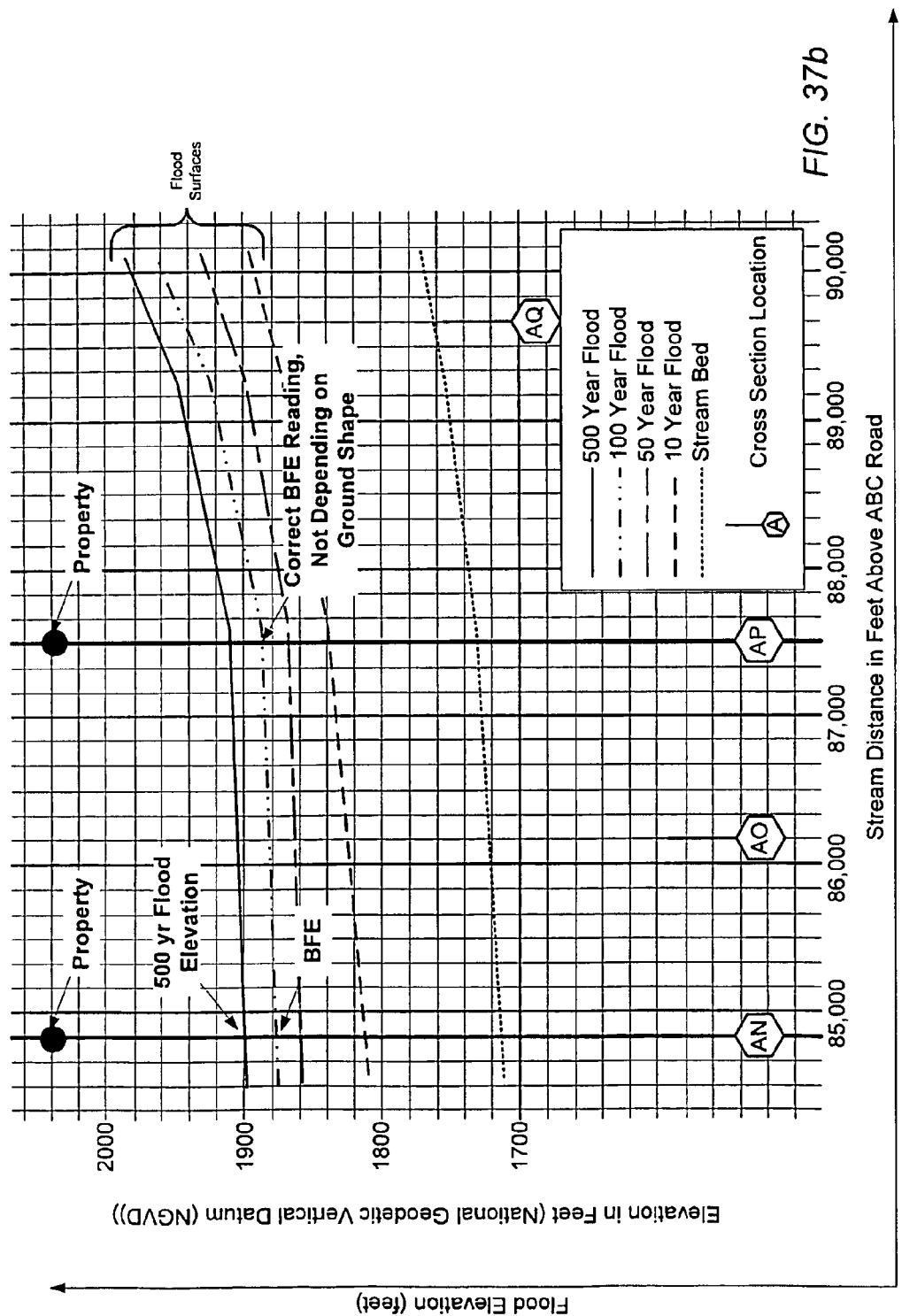
FIG. 37b illustrates cross section data, according to an embodiment.

As shown in the sample flood water surface profile in FIG. 37, in some embodiments, points of flood frequency versus flood elevation for the property point may be derived from geo-referenced discrete points, on the digital elevation map, for flood frequencies corresponding to a location on the flood source in a flood water surface profile that is on a line substantially perpendicular to the flood source line feature and the property point (e.g., line 1306c in FIG. 13). In some embodiments, the flood water surface profile may provide flood elevation for a flood source at given distances along the flood source (e.g., as determined through an HH study). The flood water surface profile may be a flood profile from a FEMA Flood Insurance Study developed by HH studies. Other sources of a flood water surface profile are also contemplated. In some embodiments, two flood elevations at different flood frequencies for the property point may be derived from point features or database records on the geo-referenced discrete points from the flood water surface profile. The discrete points on a cross-section in the flood water surface profile and the associated flood elevations may be geo-referenced and stored in a database. The database may also include additional discrete flood elevation points where a flood water surface meets the ground elevation of the digital elevation map. As shown in the sample flood water surface profile in FIG. 37, multiple elevation points with different flood frequencies at each cross section location may be determined. The flood elevation point database may be used to derive flood elevations for the property point based on distances between two closes elevation points to a cross section at the property point (e.g., cross section indicated on the flood water surface profile for the property point). A collective database may be used in the flood elevation search for the property point. These points may also be used as flood elevation versus flood frequency to generate a flood elevation versus flood frequency curve for the property point. FIG. 37b illustrates an embodiment of an HH study used to determine one or more flood elevations for a property point for use in determining a flood risk score characteristics. Flood profiles (and their associated data tables) may be determined, for example, in FEMA Flood Insurance Studies (FIS). The flood profiles may be generated from an HH model based on hydrologic and hydraulic characteristics of the river system. FEMA flood boundaries may be derived from these flood profiles. The vertical grid columns may represent elevations and the horizontal grid rows may represent stream distances. At a given stream distance, related flood elevations (e.g., BFE, 10 year, 50 year, 500 year, etc. flood elevations) may be determined. Readings of the flood elevations for the property may follow the grid column where the property is located. The concept may also be applied to a BFE table (e.g., see FIG. 37c).

FIG. 39 illustrates a flowchart of an embodiment of a method for assigning a flood risk score. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically by a computer system.

At 3901, a property point may be received (e.g., a property address may be received) at a flood risk score engine. The property point may be submitted, for example, as an address or latitude/longitude pair. The address may be received from, for example, an insurance carrier interested in a flood risk score for the property point. In some embodiments, the address may be entered into a web site or submitted over the phone by a flood risk score requester or other system user. Other methods for receiving the property point are also contemplated. For example, a spreadsheet of several addresses for flood risk score determinations may be received. Submissions to a website may be received by the flood risk score engine through eXtensible Markup Language (XML) (other formats are also possible). In some embodiments, various user submission interfaces (e.g., with a graphical user interface (GUI)) may be used for receiving the property points.

At 3903, a determination may be made as to whether the property point (e.g., address) provided is a valid property point. For example, the address may be compared against addresses in a look-up table of addresses.

If the address is determined not to be valid, at 3905, manual research may be performed (e.g., for the provider of the address) to determine a more accurate property point identifier. Manual research may include examining a map region and selecting a specific address point (e.g., by a human user). Other manual research may also be performed to determine a valid (e.g., more accurate) address. At 3906, a determination may be made as to whether the manual research was successful (e.g., whether a valid address was determined for the property address). If the manual research was not successful, the flow may terminate at 3999.

At 3907, if the property point is determined to be valid at 3903 or 3906, the property point may be geocoded. Geocoding the property point may include determining geocode attributes such as a latitude/longitude, parcel centroid, address level, zip code sector/zip code segment, section, township, and/or subdivision. Other geocode attributes may also be determined. At 3909, a geocode confidence may be designated for the property point. At 3910, a determination may be made as to whether the geocode confidence is satisfactory at the address level or better (e.g., 125 foot accuracy). In some embodiments, geocode accuracy confidence may also be determined as one of 5 possibilities: (a) Point-level/Parcel level (AP level)—geocode point may be set at center of parcel; (b) Address (AS level)—point location may be based upon street data address range and interpolating the input street address in that range (125 foot level); (c) Segment (zip+4)—location may be somewhere in a given segment (e.g., zip+4 digit), which may contain the properties in a block on the same side of a particular street (750 foot level); (d) Sector (zip+2 digit)—location may be somewhere in a given sector (e.g., zip+2 digit), which may be somewhere in a multiple block area; and (e) zip code (5-digit)—location may be somewhere in the zip code area (e.g., 5 digit zip), of which the area size can vary. The 5 digit zip code may be smaller in densely populated areas but may be quite large in sparsely populated (rural) areas. In some embodiments, an accuracy threshold may be predetermined prior to determining if the geocode confidence is satisfactory.

In some embodiments, footprints determined from either feature extraction software or manually predetermined rooftop points may be built. In some embodiments, software may be used to recognize certain features (e.g. structure rooftop outlines (footprints), roads, etc.) within, for example, aerial/satellite imagery. The software may be used to identify the location of buildings within parcel boundaries. This may provide accurate, automated structure-level flood zone determinations (e.g., which may be more accurate than using an identified parcel centroid). Human users may also identify and save, for example, rooftop points on aerial/satellite photos. These points may be used to identify, for example, a specific location of a house on the property point. In some embodiments, the flood risk score may be determined with respect to the specific location of the house (or other structure) on the property point. In some embodiments, a rooftop level, address level, and/or property level may be used as primary levels of geocoding for determining the flood risk score (other levels are also contemplated).

If the geocode confidence is not satisfactory, flow may continue at 3911 (manual research may be performed to increase property point accuracy which may increase geocode confidence). At 3912, a determination may be made as to whether the manual research was successful (e.g., whether the new geocode confidence is within 250 foot accuracy). If the manual research was not successful, the flow may terminate at 3999.

If the property point has a satisfactory geocode confidence (from 3910 or 3912), at 3913, a flood zone determination may be performed for the property point. The flood zone determination may include determining an applicable flood zone for the property point (e.g., using Flood Insurance Rate Maps (FIRMs), Digital FIRMs (DFIRMs), or other sources of flood map information). In some embodiments, a collection of flood maps from FEMA and/or DFIRMs spanning a geographical area (e.g., large portions of the United States) and/or internally generated maps may be used to determine the flood zone for the property point. FEMA may issue flood maps and flood map revisions on a periodic basis. Flood zones identified by FEMA on these maps may include: A, AO, A1-A30, AE, AR, AR/A0, AR/AI-A30, AR/AE, AR/AH, AR/A99, A99, AH, VO, V1-V30, VE, V, M, E, X, B, C, D, and None. Flood zones beginning with the letters A or V may be considered SFHAs, or high risk flood zones, with A-lettered zones being subject to riverine, lake overflow, ponding, or sheetflow flooding and V-lettered zones being subject to wave velocity flooding. As used herein, "A*" is used to refer to various possible "A" zones, "V*" is used to refer to various possible "V" zones, etc. However, the absence of an "*" does not necessarily indicate, for example, an A or V zone, exclusively. Zone M may designate mudslide prone areas and Zone E may designate erosion prone areas; both of which may also be considered SFHAs. Flood zones beginning with the letters B, C, and X may designate areas which are not SFHAs, are outside of the high risk flood zone, but may still be subject to a moderate (e.g., "500-year" flood zone, or less than 1 foot depth in a "100-year" flood zone) (shaded Zone X or Zone B) or low (e.g., outside of the "500-year" flood zone) (unshaded Zone X or Zone C) flood risk. Zone D may be used for areas that have not received a flood hazard evaluation, but may be subject to flooding. Zones B, C, X and D may not be considered SFHAs. These flood maps may be improved using aircraft implemented lasers to determine respective elevations upon which the flood zones may be more accurately identified.

In some embodiments, a flood zone determination for the property point may include grouping the property point into one of several (e.g., 6) flood zone determination groups for the purposes of determining a flood risk score. Other numbers of groups are also contemplated. The groups may include, for example, "Non-SFHA" if the property point is in zones X or C; "Non-SFHA Shaded" for zones X500 and B; "SFHA" for zone A (except SFHA Alluvial Fan), "SFHA Coastal" for zone V; "SFHA Alluvial Fan" for zones AO (AO may also include other types of SFHAs that are not alluvial fan); and "Unknown" for zones D and none. Other group divisions and designations are also contemplated.

At 3915, a determination may be made as to whether a Letter of Map Amendment (LOMA) has been applied or is available for a region with the property point. If a LOMA is available, at 3917, a GE for the property point may be considered to be the same as the nearest base flood elevation (BFE) (or, for example, an interpolated BFE for a calculated point such as a calculated point on a known flood risk zone boundary or a point on a known flood risk zone boundary at the associated cross-section 4013). This may provide a conservative estimate that may assist in automating a flood risk score assessment. In some embodiments, a LOMA elevation variance may be retrieved as a binary file (e.g., a PDF file). Determining the actual LOMA elevation variance (i.e., the actual elevation difference between the property point elevation and the elevation of the calculated point on a known flood risk zone boundary (such as a point on the known flood risk zone boundary)) for the property point may require manual interaction. For example, if BFE is equal to 904.2 feet and a lowest adjacent grade elevation (which may be the lowest grade elevation point around a building on the property point) is equal to 906.1 feet, then the elevation variance may equal + 1.9 feet. In some embodiments, "lowest adjacent grade elevation" may be another way of determining a GE. In some embodiments, LOMAs may be determined by examining a letter of map change (LOMC) database. In some embodiments, the GE may be considered to be the same as the WSE of the calculated point on the nearest flood zone boundary if a LOMA is applicable to the property point. In other words, the property point may be considered to be outside of the 100 year flood zone. In some embodiments, a flood risk characteristic may include information from the LOMA for the property point such as validated information of flood risk changes on the flood zoning map. If a property has a LOMA, its flood risk score may be given a lower (or higher) ceiling/floor (e.g., 600) to indicate a lower level of flood risk even though the property is, for example, in an SFHA.

In some embodiments, regularly updated national FEMA DFIRM datasets may be incorporated in the flood maps used to calculate the flood risk score. In some embodiments, a LOMA and/or LOMR (letter of map revision) may also be referred to for information on property points to use in determining a flood risk score.

At 3919, the GE of the property point may be determined. In some embodiments, the United States Geological Survey (USGS) Elevation dataset with a 10 m/30 m resolution or higher resolution elevation datasets (e.g., from commercial companies) may be used in the GE determination. Other data sources may also be used (e.g., a more accurate data source (e.g., commercial) may be used). In some embodiments, an elevation map may be used to determine the GE. For example, the property point may be assigned an elevation as its GE that is the average of the four elevations of the corners of the square of the grid that the property point occupies on a digital elevation map. In some embodiments, a flood risk score requester may provide an elevation to use for the property point. In some embodiments, a database of elevation certificates may be accessed for an elevation certificate for the property point that has the elevation of the property. These elevation certificates may have highly accurate elevation data for their respective property. Elevation certificates may also be available for other locations. Other methods for determining a property point's GE are also contemplated. Other digital maps may include aircraft implemented laser determined elevations determined by aircraft using lasers to determine elevation for various points (such as Laser Imaging Detection and Ranging (LIDAR)).

At 3921, a BFE or a WSE may be estimated for the property point. For example, the BFE or WSE of a calculated point such as a calculated point on a known flood risk zone boundary or a point on a known flood risk zone boundary at the associated cross-section 4013 may be determined. In some embodiments, a cross-section (e.g., see FIG. 40), a radius search method, a water drop method (e.g., see FIGS. 57-59), and/or surface method (e.g., see FIGS. 55-56) may be used to determine the associated BFE or WSE (e.g., of the calculated point hydrologically and hydraulically associated with the property point).

In some embodiments, a radius search method (e.g., nearest point method) may be used to determine an associated BFE or WSE. For example, the BFE or WSE may be determined using a geospatial search functionality that uses a dynamic buffer to search a nearest polygon or line feature (e.g., beginning at 1000 foot radius, and the radius may be adjusted if targeted objects are not found or too many search objects are returned). In some embodiments, if the searched features (e.g., BFE line features, known flood risk zone boundary line features, river centerline features, dams, levees, and others) are more than 1000 feet away from the property point, a 1000 feet searching buffer may not return a result (the system may search for these features within a radius of the property point). If no result is found, an additional search distance may be added to the search buffer (e.g., an additional 500 feet search distance may be added for a total radius of 1500 feet). If the revised search buffer returns a result, the system may proceed with the result. Otherwise, additional searching distances may be added to the search buffer until a search distance limit is reached. In some embodiments, the 1000 feet searching buffer may return too many features (for example, 750 features may be found) and it may take a significant amount of time to process 750 features to determine the nearest feature. Therefore, the search buffer may be reduced in size (e.g., reduced by 25%) to search again. The search buffer could be repeatedly reduced until a threshold (such as 5) for searching features is reached. In some embodiments, one radius may be searched (e.g., 1000 feet) and if no results are returned the system may continue without expanding the radius. In some embodiments, if a significant number of results are found, the system may determine the closest result(s) to the property point and may proceed.

In some embodiments, the BFE may be determined by interpolating two adjacent BFE line features (e.g., by weighting the two BFEs on either side of the nearest point according to their distances from the nearest points on the BFEs to the property point). In some embodiments, a WSE may be determined (e.g., for coastal areas). In some embodiments, a WSE may be determined by using an elevation of a nearest point (e.g., on a flood zone boundary) to the property point, for example, by determining the elevation using a Digital Elevation Model (DEM). FEMA maps and/or other DFIRMS may be used in calculating the BFE and/or WSE. For example, an elevation may be accessed for the nearest point in the nearest known flood risk zone boundary and used as the WSE. In the case of AO, a water depth may be provided with the zone indication. The provided water depth may be used in a similar fashion as a BFE in determining variances respective to the GE. Other elevations with respect to SFHA or non-SFHA zones may also be determined and used to compare to the property point's GE.

Figure 40:
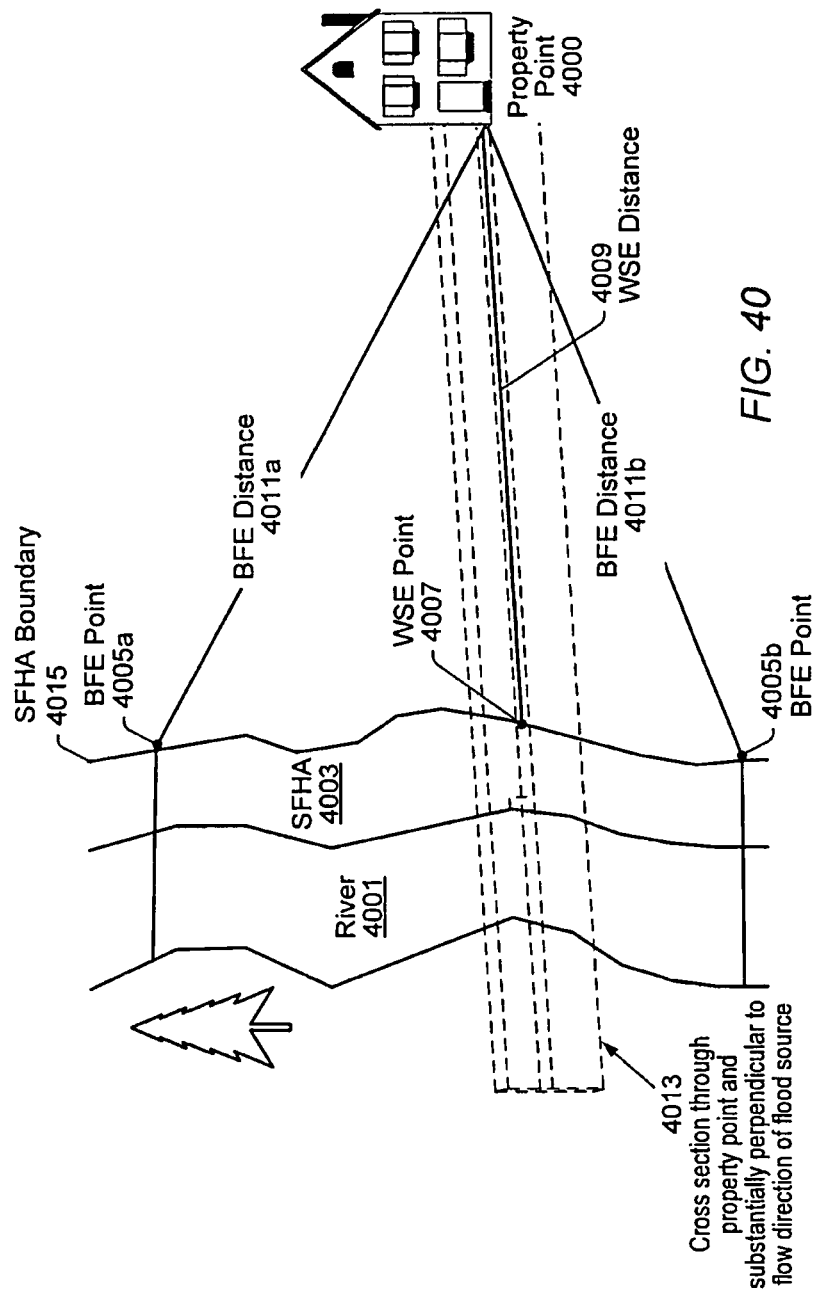
FIG. 40 illustrates various components for BFE and WSE calculations, according to an embodiment.

FIG. 40 illustrates various components for BFE and WSE calculations, according to an embodiment. In some embodiments, a WSE may be determined for a calculated point on a known flood risk zone boundary (such as a boundary point 4007 on a known flood risk zone boundary (such as a FEMA SFHA) at an associated cross-section 4013 to a flood source 4001. The cross section may pass through the property point 4000 and be substantially perpendicular to the flow of the flood source 4001. Other calculated points are also contemplated. For example, the calculated point may correspond to a nearest point on a nearest known flood risk zone boundary 4003 (river 4001 may also be considered part of the known flood risk zone boundary 4003) to a property point 4000. In some embodiments, a straight-line WSE distance 4009 may be shorter than BFE distances 4011a,b to respective BFE hash mark points 4005a,b and therefore, may provide a more accurate WSE closest to the property point 4000. The WSE may be calculated by first performing a query to determine the proper known flood risk zone boundary (e.g., a known flood risk zone boundary 4003 that is the closest to the property point 4000 and/or may have the most impact on the property point). The elevation of the nearest point on the appropriate known flood risk zone boundary 4015 may be determined by determining a latitude/longitude of the nearest point 4007 and National Elevation Data (NED) (or another elevation data source) may be accessed to determine the elevation of the point 4007 at the known flood risk zone boundary 4015. An elevation may also be determined for the property point 4000 (e.g., by determining the latitude/longitude of the property point 4000 and looking up the elevation for this latitude/longitude in NED). In some embodiments, the USGS elevation dataset (or, for example, a commercial elevation dataset) may be used in determining the GE, BFE and/or WSE. Other points may also be used (e.g., points off of the known flood risk zone boundary 4015) to determine a respective WSE for comparison to the property point's GE.

At 3923, a difference between the GE of the property point 4000 and the BFE/WSE (e.g., corresponding to the calculated point or other respective flood zone point elevation—both SFHA or non-SFHA) may be calculated. For example, an elevation may be determined for the GE of the property point 4000 and the BFE and this elevation may be differenced. In some embodiments, the elevation difference between the property elevation and the elevation of the calculated point on a known flood risk zone boundary (e.g., point 4007 on the known flood risk zone boundary) may be used as a first flood risk characteristic. In some embodiments, the GE may be in a pre-determined elevation variance range that may be either negative (below) or positive (above) in relation to the WSE/BFE. In some embodiments, if a LOMA is applicable, an actual GE to BFE difference may be determined or the GE of the property point 4000 may be considered to be the same as the nearest BFE (effectively resulting in a 0 elevation difference). In some embodiments, an actual GE to BFE difference may be determined by manual research (in some embodiments, the determination may be automated).

At 3925, if the flood zone determination is "SFHA" and the GE of the property point 4000 is less than or equal to the nearest BFE/WSE (BFE/WSE means "BFE or WSE") or if the flood zone determination is "Non SFHA" and the GE of the property point 4000 is greater than or equal to nearest BFE/WSE, then the flow may proceed to 3931.

At 3927, if the flood zone determination is "SFHA" and the GE of the property point 4000 is greater than the nearest BFE/WSE, the flood risk score may reflect a decreased risk of flooding. Flow may proceed to 3931 and an option for manual research may be provided. In some embodiments, manual research may be performed to determine if the zone, the GE of the property point 4000, BFE/WSE, and/or property point information are correct (other aspects may also be manually researched). In some embodiments, the flow may proceed to provide an automatic flood risk score (e.g., an automatic assignment of a flood risk score may result, for example, in a score of 600 (which may be the smallest risk score for a property in an SFHA) being assigned for the property point (if in an SFHA)). In some situations, a score may be automatically assigned or may be flagged for additional consideration (e.g., manual research).

At 3929, if the flood zone determination is "Non-SFHA" and the GE of the property point 4000 is less than the nearest BFE/WSE, the flood risk score may reflect an increased risk of flooding. If no LOMA exists, it is possible the flood risk score is higher than for properties in a known flood risk zone boundary zone. Flow may proceed to 3931 and an option for manual research may be provided (in some embodiments, a flood risk score may be provided automatically). In some embodiments, manual research may be performed to determine if the zone, the GE of the property point 4000, BFE/WSE, and/or property point information are correct (other aspects may also be manually researched). In some embodiments, other factors may be considered in place of or in addition to, for example, the factors of 3925, 3927, and 3929.

In some embodiments, if the respective SFHA is V*, the flood risk score may be impacted by coastal storm surge (predetermined values for this scenario may be used to impact the flood risk score). In some embodiments, a V zone may represent a high coastal hazard zone subject to high velocity water including waves. In some embodiments, a second risk score component of may be assigned for a V zone to model water velocity impact. If SFHA is AO, the flood risk score may be based on a water depth chart using the same logic as BFE/WSE variances. For example, the provided water depth for the AO or AH zone may be used and a difference between the GE and the water depth may be calculated to determine a first score component. If a LOMA is applied, the GE of the property point 4000 may be set equal to the nearest BFE/WSE (i.e., 0 variance) unless manual determination is requested.

At 3931, a preliminary first score component may be assigned. In some embodiments, based on data related to flood zone determination and elevation difference (e.g., computed using the cross section method, water drop method, surface method, radius search method, etc.), the first score component may be assigned a 100 to 800 number (e.g., on increments of 100) (other numbers, increments, and score types may also be used).

At 3933, additional datasets may be queried. For example, additional flood risk characteristics may be determined. These additional flood risk characteristics may include proximity to a dam, levee, or pumping station, SFHA within n feet, etc. In some embodiments, "proximity" may include determining whether the dam (or other feature) is upstream or downstream from the property point. In some embodiments, when proximity of the water control facilities to a property point is determined, the drainage area of the water control facilities (e.g., as determined from USGS NHD) may be examined. For example, a determination may be made as to whether the property point and the water control facility are in the same drainage area, what the ground elevation difference is between the property point and the water control facility (e.g., whether the ground elevation of the property point is lower than the ground elevation of the water control facility), and distance from the property point to the water control facility. Property points that are not in the same drainage area as the water control facilities or that are above the water control facility (e.g., upstream) may be at a smaller flood risk than property points in the same drainage area and/or below the water control facility elevation. Other considerations are also contemplated. For example, the secondary flood risk score could be varied according the physical factors of the water control facilities (such as year built, built material type, water storage capacity, and others).

In some embodiments, a second flood score component may be assigned (other flood risk components may also be assigned). For example, the second flood score. component may be increased by if the property point 4000 is within 1000 feet of a levee. In some embodiments, distances to flood risk zones, distances to flood sources, distances to dams, distances to levees, etc. may be determined using hydrological data sets (e.g., USGS National Hydrological Dataset (NHD)).

In some embodiments, the WSE distance 4009 (or a BFE distance) may be used as a second flood risk characteristic. In some embodiments, the second score component may be impacted by proximity of the property point to major water control facilities (e.g., dams, levees, pumping stations, etc.) based on logic using either catchment data or proximity parameters (which may be assigned based on, for example, past studies or may be arbitrarily assigned) (again, "proximity" may include determining whether the facility is upstream or downstream from the property point). In some embodiments, gage station data may be used and adjusted according to current rainfall to determine the catchment area. In some embodiments, data may be interpolated between the gage stations as needed. Drainage characteristics of the area may also be used with this data to further define the characteristics of the catchment to determine how much the flood risk score should be affected based on the catchment area where the property is located. For example, if a property is in a catchment area that historically had heavy rainfalls and flash flooding, the property may have a higher second score component.

In some embodiments, the second score component may account for flood risk decreasing as the distance to the flood source increases. A distance based second score component may reduce uncertainty of the first score components. The hydrological data sets (e.g., USGS NHD) may be integrated to increase the representation of river systems and other bodies of water for the flood risk score engine. The hydrological data sets may be used, for example, to compute proximities from the property points to their flood sources (e.g., river centerlines, river banks, or coastal lines).

In some embodiments, the second score component may supplement the value of the first score component when applicable. The second score component may provide an additional risk analysis for the property point 4000. The second score component may not be static for each property point 4000, but may change depending on the flood zone of the property point 4000 and/or other features of the property point 4000 (e.g., as determined by other datasets).

In some embodiments, the second score component may be computed according to equation 4103 provided in FIG. 4*th*. In some embodiments, Dx is a distance from a river bank or centerline 4153 (e.g., see FIG. 41), D100 is a distance from the river bank or centerline 4153 to a nearest 100-year flood boundary 4155, RTx is a return period at the property point x, RTmin is a minimum flood return period in the computation (e.g., 1 year), RTmax is a maximum flood return period in the computation (e.g., 1000 year), SRlimit is an upper limit of a second score component in the computation (e.g., 75), and SRx is a second score component at a property point x. If RTx is 1, Dx may be 0. If RTx is 100, Dx may be D100 (e.g., according to equation 4101). Equation 4101 may also be written in the form of equation 4103. In some embodiments, an upper limit may be set for the second score component (e.g., 75). In some embodiments, the second score component may not have an upper limit. In some embodiments, the upper limit may be distributed by return period (e.g., RTmin is 1 and RTmax is 1000). If RTx is equal to RTmin, SRx may be set equal to 50. If RTx is equal to RTmax, SRx may be set equal to 0. In some embodiments, equation 4107 (Int returning the closest integer value) may be used (e.g., for second score components for 0<Dx<1.5*D100, when Dx>1.5*D 100, SRx=0). Equation 4107 may also be used for other second score components.

Figures 41A, 41B:
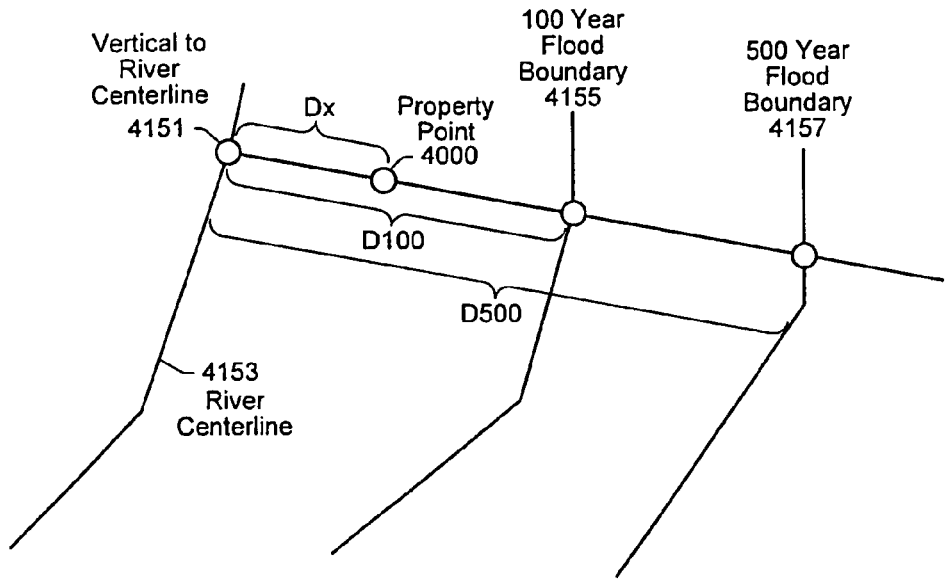

In some embodiments, the relationship between the proximity of the property location to its flood source(s) and the second score component may be formulated according to a logarithm equation (e.g., equation 4101) based on the known distance between the boundary point on the known flood risk zone boundary (e.g., an SFHA corresponding to the 100 year flood boundary) at the associated cross-section to its flood source. As seen in FIG. 41a, calculating a second score component may include using a distance from the property point 4000 to a flood source (e.g., a river bank or centerline 4153) and a distance from a 100-year flood boundary 4155 to the flood source. To compute the distances, a line object may be created from the property point 4000 to the river bank or centerline 4153 (which may be a flood source). The line object may be created perpendicular to the river centerline 4151. The line objects may be extended across the 100-year boundary and/or the 500-year flood boundary 4157 (if it exists). The intersect points may be used to compute the distances to the river centerline 4153 (e.g., using a digital map to determine, e.g., a straight-line distance between the property point 4000 and the intersect points). In some embodiments, the intersect points may be used to query elevation datasets to determine a 100 year WSE and 500 year WSE. The elevations may be validated at the intersection points (e.g., elevation at the river may be less than the GE of the property point 4000).

In some embodiments, a non-SFHA property with a distance to a nearest SFHA<500 feet may have it's flood risk score impacted more (e.g., through the second flood risk component) by the distance to the SFHA than a non-SFHA property with a similar elevation variance (e.g., similar elevation difference to nearest BFE) that is ≥500 feet from the nearest SFHA. In some embodiments, a non-SFHA property with a distance to a nearest SFHA>500 feet but less than 1000 feet may have it's flood risk score impacted more (e.g., through the second flood risk component) by the distance to the SFHA than a non-SFHA property with a similar elevation variance (e.g., similar elevation difference to nearest BFE) that is ≥1000 feet from the nearest SFHA.

FIG. 41c illustrates equation 4103 for D100 equal to 500 feet showing that, in some embodiments, the larger the distance to the flood source, the greater the return period. In this embodiment, a check on Dx=500 feet shows that the return period is 100 years (as predicted), and for Dx=0 (in the flood source), the return period is 1 (also, as predicted). Further, if Dx is 750, the return period may be 1000 years (showing the equation provides a greater return period for larger distances from the flood sources). As another example, if the distance between the 100-year flood boundary 4155 and the river bank or centerline 4153 is 5 miles, the distance for a 1000-year flood boundary may be 7.5 miles.

Figure 41E:
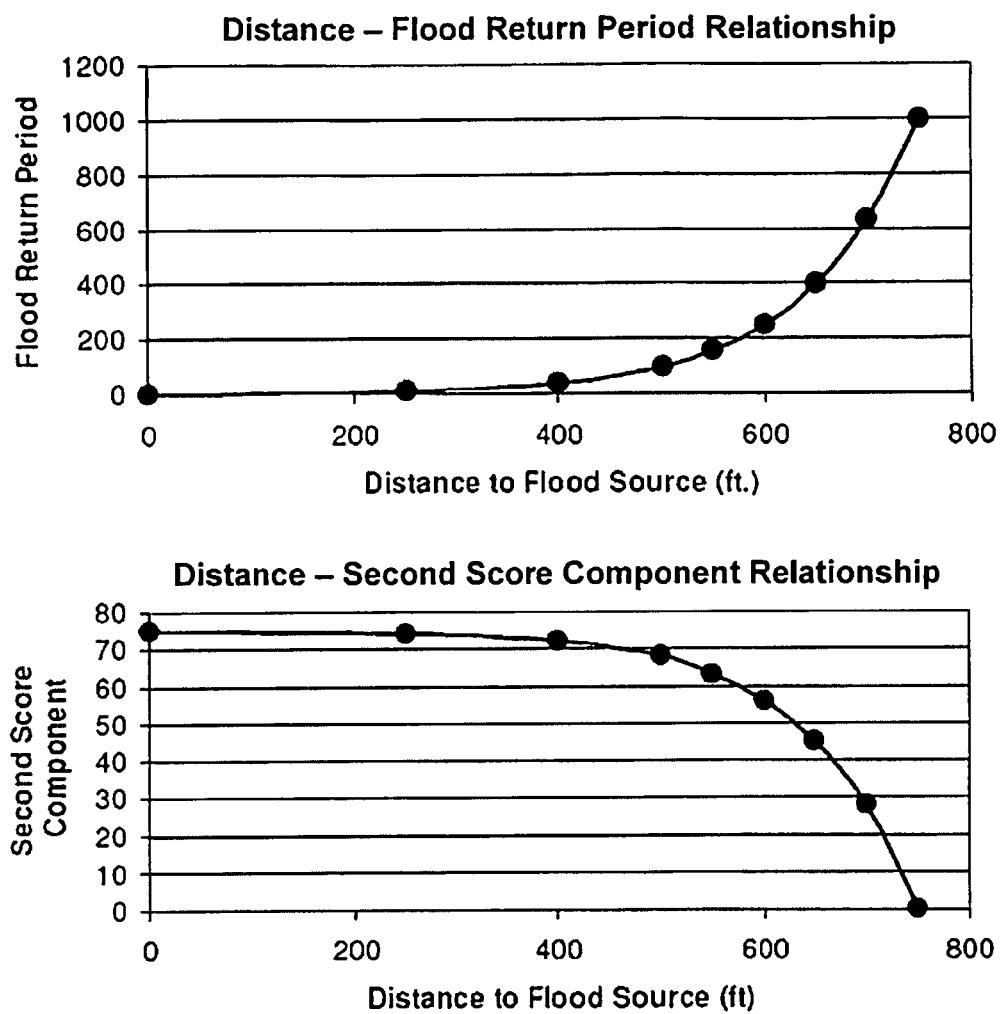

Also, as seen in the embodiment shown in FIG. 41c, if Dx is 500, RTmax is 1000 (an upper bound of return period for the computation), RTmin is 1 (a lower bound of return period for the computation), and SRlimit is 75 (an upper bound for the second score component for distribution), equation 4107 may look like equation 4109. If RTx is equal to 1 (at the river centerline 4153), SRx may equal 75. If RTx is equal to 1001, SRx may equal 0. For D100 equal to 500 feet, SRlimit equal to 75 feet, RTmax equal to 1000, and RTmin equal to 1, equation 4111 may be used (e.g., see FIG. 41d). FIG. 41e illustrates resulting relationships according to various embodiments (e.g., distance relation to the flood return period and distance relation to a second score component (e.g., as a result of distance between the property point and a flood source (such as river bank or centerline)). Equation 4111 illustrates an embodiment that shows within the 100-year flood zone, the second score component may not have a significant reduction while beyond the 100-year flood zone, the second score component may decrease quickly. In some embodiments, SRlimit may be set equal to 50. Other values for SRlimit are also contemplated. Other values (e.g., for Dx, RTmax, RTmin, RTx, SRx, etc.) and other equations for the score components are also contemplated.

Returning to FIG. 39, at 3935, a flood risk score may be calculated and reported. For example, first and second score components may be determined by accessing a flood risk score assignment chart (e.g., see FIGS. 42-44). In some embodiments, the first score component and the second score component may be added together (they may also be averaged, subtracted from a default flood risk score, etc.). The flood risk score may be delivered to a requester in several different ways. For example, the flood risk score may be sent to the requester in a flood risk score report, through a flood risk score web viewer, or through a web service delivery (XML). Other delivery mechanisms are also contemplated. In some embodiments, a flood risk score may be provided for any geocodeable property point 4000. In some embodiments, if the flood zone determination for the property point 4000 is None or D, a flood risk score may not be assigned and the requester may be provided with the flood zone determination and, in some embodiments, additional information to make a flood risk decision.

Figure 42B:
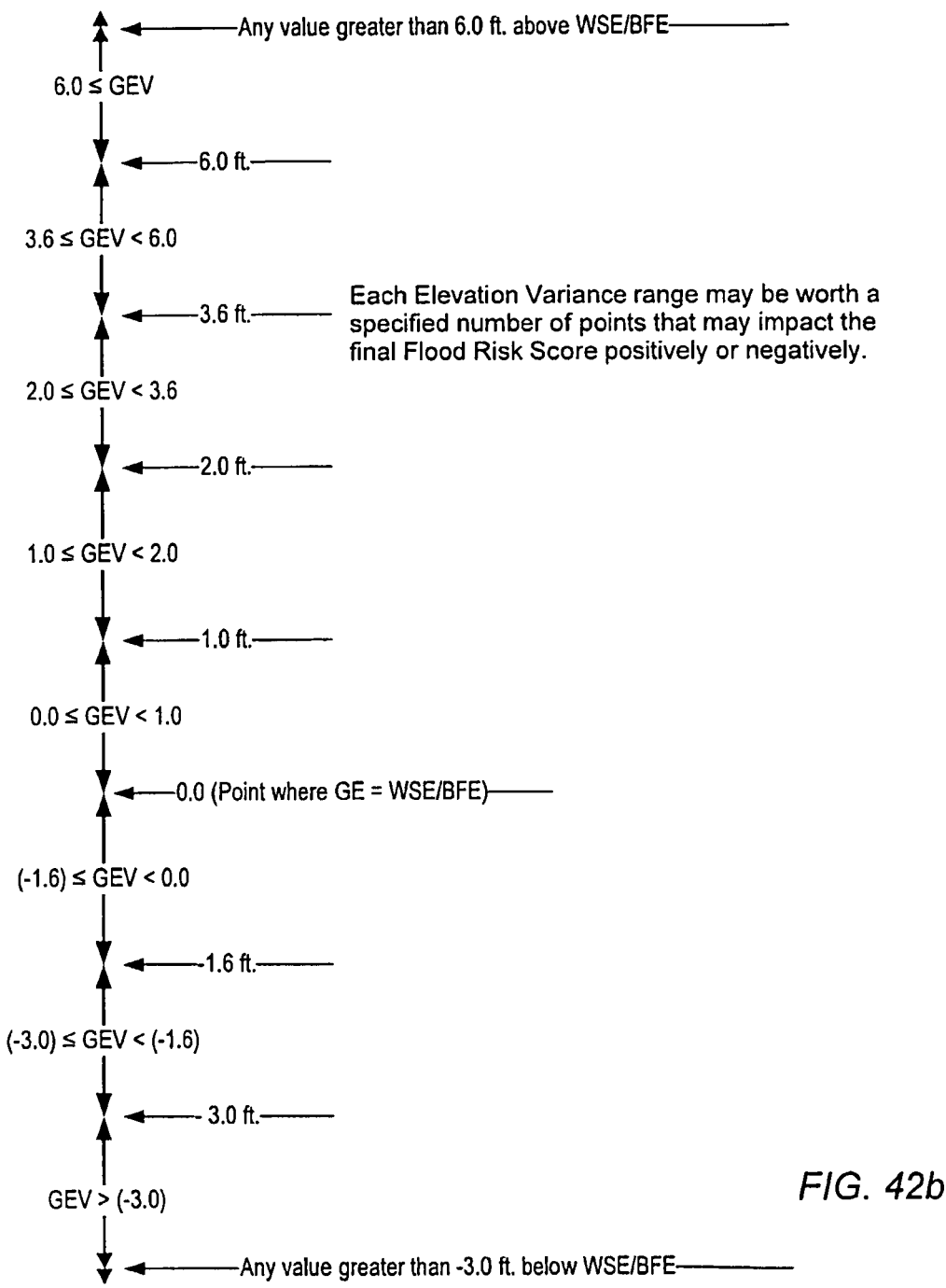

FIGS. 42-44 illustrate embodiments of flood risk score assignment charts. In some embodiments, flood risk score assignment charts may be used to assign a flood risk score comprised of a first score component and a second score component (other numbers of components are also contemplated). For example, as seen in FIG. 42a, a first score component of 100-800 may be assigned to a property point 4000 based on a minimum variance depth/height (e.g., between a property point's ground elevation (GE) and an elevation of a calculated point such as a calculated point on a known flood risk zone boundary or a point on a nearest known flood risk zone boundary (e.g., a WSE or BFE of the nearest point)). The depths, heights, and variances on the example charts are provided in feet. The flood risk table may also include a flood risk zone column and/or exception columns (e.g., exception zones and exception rules). As an example, exception zones may include AO and may result in an associated first score component not being assigned if the near zone is one of the exception zones. In addition, an exception rule may apply (e.g., for property in zone A, water depth of point in SFHA is >3 feet at the 100-year flood stage). Other exception zones and exception rules may also be used. In some embodiments, the flood risk score assignment charts may include second score components considerations (e.g., "If near V zone, add 25"—where is the second score component). Additional second score components considerations are also contemplated. For example, "If GE<elevation of Datn/Levee, add 25" meaning that if the GE of the property point 4000 is less than the elevation of a nearby dam or levee, the second score component may be increased by 25. In some embodiments, for a potential dam break, additional logic may be applied. The dam that may cause a potential flood risk on the property point may meet the following two conditions: (1) share a same catchment area with the property point, and (2) the GE of the dam may be higher than the property (which may indicate the property is downstream of the dam). Other conditions may also be considered (e.g., the distance between the dam and the property). Using USGS catchment area mapping data, spatial relationships between the dam and property point may be determined and reflected in, for example, a second score component. Other considerations may also be included with the chart. For example, for a property in an SFHA, "If GE>BFE, first score component may stay above 600 because it is in an SFHA". In some embodiments, a flood risk score may not be provided for certain situations (e.g., if the property point 4000 is in a D zone). Also provided in FIG. 42*a* is an embodiment of a first score component association table with respective frequency return period in years and frequency return period range in years. FIGS. 42-44 illustrate possible embodiments. Other embodiments with different flood risk scores (e.g., 1-10, 1.1-1.9, 1000-10000, A-Z, etc.) and different characteristics (e.g., different depth variances) are also contemplated. For example, a first flood risk component of 700 may be assigned to a property point 4000 with elevation variance between −4.0 and −0.5 feet (also see FIG. 42*b*). In other embodiments, a first flood risk component of 0.4 may be assigned to a property point 4000 with elevation variance between −4.0 and −0.5 feet. Numbers/letters may be chosen and assigned based on, for example, different levels of determined flood risk for a property point. Other numbers and/or letters may also be used to represent flood risk scores and flood risk score components.

FIGS. 43*a*-*d* illustrate several embodiments of flood risk scores for various situations (e.g., A* scenarios, V* scenarios, and X* scenarios). The first column 4301 of the scenario's table includes a minimum variance depth/height (top) and a first score component (bottom) number for each row of the table. Second column 4303 may include exception rules and column 4305 may include a second score component rule (top) and a second score component (bottom) for each row of column 4305. A Dam/Levee/Water Management System column 4307 includes an indicator of whether a dam, levee, or water management system is near the property point (top) and an additional score component (bottom) number for each row of column 4307. A total score (flood risk score) column 4309 may include a total of a first score component, second score component, and any additional score component for the row.

FIG. 44 illustrates another embodiment of a flood risk score assignment chart. The chart in FIG. 44 illustrates first score components and their corresponding elevation ranges, targeted frequencies, flood risk zones, exception zones, and exception rules. The chart also has two second score component columns. As used in FIGS. 42-44, "logic" refers to flood risk score methodology as described herein.

Figure 45:
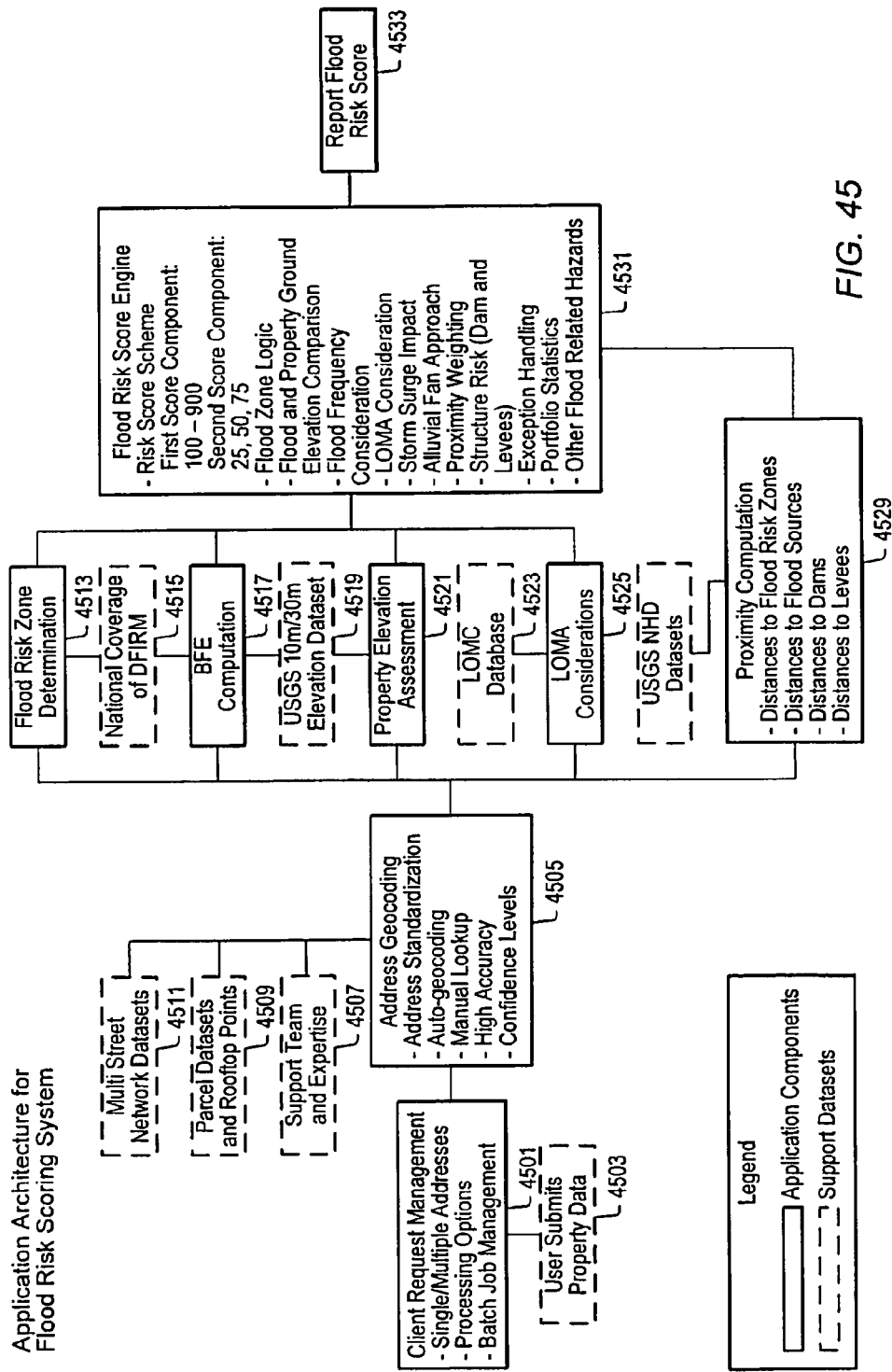
FIG. 45 illustrates an embodiment of an application architecture for assigning a flood risk score.

FIG. 45 illustrates an embodiment of an application architecture for assigning a flood risk score. In some embodiments, a client request management application component 4501 may access user submitted data 4503 (e.g., from a requester). The request may include single or multiple addresses and/or processing options (e.g., requesting a flood risk score and a flood zone map). The client request management component 4501 may also manage batch jobs. In some embodiments, an address geocoding application component 4505 may access multi-street network datasets 4511, parcel datasets and rooftop points 4509, and support team and expertise 4507. The address geocoding application component may standardize received addresses, auto-geocode an address, assist and/or request manual look-up (e.g., of an address), ensure high accuracy, and determine confidence levels. Other application components are also contemplated. For example, flood risk zone determination application component 4513 may access a national coverage of flood maps (e.g., DFIRMs 4515). A BFE computation application component 4517 may also access the national coverage of flood maps (e.g., DFIRM 4515) and USGS elevation datasets (e.g., 10 m/30 m—other datasets are also contemplated) (WSE's may also be calculated). A property elevation assessment application component 4521 may also access the USGS elevation dataset 4519.

In some embodiments, LOMA considerations application component 4525 may access a LOMC database 4523. A proximity computation application component 4529 may access a hydrological data set (e.g., USGS NHD dataset 4527). Many of these application components may be accessed by a flood risk score engine 4531. The flood risk score engine may determine first score components (e.g., on a scale of 100-800) and/or second score components (e.g., in increments of 25, 50, and 75). The flood risk score engine 4531 may also include flood zone logic, flood and property ground elevation comparisons, flood frequency considerations, LOMA considerations, storm surge impact consideration, alluvial fan approach consideration, proximity weighting, structure risk (e.g., property point 4000 near a dam or levee), exception handling, portfolio statistics, and other flood related hazards (e.g., drainage characteristics of the area). In some embodiments, the flood risk score engine 4531 may provide results to a report flood risk score application component 4533 which may provide flood risk score reports.

Figure 46:
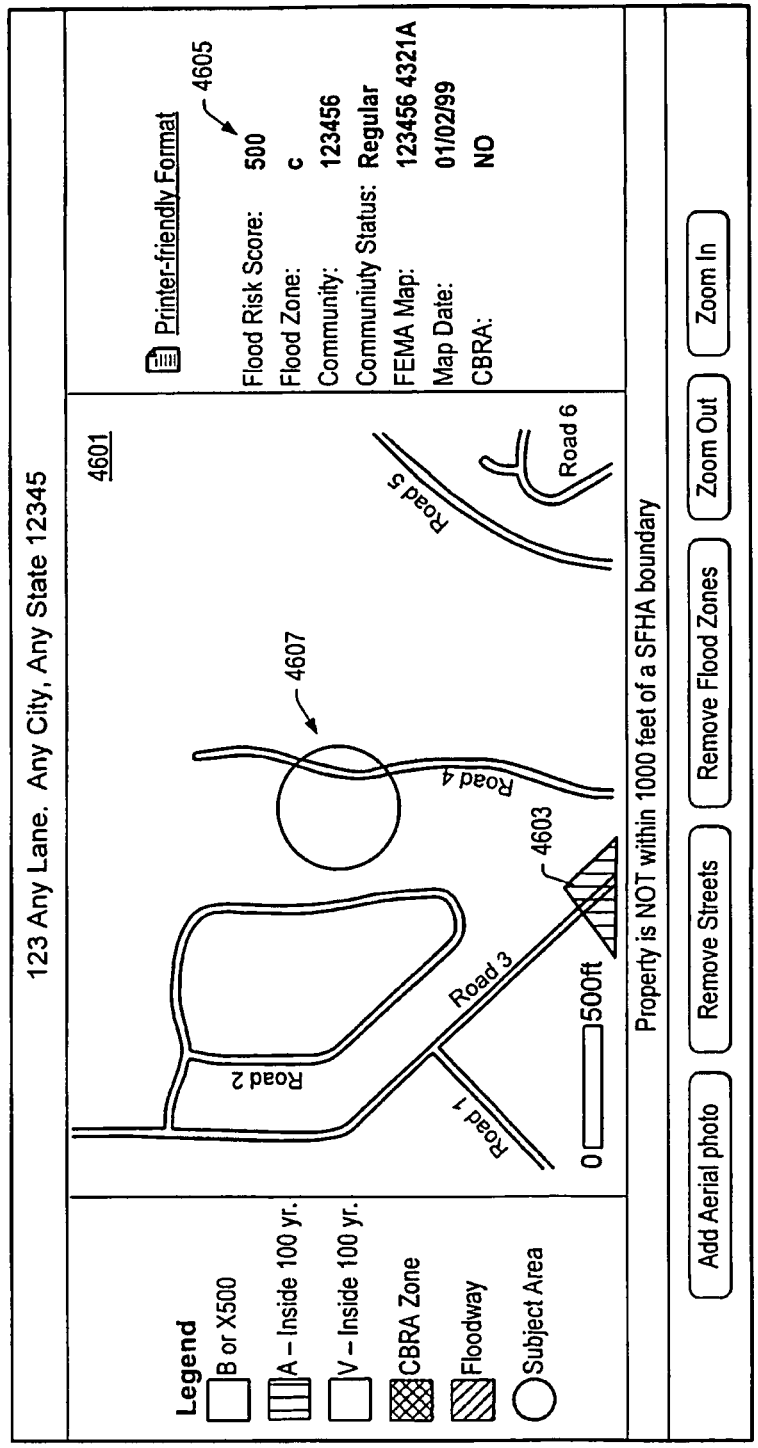
Figure 48:
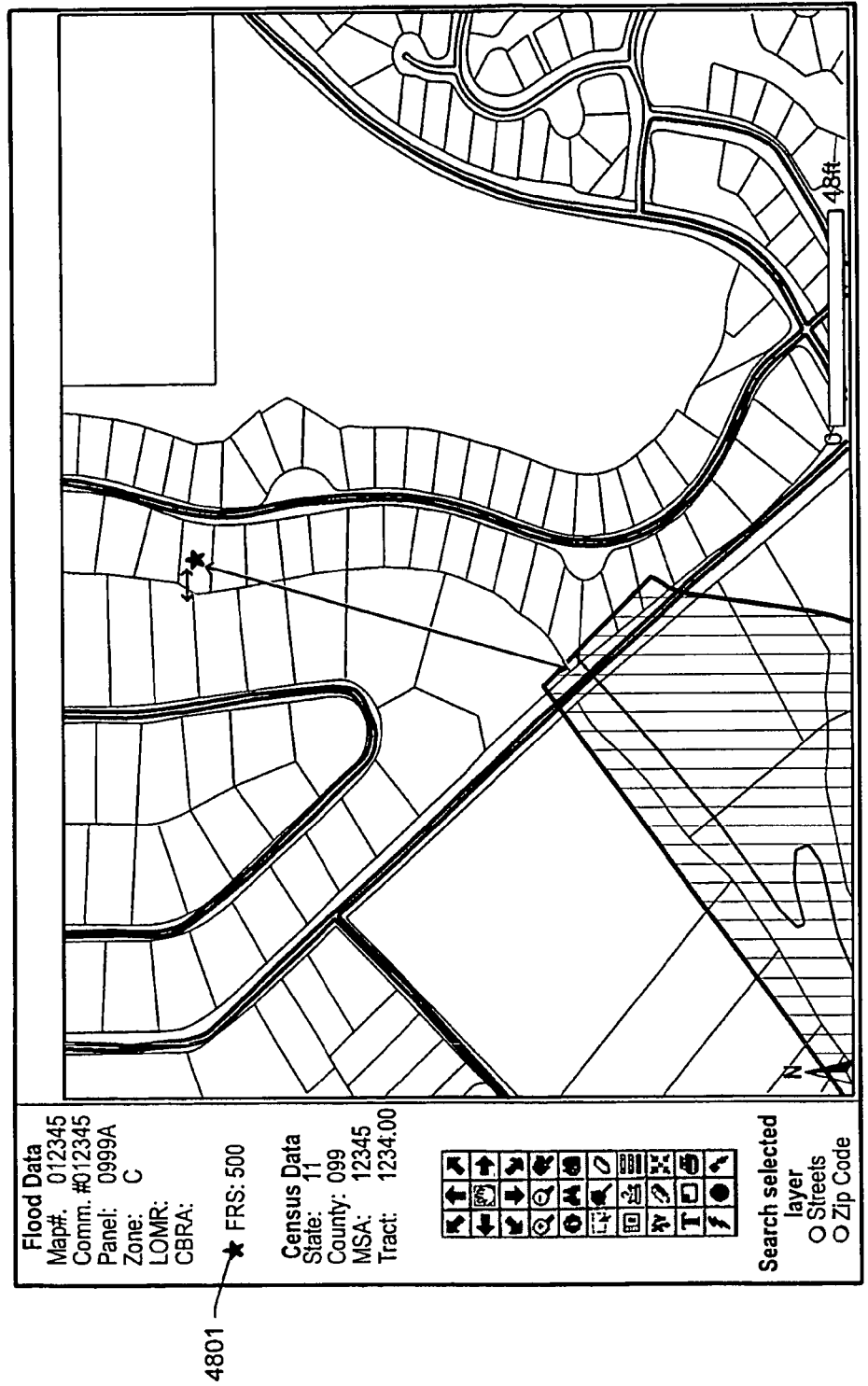

FIGS. 46-48 illustrate a flood risk score report, according to an embodiment. In some embodiments, a flood risk score report may include a map 4601 of a requested property point 4607. The map may further include flood zones (e.g., flood zone 4603). The flood risk score report may include an indicator of the location of the property (e.g., the circle at property point 4607). In some embodiments, the flood risk score report may include a flood risk score 4605 and other information for the property (also see FIG. 47 information panel). In some embodiments, the flood risk score report may be provided as an interactive web page (e.g., see FIG. 48). A flood risk score may be presented for a selected property point (e.g., in the margin at 4801). In some embodiments, flood risk scores may be displayed for several properties on the map (e.g., on top of the properties). In some embodiments, flood risk scores may be displayed for a property that a flood risk score requester moves, for example, a mouse pointer over.

In some embodiments, flood risk score reports may be made available through a web page, PDF, e-mail, or e-mail of a file (e.g., a PDF). Inputs may also be received through a web-interface and/or e-mail. Other methods of receiving input and sending reports are also contemplated. In some embodiments, flood risk score reports and/or flood risk scores may be delivered in singles (e.g., with a consumer friendly layout) or in batches (e.g., by spreadsheets which may be comma-delimited).

In some embodiments, one or more batched properties may be received (e.g., in a spreadsheet format) from a requester (e.g., an insurance company) for flood risk score determinations. The spreadsheet may include information on the batched properties (e.g., an address) that may be used to determine a flood risk score for the properties (e.g., data may be used in the geo-coding process). The requester may include, for example, a batch name, a requested completion date for the batch, special processing instructions, indicate whether they want certifications or other printable output generated, a description of the locations being submitted (e.g., store type, restaurant name, etc.), or latitude/longitude pair submitted as the location identifier instead of property address. In addition to address information needed for order processing, other information may be collected from the incoming spreadsheet if it is available (e.g., building value, equipment value, total value, business interruption (Be value, and line item reference number). In some embodiments, information may be collected from the client's proprietary or non-proprietary software program data entry fields that populate a delimited file.

In some embodiments, an internal batch identifier may be assigned to the records corresponding to the batch. In some embodiments, once the batch is submitted and received, an optional acknowledgement email may be generated and sent to the flood risk score requester. The email may include a number of records received, an expected completion date, and internal contact information of a corresponding service representative. In some embodiments, flood risk score requesters may have the option of viewing a summary of batches that have been submitted for processing. In some embodiments, the summary may include a batch ID, a batch name, a date submitted, a date completed, a number of locations submitted, and a number of locations completed. The listing may be sortable by batch name, date submitted, and date completed. In some embodiments, the flood risk score requester may view a batch archive. In some embodiments, the flood risk score requester may view batch details. For example, from within a batch summary screen, the flood risk score requester may have the ability to view line item details for the batch. The line item details may include location data collected during the submittal process. Zone information may also be displayed. In some embodiments, depending on product flags for the account, proximity, elevation, elevation differential and BFE information may or may not be displayed. In some embodiments, location value information may not be displayed. The listing may be sortable by zone, state, zip code, proximity, and elevation differential.

In some embodiments, additional data may be determined for the one or more properties. For example, a flood zone determination, a geo-coding confidence, FEMA map information, proximity to a zone change, a BFE, an elevation of the structure, proximity to an imminent body of water (e.g., coastline and/or river centerline 4153), WSE (which may also be useful if a nearby BFE is not available), and corresponding information from a LOMC (which may indicate whether the property's original zone changed) may be determined. The flood risk score data may then be appended to each individual property (e.g., may be added in additional columns next to the property address information on the spreadsheet). In some embodiments, the information may be organized into a different format. In some embodiments, the information may be sent (e.g., exported as a spreadsheet) to the requester. For example, the flood risk scores and/or additional data may be appended to the batched properties and returned to the requester.

Other flood risk characteristics may also be used in determining flood risk scores. For example, a flood frequency versus flood depth (elevation) curve may be used to generate a flood frequency for a given flood depth for the property point to be used as a flood risk characteristic. Flood risk ratings may be used as flood risk characteristics for the property point. Other factors and curves calculated for or near the property point may also be used in determining flood risk characteristics. For example, digital elevation datasets, elevation surfaces (e.g., TIN surfaces created by using the determined flood elevation lines and flood zone boundaries (for example, in a TIN)), flood frequency versus flood loss curves, calculated average annual loss, probable maximum loss, and historical hazard events for the property may be used as a flood risk characteristics. In some embodiments, potential for flash flooding (which may be serious for some regions or areas) may be used as a flood risk characteristic (e.g., using real case studies to model the impact of flash floods near the property point).

In some embodiments, flood elevation surface (e.g., a nationwide flood elevation surface) can be generated by using TIN based on flood elevation lines (such as BFEs) (e.g., nation-wide flood elevation lines) or flood zone boundaries (such as SFHA boundaries) (which may be nation-wide flood zone boundaries). By subtracting the ground elevation value of the property point from the flood elevation surface (e.g., SFHAs and/or nationwide flood elevation surfaces)), an elevation variance (flood depth) to 100 year flood elevation may be generated. In some embodiments, the elevation variances for multiple properties (e.g., nationwide) may be determined. In some embodiments, the ground elevation values may be determined from national digital elevation model (DEM) (e.g., national DEMs). When the elevation variance is positive, the earth ground elevation may be lower than the 100 year flood elevation, and when the elevation variance is negative, the earth ground elevation may be higher than the 100 year flood elevation (and/or other flood elevations). The elevation variances may be used to derive flood risk scores. In some embodiments, a nation wide elevation variance data set (or smaller/larger elevation variance data set) may be created to reduce real-time computation time when a flood risk score request is received for a property point.

In some embodiments, various mitigating conditions may also be considered in determining flood risk scores. Mitigating conditions may result in an increase or decrease in the flood risk score if a mitigating condition is found. For example, if the property is not in a known flood risk zone boundary, but the property's GE is lower than the respective BFE/WSE (of the calculated point such as a calculated point on a known flood risk zone boundary or nearest point on the nearest known flood risk zone boundary) and no LOMA is available, the flood risk score may be increased to show more risk. If the property is in a known flood risk zone boundary, but the GE is greater than the BFE/WSE (of the calculated point such as a calculated point on a known flood risk zone boundary or nearest point on the nearest known flood risk zone boundary) and no LOMA is available, the flood risk score may be decreased to show less risk. If the property is in between two known flood plain risk surface boundaries, but the closer known flood risk zone boundary is lower in elevation than the farther known flood risk zone boundary, the flood risk score may be impacted more by the farther known flood risk zone boundary if it is deemed to be more of a risk factor than the closer known flood risk zone boundary. If the property is in a known flood risk zone boundary that designates the flood area to be an alluvial fan and no BFE is available, the flood risk score may be increased to show more risk. If the property does not have BFE data available for over x feet (such as 3500 ft.) the flood risk score may be increased to show the possibility of increased risk. If the property is in a non-participating community or has never had a FIRM completed (e.g., Zone D or None), the property may have its flood risk score increased to show the possibility of increased risk.

In some embodiments, national flood risk boundaries (e.g., 100-year flood zone boundary and 500-year flood zone boundary if any) may be used to derive the flood risk score (e.g., a computed elevation of a calculated point such as a calculated point on a known flood risk zone boundary or a point, nearest to a property, at the national flood risk boundary may be used) (other sizes are also contemplated—for example, statewide flood risk boundaries). In some embodiments, the elevation difference between the property's elevation and the computed elevation of the calculated point such as a calculated point on a known flood risk zone boundary, associated cross section point, or the nearest point on the national flood risk boundary may be used to derive the flood risk score. In some embodiments, a flood related elevation (such as BFE or WSE) with a known/predicted flood risk (e.g., on a corresponding 100-year flood boundary) may be used to derive the flood risk score (e.g., the elevation difference between a property's elevation and the flood elevation (such as a nearest BFE or WSE) with a known/predicted flood risk may be used). The difference in elevation between the property point (e.g., ground elevation) and the associated WSE/BFE may correspond to an estimated property flood plain range (e.g., flood once every 0-100 years, 101-125 years, 126-250 years, 251-500 years, and 501+ years). This characteristic may be dependent on, for example, GIS data and a level of geo-coding confidence (e.g., to what resolution (such as street, address, and centroid) the property was geo-coded to). In some embodiments, one or more of the digital flood risk zone maps, corresponding digital elevations, proximity to flood risk zone, and proximity to flood sources and water management structures (such as dam, levees, and others) may be used to derive the flood risk score. In some embodiments, a flood risk score requester may enter an elevation to use for the property point. In some embodiments, a database of elevation certificates may be accessed for an elevation certificate (e.g., provided by a property surveyor) for the property point that has the elevation of the property. These elevation certificates may have highly accurate elevation data for their respective property. Elevation certificates may also be available for other locations.

Other information and relationships may also be used to determine the flood risk score for a property. For example, a logarithmic regression relationship between flood water depth and flood return period may be used to derive elevation variance for defining the flood risk score. For example, data from FEMA studies, United States Army Corps of Engineers (USACE) studies and other studies (e.g., European studies) on flood frequencies may be used with a logarithmic relationship (the log probability law) between the flood frequency and the flood event to determine a flood risk score. In some embodiments, a theoretical flood risk curve may be used to derive the elevation variances, for example, from 100-year flood events that may be used in the national flood risk score calculation. In some embodiments, intervals for flood elevation variances used in the flood risk score determination may be scaled by the logarithm relationship based on historical and experiential studies.

In some embodiments, hydro data from a nearest gage station may be used to derive the flood risk score. This method may assume that a flood at the cross-section 4013 where the property point is located has similar characteristics as the nearest gage station. In some embodiments, a BFE line feature may be a surface elevation at a cross-section in the river (e.g., see FIG. 6). A perpendicular line from the property point to the river centerline may define the cross-section location for the property. Using the peak flow and stage data at the nearest gage station, the flood frequency and elevation curve may be developed by hydrologic and hydraulic (HH) analysis. In some embodiments, hydraulic analysis, utilizing modeling software such as HEC-RAS environmental simulation modeling, may be performed in areas (such as communities and counties) that have previously not been modeled (e.g., that FEMA has not performed a hydrologic and hydraulic study to determine 1% or 0.2% annual chance flood polygons). This additional modeling may assist in providing more coverage of probabilistic flood polygons (e.g., nation-wide coverage). In some embodiments, the flood frequency curve at the property point (e.g., see FIG. 41*a*) may be extrapolated in two ways: (1) using nearest BFE or WSE at the property to systematically lower the flood frequency curve at a upstream gage station or systematically elevate the flood frequency curve at a downstream gage station, and (2) if 500 year WSE is known, an elevation difference between 500 year and 100 year flood elevations may be used to derive flood frequency curve from (1). In some embodiments, the derived (localized) flood frequency curve may be used to compute flood risk score at the property. For example, if the GE<Year Flood Elevation, use 800. If Year Flood Elevation<=GE<50 Year Flood Elevation, use 700, and if 50 Year Flood Elevation<=GE<100 Year Flood Elevation, use 600. In some embodiments, an extrapolation method may be used by using the hydro data from the nearest gage station to derive the flood risk score at the location of the property.

The frequency of alluvial fan flooding experienced by the property point may also be considered. Alluvial fan flooding may result in uncertainty in determining a flood flow path. Furthermore, alluvial fan flooding may result in an unstable ground surface (e.g., due to the impact of sediment deposition and erosion) making flood elevations in the alluvial fan area difficult to determine. The presence of the property point in an area subject to alluvial fan flooding may be used as a flood risk characteristic (e.g., the 100 year flood depth for the applicable alluvial fan area may be used) when deriving the flood risk score.

In some embodiments, the 24 hour maximum precipitation may be used to determine and/or revise the flood risk score (e.g., add to flood risk score if property's precipitation is higher than the maximum precipitation for the corresponding zip code—for example, as seen in regional climate maps). In some embodiments, frequency of hurricane events may be used to determine/revise the flood risk score (e.g., add 50 if the property had 5 hurricanes in the past 10 years). In some embodiments, satellite images may be used to identify land use types (such as impervious cover) to revise the flood risk score (e.g., add 0-25 if property located on non-impervious cover, depending, for example, on drainage system condition and capability). If the property is in a V zone (susceptible to water velocity damage) the flood risk score may be increased (e.g., by 25). In some embodiments, community flood risk reduction information (e.g., a LOMA) maybe used to revise the flood risk score of the property point 4600.

In some embodiments, 24 hour precipitation may be determined using, for example, Rainfall Frequency Atlas of the United States (used by FEMA to determine the amount of rainfall (discharge) for areas across the United States), a determined maximum 24 hour precipitation for the property point, and/or information from national precipitation frequency maps. These detailed studies may provide an estimated area of special flood hazard and establish a base flood elevation, which may then be incorporated graphically into the FIRMs. The Rainfall Frequency Atlas, or Albers equal-area projection standard parallel map studies, may estimate rainfall frequency for durations of, for example, "30 minutes" to "24 hours". This may be used to calculate the likelihood of a one-time occurrence, such as a base flood (or an event that has a 1% chance of happening one time in a given year). However, this method may not evaluate the likelihood that this event would happen multiple times during a period. The "100-year 24-hour rainfall" map may show the amount of rain that may occur in an area during a 24-hour period at least one time during a 100-year period without indicating how many times it could occur. The current mapping of the 100-year event may not represent the risk of multiple occurrences in areas of heavy rainfall. The flood maps may reflect the chance of one event during the period. To supplement the estimation of the base flood occurrence in a geographic area, climate conditions may be incorporated. The Albers equal-area map may show the estimated rainfall over a geographic area likely to occur once in a 100-year period, and the Koopen-Geiger climate map may show classifications of geographic areas based in part on the mean annual precipitation over a one year period. This data may provide an indication as to the likelihood that the base flood might occur repetitively.

In some embodiments, by identifying and mapping potential risk areas (e.g., as shown by the Koopen-Geiger map), the information may be used as a factor in insurance rating. In some embodiments, climate conditions, such as mean annual precipitation, may be incorporated into the flood risk factors. Property points within wetter regions of the country, such as the Gulf Coast that may contain the majority of repetitive loss structures, may have higher flood risk scores. In some embodiments, a 100-year rainfall map may be used to determine flood risk characteristics for the property point (e.g., to factor the potential intensity of rainfall in the area).

In some embodiments, other representations for the flood risk score are possible. For example, the flood risk score may include risk factors (e.g., see FIG. 49). These risk factors may be added or averaged together. For example, as seen in FIG. 50, cumulative scores may be provided for each property point in a batch of properties. In addition, several property's risk scores may be added together to form a cumulative risk score for a group of properties.

In some embodiments, additional information for determining flood risk scores may be derived from a theoretical approach to flood frequency and flood depth relationships, flood loss data statistics (e.g., for sensitivity water depth relation to flood losses) and HH studies, and a digital elevation based assessment (e.g., from a current zone determination to more comprehensive elevation, zone evaluation and additional supplemental factors).

In some embodiments, flood risk scores may cover an entire range elevation of the cross-section (e.g., see FIG. 41) at the property point 4600 (e.g., with open ends in highest risk areas and the lowest risk areas). The flood risk scores may be consistent with known (e.g., provided by FEMA) flood zone mappings (e.g., properties in a known flood risk zone boundary may have a higher flood risk score than a property not in a known flood risk zone boundary).

In some embodiments, the flood risk score may include three first scores (e.g., 800, 700, and 600) within a known flood risk zone boundary (e.g., FEMA SFHAs) and five first scores (e.g., 500, 400, 300, 200, and 100) for the outside of the known flood risk zone boundary (these first scores may be used as first score components). This break-up of scores may be based on the concept of flood return periods. Flood return periods from 1 to 1000 years may be modeled according to these scores. In some embodiments, three first scores may be used for the 100 year flood return period and below and five scores may be used for the 100-1000 year (a 900 year range) flood return period.

In various embodiments, the flood risk scoring engine may be configurable. For example, a user may enter criteria to make the engine more or less sensitive (e.g., more likely to assign higher flood risk scores). Criteria entered by the user may be used, for example, to weight different components of the flood risk score engine. In some embodiments, the flood risk score engine may include an expert system that can adapt components of the flood risk score engine based, for example, on real life examples and may handle risk score logic exceptions. For example, if the several properties that the flood risk score engine assigned a low flood risk score to are flooding frequently, the flood risk score engine may weight one or more factors to make the engine more sensitive. In some embodiments, the flood risk score engine may be more sensitive in certain areas and less sensitive in other areas. The expert system may analyze data (e.g., historical data) entered into the system to determine appropriate corrections.

Figure 51:
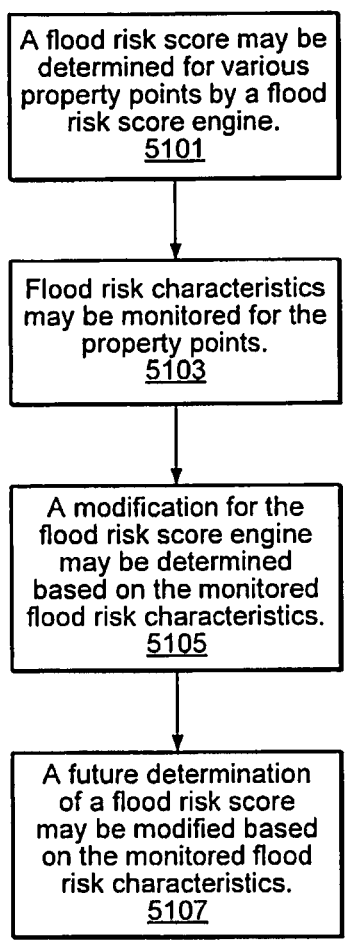
FIG. 51 illustrates a flowchart of an embodiment of a method for modifying a flood risk score engine.

FIG. 51 illustrates a flowchart of an embodiment of a method for modifying a flood risk score engine. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically by a computer system.

At 5101, a flood risk score may be determined for various property points by a flood risk score engine.

At 5103, flood risk characteristics may be monitored for the property points. For example, the property points may be monitored to determine if the property points are subjected to a flood. As another example, a precipitation amount experienced by the property points may be monitored.

At 5105 a modification for the flood risk score engine may be determined based on the monitored flood risk characteristics.

At 5107, a future determination of a flood risk score may be modified based on the monitored flood risk characteristics. For example, different components of a flood risk score engine may be weighted according to the monitored flood risk characteristics.

In some embodiments, other information may be provided with the flood risk score. For example, a map exhibit may be displayed (e.g., centered around the property address's zip code). Additional data elements to display may be set in a user account (e.g., of a flood risk score requester using the flood risk score engine). For example, the user account may detail specific elements a user wants included with all of the user's requests. In some embodiments, this information (and the map exhibit) may be displayed prior to calculating a flood risk score (e.g., to a manual researcher at 5105).

Other information that may be returned includes a FEMA flood zone, proximity to the zone, ground elevation, predicted flood elevations at different flood frequencies (such as 100 year and 500 year floods), proximity to body of water, proximity to a previously underwritten location, terrain, levees, NFIP claim history, ground cover, map exhibits with aerial photos, and aggregate and accumulation reports. This information may be provided, for example, with the spreadsheet received with the initial batch request. In some embodiments, flags may be used to indicate guaranteed or non-guaranteed results. The flags may be used to help determine which databases may be used to complete orders. Various charges may include transactional or annual license fees. Access may be provided, for example, through an interface, batch through the Web, or single location through the Web.

Figure 52:
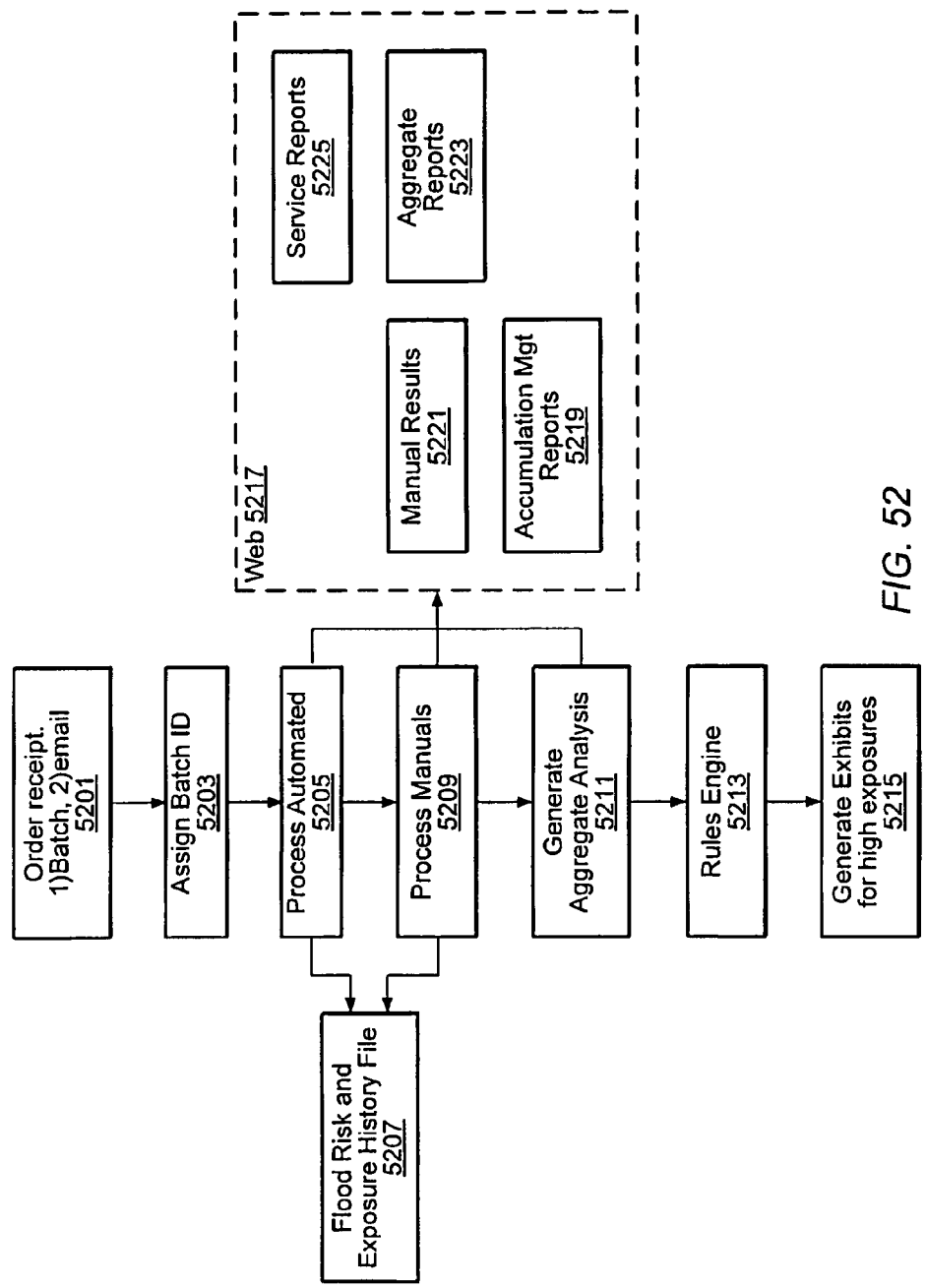
FIG. 52 illustrates a flowchart of an embodiment of a method for processing batch orders.

FIG. 52 illustrates a flowchart of an embodiment of a method for processing batch orders. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically by a computer system.

At 5201, an order may be received. For example, a batch order may be received by email.

At 5203, the order may receive a batch identification (ID).

At 5205, an automated process may be started.

At 5207, a flood risk and exposure history file may be accessed.

At 5209, manual orders may be processed. At 5217, the Web may be accessed. The web may provide manual results 5221, accumulation of management reports 5219, service reports 5225, and aggregate reports 5223.

At 5211, an aggregate analysis may be generated.

At 5213, a rules engine may be accessed.

In some embodiments, manual determination requirements and corresponding processes for the insurance customer may not be the same as a manual determination for the lending customer. Because insurance clients may not be able to gather additional information from their customers, some properties may remain undetermined to the zone level. In some embodiments, addresses that do not validate or cannot be found may not need to be completed to the FEMA zone level (or at all) for commercial insurance clients. In some embodiments, other flood risk data may be returned, for example, calculated proximity to zone, elevation, change in elevation, and a latitude/longitude pair that can be used to generate a map that depicts a flood zone. In this situation, the user may use mapping tools to view and navigate the identified area, and/or the building and corresponding flood zone to make an underwriting decision. The user may determine a final and exact location. These orders may not be guaranteed. Orders for which an address does not validate may still return the latitude/longitude of the submitted zip code so that an exhibit may be generated later by the user. If during manual research, the researcher is able to locate the general vicinity of the location, but not the exact location, they may have the ability to record the latitude/longitude of that area so that an exhibit can be generated by the user.

A completed order may be defined as a location for which some level of data with respect to flood risk has been returned. "Completed" order criteria may include zone, additional risk data, latitude/longitude, unknown zone, additional risk data, and an exhibit. In some embodiments, processing (e.g., insurance manual processing) may include (e.g., return) "Bad address" (which may return a reason such as insufficient address information and may possibly cancel after days); "Unable to Locate" (which may return a reason such as address not found and possibly cancel after days) or "Close calls" (e.g., address processed is similar or close to requested address).

In some embodiments, users may have the ability to move the location of the map point (e.g., which may correspond to a requested property point). Once relocated, zone proximity, elevation and other risk information may be calculated. Users may also be able to take measurements for horizontal distance between user specified points; associated elevation change (feet and slope) between the two points; and calculation of area/square footage and perimeter.

In some embodiments, a flood risk assistant may intend to help automate the underwriting process as it relates to flood. Using the tools set and data coverages established, a rules engine may be added that captures the carriers preferences, as it relates to flood underwriting, and apply those rules on a location by location basis. In applying the rules, locations with high risk and/or high exposure may be identified and exhibits may be generated.

In some embodiments, rules may be established based on one or more of the following criteria (flood risk score, FEMA zone, calculated proximity to FEMA zone, and/or site elevation compared to base flood elevation). As batches are processed the above information may be collected and/or calculated. The flood risk score may be a score representing the aggregate of FEMA Zone, calculated proximity, and elevation factors. In some embodiments, users may have the ability to set threshold levels that determine if and when a property may be referred for additional analysis. If a property meets the criteria established by the user, the location may be flagged and an exhibit may be generated. A rules engine may be used to identify if the property point is a high-risk location and exhibits may be automatically generated based on user-defined criteria.

Figure 53:
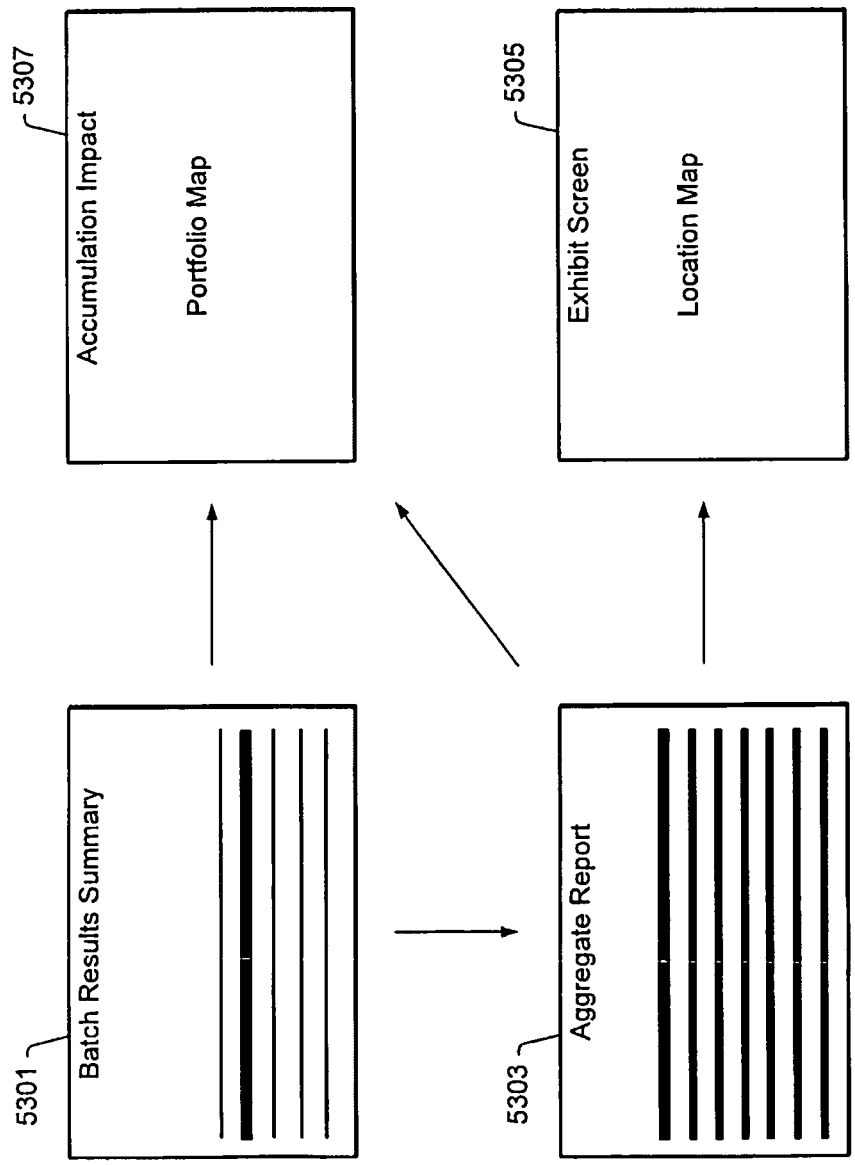
FIG. 53 illustrates various report types and relationships, according to an embodiment.

FIG. 53 illustrates various report types and relationships, according to an embodiment. In some embodiments, an exhibit may be generated and viewed. A link may be available to allow an on-screen exhibit to be generated for a selected line item. Exhibit generation may be account dependant. In addition, the extent of data available in the exhibit may be account dependant. In some embodiments, an aggregate report 5303 may be generated. This option may be available as a link within the batch history screen. Aggregate report availability may be account dependant. In some embodiments, accumulation management reports may be generated. These reports may be available at a menu level. This option may enable the user to conduct analysis on the history of locations that have been submitted for processing. Analysis may be in the form of thematic maps and corresponding textual reports. In some embodiments, users may be able to analyze geographies at the state, regional and riverine or other areas. In some embodiments, the user may be able to select/flag batches as "booked". Because not all batches that are evaluated for flood risk may be "booked" by the carrier, functionality to enable the user to identify batches/schedules that have been "booked" may be necessary in order to generate accurate accumulation management reports. Other report types include batch results summary 5301, accumulation impact portfolio map 5307, and exhibit screen location map 5305. In some embodiments, an accumulation manager may be used for flood risk accumulation reporting and analysis, GIS proximity analysis, GIS regional and state analysis and GIS risk concentration analysis. Corresponding mapping exhibits may also be provided. Results may also be provided as a portfolio loss model.

Figure 54:
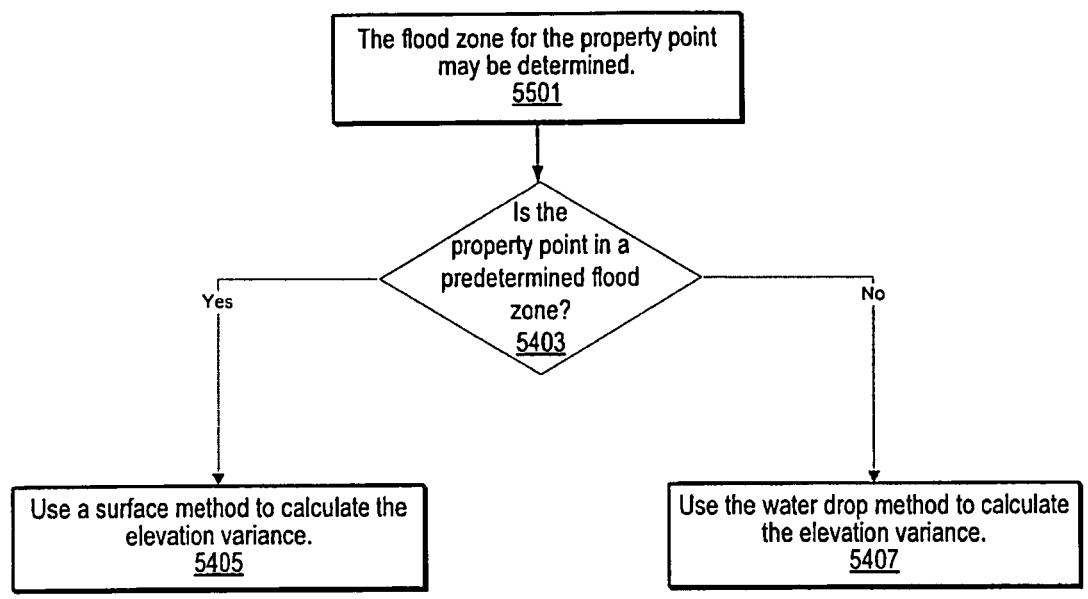
FIG. 54 illustrates additional embodiments of methods for determining elevation variances for assigning a flood risk score.

FIG. 54 illustrates additional embodiments of methods for determining elevation variances for assigning a flood risk score. It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically by a computer system.

At 5401, the flood zone for the property point may be determined.

At 5403, a determination may be made as to whether the property point is in a predetermined type of flood zone (e.g., a 1 percent annual chance flood zone). If the property point is in the predetermined type of flood zone, flow may continue at 5405. If the property point is not in the predetermined type of flood zone, flow may continue at 5407.

Figure 55:
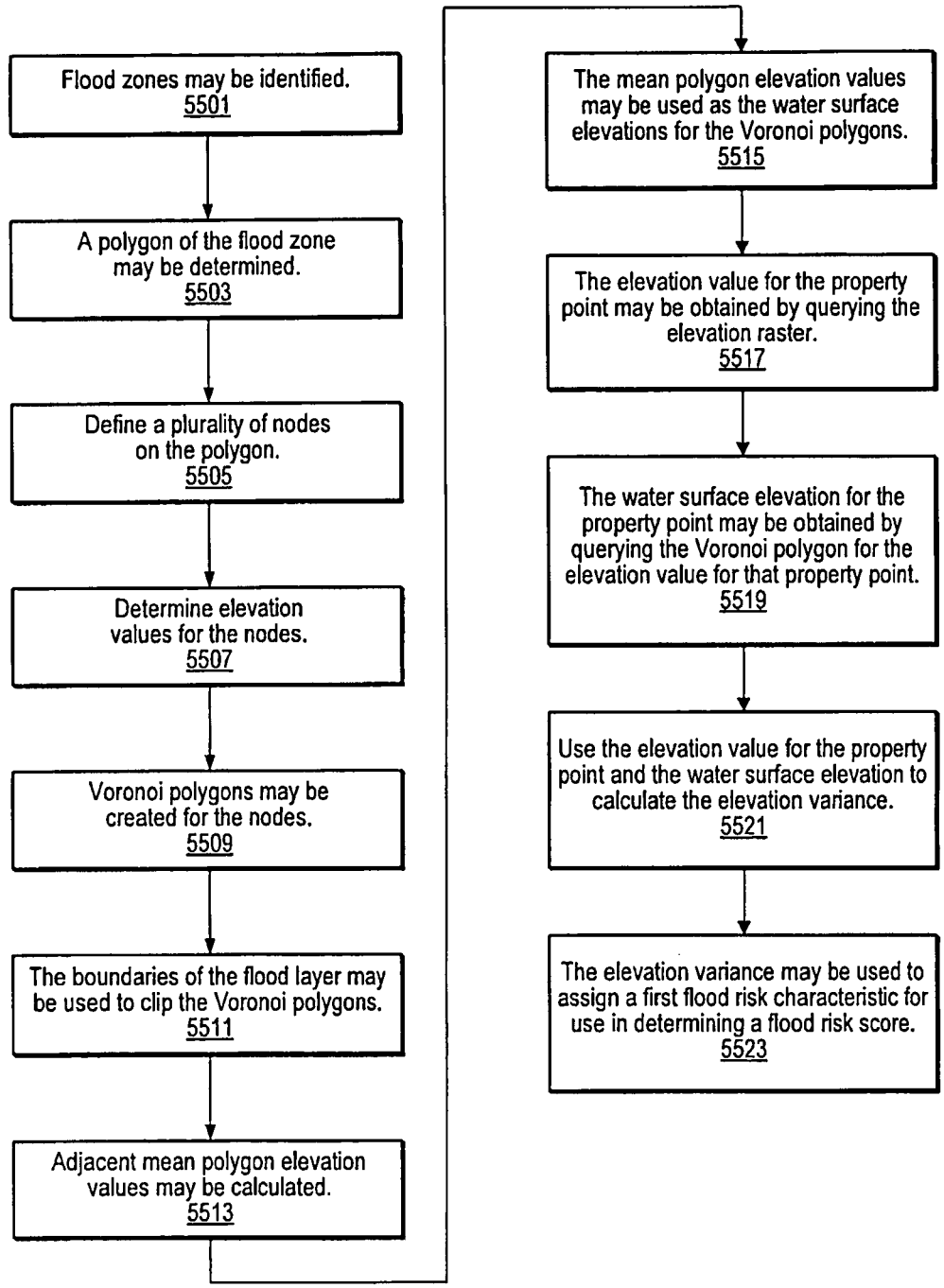
FIG. 55 illustrates a surface method for determining an elevation variance, according to an embodiment.
Figure 56A:
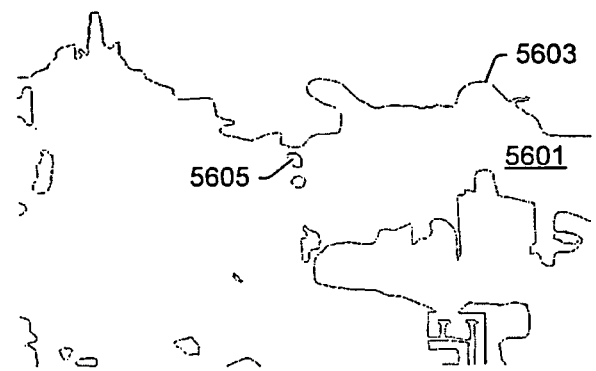
FIGS. 56a-c illustrates embodiments of nodes and Voronoi polygons for the surface method.

At 5405, a surface method may be used to calculate the elevation variance (e.g., see FIG. 55).

At 5407, a water drop method may be used to determine a hydrologic path to the predetermined type of flood zone (e.g., see FIG. 56). The hydrologic path may be used to determine a calculated point on the predetermined type of flood zone to use in determining the elevation variance (between the calculated point and the GE of the property point).

FIG. 55 illustrates a flowchart of an embodiment of a Voronoi polygon surface method to determine an elevation variance for a property point (e.g., to use in determining a flood risk score). It should be noted that in various embodiments of the methods described below, one or more of the elements described may be performed concurrently, in a different order than shown, or may be omitted entirely. Other additional elements may also be performed as desired. In some embodiments, a portion or the entire method may be performed automatically by a computer system.

At 5501, flood zones (e.g., A* and V* zones), for which base flood elevations will be approximated, may be identified on received flood maps. For example, flood zone 5601 (e.g., see FIG. 56*a*) may be digitized from a received FEMA flood map.

At 5503, a polygon 5603 of the flood zone 5601 may be determined. For example, the polygon 5603 may correspond to the outer boundary (e.g., as represented by a line) of the flood zone 5601 from a flood map. The polygon may include points that represent each vertex of the polygon. In some embodiments, flood polygons may have interior 'donut holes' (e.g., small pockets of elevated or depressed ground that may be considered in a different or unknown flood zone than the surrounding polygon) that may influence elevation polygons. In some embodiments, the interior 'donut holes' (e.g., 'donut hole' 5605) may be removed.

Figure 56B:
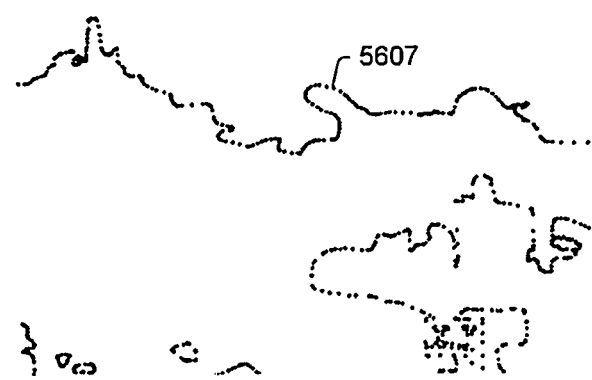

At 5505, a plurality of nodes on the polygon 5603 may be extracted (e.g., see node 5607 in FIG. 56*b*). For example, evenly spaced points on the polygon 5603 may be used as nodes. In some embodiments, nodes may be selected based on locations of defined elevation (e.g., defined on the flood map). Other node identifications are also contemplated.

At 5507, elevation values for the nodes may be determined. For example, elevation values for the nodes may be derived from a National Elevation Dataset (NED) (e.g., from the USGS) grid. Other elevation sources are also contemplated. In some embodiments, the nodes may be coded with the elevation of the grid cell corresponding to the node in an associated elevation data set.

Figure 56C:
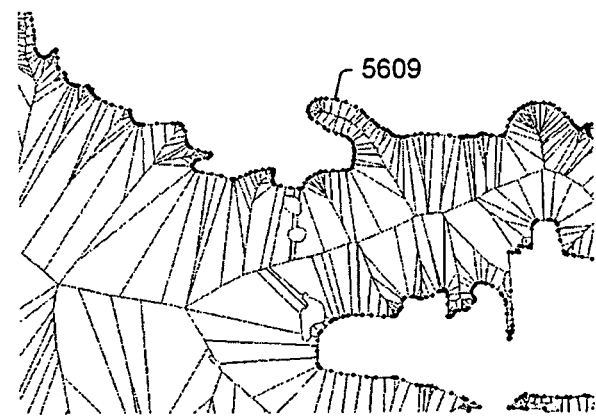

At 5509, Voronoi polygons may be created for the nodes (e.g., see Voronoi polygon 5609 in FIG. 56*c*). In some embodiments, a Voronoi polygon around each node may encompass the points that are closer to the node in the Voronoi polygon than any other node. In other words, the space around each node is a polygon whose boundaries define an area that is closest to each node relative to all other nodes. In some embodiments, each node may have a respective Voronoi polygon for the set of points closer to that node than any other node (e.g., as represented by a decomposition of the metric space of the flood zone). In some embodiments, the polygons may be mathematically defined by the perpendicular bisectors of the line between all nodes.

At 5511, the boundaries of the flood layer may be used to clip the Voronoi polygons (such that only the portions of the Voronoi polygons inside the flood zone are used).

At 5513, for one or more input Voronoi polygons, adjacent mean polygon elevation values may be calculated. For example, the elevation values of the Voronoi polygons that touch the input Voronoi polygon may be determined (the elevation values for the Voronoi polygons may include the elevation values of the nodes associated with the Voronoi polygons). The mean value of these elevation values may then be determined. For example, the mean value may be an average of the elevations of the nodes associated with the Voronoi polygons touching the input Voronoi polygon. The determined mean elevation value may be used as the WSE value associated with the input Voronoi polygon. In some embodiments, this averaging may be performed multiple times. For example, after determining the new WSE values derived from the determined mean elevation values, the new WSE values of the Voronoi polygons that touch the input Voronoi polygon may be used to calculate another mean value for the input Voronoi polygon to replace the previous mean value. In some embodiments, the averaging may reduce the effect of elevation errors in the nodes. For example, if a node has an incorrect elevation value, the elevation values of the surrounding nodes may be averaged to provide the incorrect node's polygon an elevation value that is closer to the correct WSE value for the polygon.

At 5515, the mean values determined for the Voronoi polygons may be used as the WSE values (e.g., the base flood elevation) associated with the Voronoi polygons.

At 5517, the elevation value for the property point may be obtained by querying the elevation raster (i.e., determining the ground elevation of the property point).

At 5519, the WSE for the property point may be obtained by querying the Voronoi polygon for its elevation value for that property point. In some embodiments, the WSE for the property point may be the respective determined WSE value (see 5513) determined for the Voronoi polygon circumscribing the property point. In some embodiments, the WSE for the property point may be the elevation value of the node associated with the Voronoi polygon that circumscribes the property point (e.g., in some embodiments, the averaging in 5513 may not be performed). Other WSEs are also contemplated.

At 5521, use the elevation value for the property point (e.g., GE) and the determined WSE to calculate the elevation variance (i.e. the difference between the two elevations).

At 5523, the elevation variance may be used to assign a first flood risk characteristic for use in determining a flood risk score.

Figure 57:
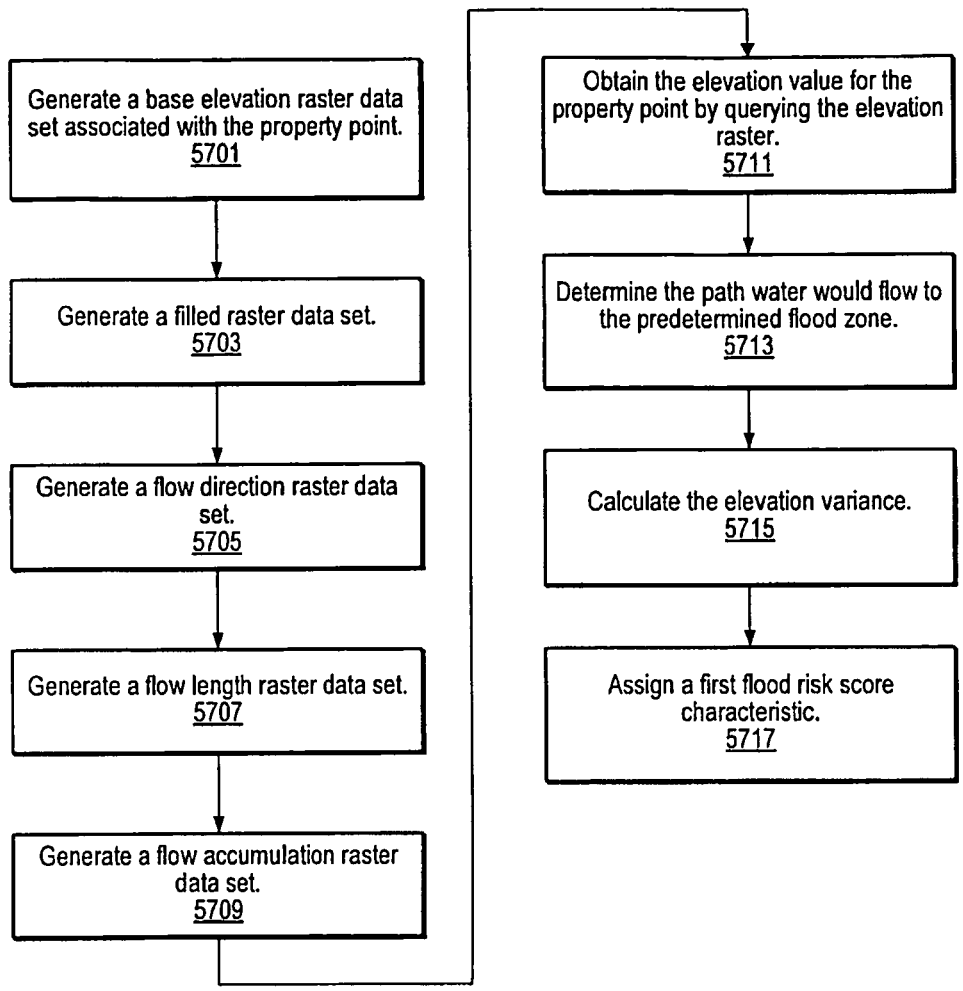
FIG. 57 illustrates a water drop method for determining an elevation variance, according to an embodiment.
Figure 58B:
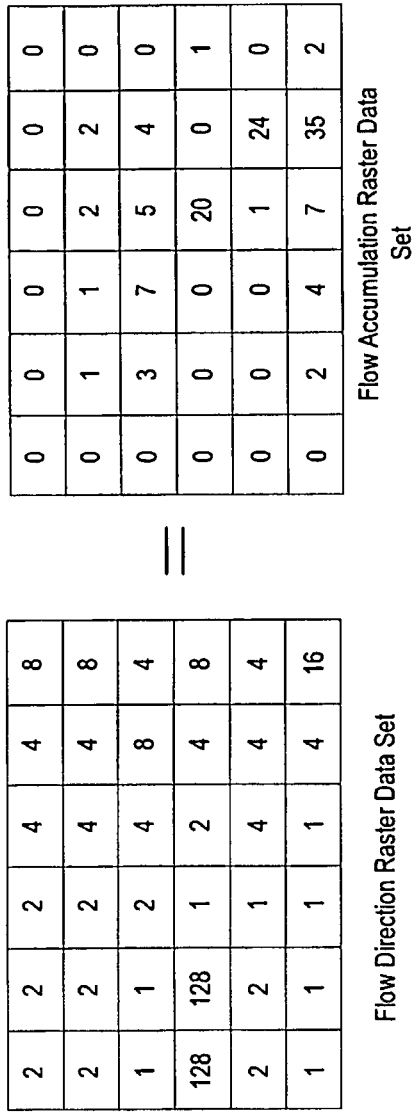

FIG. 57 illustrates a flowchart of an embodiment of a water drop method to determine an elevation variance for a property point (e.g., to use in determining a flood risk score). In some embodiments, the water drop method may be used to determine an elevation of a point on a hydrological path between the property point and a known flood risk zone boundary (which may be the nearest known flood risk zone boundary to the property point). In some embodiments, the hydrological path may identify a point on a known flood risk zone boundary that is not the nearest known flood risk zone boundary. It should be noted that in various embodiments of the methods described below, one or more of the elements described may be performed concurrently, in a different order than shown, or may be omitted entirely. Other additional elements may also be performed as desired. in some embodiments, a portion or the entire method may be performed automatically by a computer system.

At 5701, generate a base elevation raster data set associated with the property point. In some embodiments, the National Elevation Dataset (NED) obtained from USGS may be used as the base elevation raster data set (e.g., see the elevation data set in FIG. 58*a*). In some embodiments, the resolution of the data set may be 10 meters (other resolutions are also contemplated). Other elevation data sets, e.g., data sets derived from LIDAR, may be used as the base elevation raster data set. In some embodiments, the base elevation data set may be used to create several other raster data sets to assist in determining the flood risk score. Raster data sets may include filled rasters, flow direction rasters, flow length rasters, and flow accumulation rasters. Other raster data sets are also contemplated.

At 5703, generate a filled raster data set. In some embodiments, a filled raster data set may be created by examining each cell of the base elevation raster data set and comparing the cell value to the cell values of the cells that touch it (e.g., eight surrounding cells). If the value of the input cell is within the standard deviation of the surrounding cells, the value may be considered good (i.e., held). If the value falls outside of the standard deviation, the eight surrounding cells may be averaged and the averaged value may be applied to the original cell. Filled raster data sets may include rasters with elevation anomalies (e.g., a data set representing sinks or peaks). In some embodiments, the filled raster data sets may thus be modified (e.g., using the above averaging method) to create a depressionless and/or peakless elevation data set. A sink or peak may include erroneous data that represent low or high spots relative to the surrounding data.

At 5705, generate a flow direction raster data set from the elevation raster data set (which may be a filled raster data set and/or base elevation raster data set). A flow direction raster data set may include a data set with cell values that indicate the relative direction of their steepest down slope neighbor (i.e., with the lowest elevation of the input cell's neighbors) (e.g., see the flow direction raster data set in FIG. 58*a*). In some embodiments, each cell of an elevation grid (e.g., the filled raster data set) may be examined and compared to one or more cells that touch it (e.g., each cell that touches it). A numerical comparison may be used to determine which way water would flow based on the lowest elevation (as indicated by the cell values of the elevation raster data set) and is assigned a direction value. For example, the direction value may be assigned from the direction assignment block in FIG. 58*a*. Other size assignment blocks are also contemplated. Thus, for example, if the cell to the immediate right of center of the input cell is the lowest value of the 9 cells touching the input cell, a value of "1" may be entered in the flow direction raster data set for the input cell (similarly, a value of "2" may be entered if the cell just below the cell to the immediate right of the center input cell is the lowest value). As another example, if the direction of the steepest drop was to the left of the center of the input cell, the flow direction for the input cell may be coded as 16 in the flow direction raster data set. The flow direction raster data set may thus describe the direction of flow through a catchment from each grid cell by examining the cell's eight neighbors. The values of 1, 2, 4, 6, 8, 16, etc. may be used as binary identifiers (other direction values are also contemplated).

At 5707, generate a flow length raster data set based on the elevation raster data set (which may be a filled raster data set and/or base elevation raster data set). Flow length raster data sets may provide a length of the longest flow path within a given basin. Flow length raster data sets may include the linear distance from the highest point (grid cell value) to the drainage outlet for the catchment. For example, for each input cell, the length (e.g., linear distance) from the input cell to the highest point may be entered into the input cell of the flow length raster data set. An example flow length raster data set is provided in FIG. 58*a* for an elevation data set with the top left corner as the highest elevation value.

At 5709, generate a flow accumulation raster data set based the flow length raster data set and the flow direction raster data set. In some embodiments, the flow length raster data set may be examined to determine the location of the highest point and the general direction of flow (in some embodiments, the flow accumulation raster data set may be determined for the entire grid and a flow length raster data set may not be needed). The highest point may be assigned a value of 1 in the corresponding flow accumulation raster data set input cell. In some embodiments, the initial cells of the flow accumulation raster data set may be filled with ones. The corresponding flow direction raster data set cell for the highest point may indicate which direction the highest point cell drains into (e.g., the flow direction raster data set cell with have a value indicating direction (1, 2, 4, 8, etc.) as provided by the direction assignment block. The cell that receives the flow from the highest point (as indicated by the direction value of the highest point) may be analyzed next as the input cell. Each cell touching the input cell that flows into the input cell (according to their respective flow direction raster data set values) may be accumulated into the input cell (e.g., if three cells flow into the input cell, the accumulation values of each cell that flows into the input cell may be accumulated and given to the input cell). For example, if 3 cells flow into the input cell, and of the three cells, one cell flows into one (e.g., has the initial provided value of 1), five cells flow into another, and three cells flow into the third, the flow accumulation value for the input cell may be 1+5+3=9. Thus, a flow accumulation raster data set's values may provide contributing flow (e.g., from surrounding cells) to each cell (e.g., see FIGS. 58*a-b*). In some embodiments, each cell of a flow direction raster data set may be examined and compared to one or more cells that touch it (e.g., each cell that touches it). The sum of the quantity of cells that 'flow' into the input cell may be assigned to the input cell. For example, if 2 cells flow into a cell (e.g., as determined by examining the flow direction raster data set), the number 2 may be assigned to the input cell. If two cells have 2 cells that flow into them, the numbers may be summed (e.g., a value of 4) and assigned to the input cell. Accumulated flow may include the number of cells flowing into each cell in the output raster. Cells with high accumulated flow values may be used to identify stream channels. Cells with accumulated flow values of zero may be local topographic highs that can be used to identify ridges and drainage basin boundaries.

At 5711, obtain the elevation value for the property point by querying the elevation raster data set (i.e., the ground elevation of the property point).

At 5713, the flow direction raster data set and the flow accumulation raster data set or flow length raster data set, along with the property point may be used to determine the path (i.e., the hydrological path) water would flow to the nearest known flood risk zone boundary (e.g., a predetermined flood zone such as the 1% annual chance flood zone). For example, if a bucket of water were dropped on the property point, the raster data sets assist in identifying the direction and hydrological path that the water would take to the predetermined flood zone by overlaying the raster data sets and calculating the direction of flow from the input location (the property point) and the drainage outlet location (e.g., a point on the known flood risk zone boundary). These raster data sets may provide the flow accumulation and flow direction. In some embodiments, the lowest to the highest value cells of the flow accumulation raster data may be compared the values of the flow direction to create a 'path of flow'. High accumulation may dictate a stream and low accumulation may dictate a ridge. Flow path may always flow from low values to high values.

In some embodiments, the flow accumulation raster data set may be examined and the point that corresponds to the property point 5901 may be located. Next the cells touching the property point cell may be examined, and the cell with the highest accumulation value (in the flow accumulation raster data set) may be selected. The hydrological path 5905 may run from the property point to the cell with the highest accumulation value. The cell with the highest accumulation value may then be analyzed and, of the cells touching this cell, the cell with the highest accumulation value may be determined (the hydrological path may also be considered to travel through this point). This process may continue until a cell corresponding to a point on a known flood risk zone boundary is identified as a cell on the hydrological path 5905. In some embodiments, the flow direction raster data set and/or flow length raster data set may also be analyzed to verify the detected hydrological path 5905.

Figure 59:
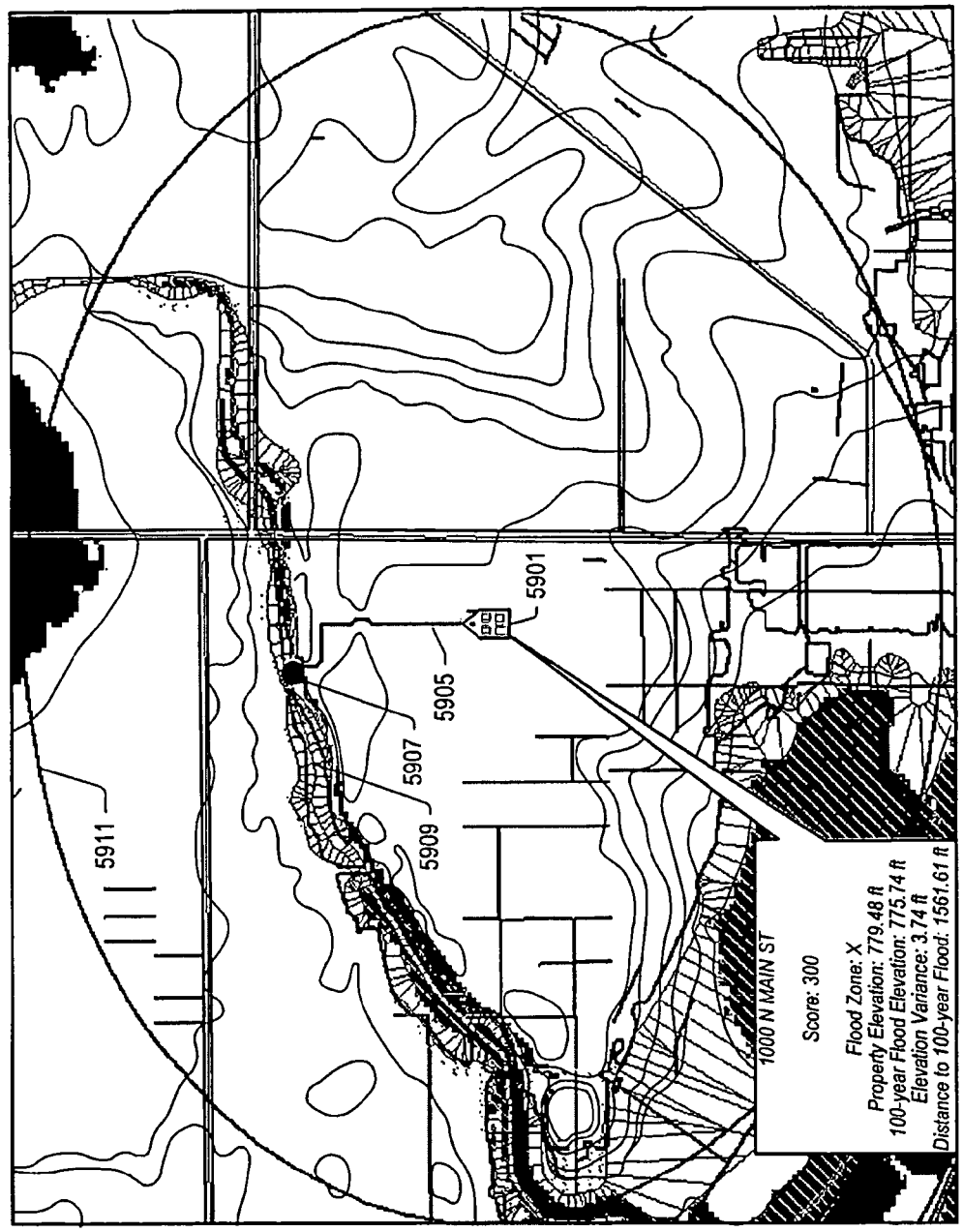
FIG. 59 illustrates a hydrological path to a property point, according to an embodiment.

Once we know the point location 5907 (i.e., the calculated point) where the hydrological path 5905 crosses the predetermined flood zone 5909 (e.g., with a known flood risk zone boundary), the elevation value at that point 5907 (known as water surface elevation) may be obtained. As seen in FIG. 59, the property point 5901 is shown depicted as a house 5901 centered within a buffer that is depicted as a circle 591 I. The water drop is depicted as line 5905 that shows the path to the closest hydrologically significant predetermined flood zone (e.g., the 1% annual chance flood zone). The point on the predetermined flood zone is depicted as dot 5907.

At 5715, with the two elevation values, the elevation variance may be calculated (e.g., the difference between the two elevation values).

At 5717, a first flood risk score characteristic may be assigned based on the elevation variance. In some embodiments, the water drop method (including determination of the flow path and slope direction) may also be used to validate other calculated points (e.g., calculated using one of the other above methods). For example, the water drop method may be used to validate the selected calculated point on the SFHA by computing an associate water surface elevation for the property point.

In various embodiments, a flood risk score may be determined for a property point that provides a comprehensive assessment of the property point's risk of flooding. Determining the flood risk score may include determining a flood risk characteristic for the property point and assigning a flood risk score that corresponds to the flood risk characteristic. In some embodiments, flood risk characteristics may include: (a) an elevation difference between the property ground elevation and the known flood elevation at the associated cross-section; (b) a flood risk zone determination for the property point, that controls the general range of flood risk score for the property point; (c) a nation-wide scheme for flood risk assessment by using nation-wide seamless flood risk zoning map, digital elevation datasets, national hydrology dataset, national dam and levee databases, and others; (d) a consideration of LOMA and LOMR, that will alter primary flood risk score to ensure the accuracy of the assessment (e) a consideration of alluvial fan flooding; (f) a spatial layer for nation-wide elevation variance to 100 year flood elevation for facilitating the effective computation of flood risk score; (g) a proximity of the property point to a special flood hazard area (SFHA) or a flood source; (h) a flood risk consideration of water control facilities (such as dams, levees and pumping stations); (i) flood risk considerations for other physical factors (such as historical precipitation and national precipitation frequency map, frequency of hurricanes, and many others); and (j) a consideration of flood risk mitigation (community activities) by evaluating whether the community of the property point participates the National Flood Insurance Program's (NFIP) and what its CRS rating (Community Rating System) is. Other flood risk characteristics (e.g., as noted above) are also contemplated. In some embodiments, the flood risk characteristics may be combined to form a comprehensive flood risk score (which may be included in a flood risk score report).

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer readable storage medium comprising instructions which, when executed by a computer system that includes a data processor and is connected to at least one data repository, perform a method comprising:
   (a) determining, by the data processor of the computer system, a flood risk zone associated with a property area by analyzing flood map data;
   (b) determining, by the data processor of the computer system, hydrology information associated with the property area by analyzing a hydrology dataset or implementing a hydrologic method;
   (c) analyzing, by the data processor of the computer system, an elevation dataset and geocoded attributes of the property area to determine a property elevation associated with the property area;
   (d) determining, by the data processor of the computer system, a flood elevation associated with the property area by analyzing the hydrology information and the elevation dataset;
   (e) determining, by the data processor of the computer system, a variance between the property elevation and the flood elevation;
   (f) automatically calculating, by the data processor of the computer system, a flood risk score based at least in part on the flood risk zone, the variance, and the hydrology information;
   (g) storing, by the data processor in the at least one data repository, the calculated flood risk score;

(h) producing and displaying an interactive web page that includes a map of real properties and an indication of the flood risk score in association with at least one of the real properties.

2. The non-transitory computer readable storage medium of claim 1, wherein the property area comprises a property point.

3. The non-transitory computer readable storage medium of claim 1, wherein the property elevation comprises a ground elevation.

4. The non-transitory computer readable storage medium of claim 1, wherein the flood elevation corresponds to a base flood elevation or a water surface elevation associated with the property area.

5. The non-transitory computer readable storage medium of claim 1, wherein the variance comprises a difference in elevation between the property elevation of the property area and a water surface elevation of a calculated point on a flood plain boundary, wherein the calculated point is determined through a radius search for a substantially nearest point on the substantially nearest flood plain boundary.

6. The non-transitory computer readable storage medium of claim 1, wherein the variance comprises a difference in elevation between the property elevation of the property area and an elevation of a substantially nearest point in a substantially nearest known flood risk zone boundary.

7. The non-transitory computer readable storage medium of claim 6, wherein the known flood risk zone boundary is a Special Flood Hazard Area (SFHA).

8. The non-transitory computer readable storage medium of claim 1, wherein the flood risk score is further calculated based on at least one of potential coastal surge flooding, proximity of property area to a water control facility, a frequency of alluvial fan flooding experienced by the property area, or whether the property area is in a community within a given class of the National Flood Insurance Program's (NFIP) Community Rating System (CRS).

9. The non-transitory computer readable storage medium of claim 1, wherein the flood risk score is further calculated based on proximity of property area to a water control facility comprising at least one of a dam, a levee, or a pumping station.

10. The non-transitory computer readable storage medium of claim 1, wherein the method further comprises:
determining if a Letter of Map Amendment (LOMA) or Letter of Map Revision (LOMR) is available for the property area indicating the property area is not within a flood risk zone boundary; and if an applicable LOMA or LOMR exists for the property area, assigning the flood risk score for the property area to reflect a lower risk of flooding than a flood risk score for a property area in a flood risk zone boundary.

11. A system comprising:
physical data storage configured to flood risk data; and
a computer system in communication with the physical data storage, the computer system comprising computer hardware, the computer system programmed to:
determine a flood risk zone associated with a property area by analyzing flood map data;
determine proximity of property area to a flood risk zone boundary, a flood source, or a water control facility by analyzing the flood map data, a hydrology dataset, and an elevation dataset;
automatically calculate a flood risk score based at least in part on the flood risk zone and proximity of property area to a flood risk zone boundary, a flood source, or a water control facility;
store in the physical data storage the calculated flood risk score; and
produce and display an interactive web page that includes a map of real properties and an indication of the flood risk score in association with at least one of the real properties.

12. The system of claim 11, wherein the property area comprises a property point.

13. The system of claim 11, wherein the flood risk score is further calculated based on a property elevation associated with the property area.

14. The system of claim 13, wherein the flood risk score is further calculated based on a variance between the property elevation and a flood elevation associated with the property area.

15. The system of claim 14, wherein the variance comprises a difference in elevation between the property elevation of the property area and a water surface elevation of a calculated point on a flood plain boundary, wherein the calculated point is determined through a radius search for a substantially nearest point on the substantially nearest flood plain boundary.

16. The system of claim 14, wherein the variance comprises a difference in elevation between the property elevation of the property area and an elevation of a substantially nearest point in a substantially nearest known flood risk zone boundary.

17. The system of claim 16, wherein the known flood risk zone boundary is a Special Flood Hazard Area (SFHA).

18. The system of claim 11, wherein the flood risk score is further calculated based on at least one of potential coastal surge flooding, a frequency of alluvial fan flooding experienced by the property area, or whether the property area is in a community within a given class of the National Flood Insurance Program's (NFIP) Community Rating System (CRS).

19. A non-transitory computer readable storage medium comprising instructions which, when executed by a computer system that includes a data processor and is connected to at least one data repository, perform a method comprising:
(a) determining, by the data processor of the computer system, a flood risk zone associated with a property area by analyzing flood map data;
(b) analyzing, by the data processor of the computer system, an elevation dataset and geocoded attributes of the property area to determine a property elevation associated with the property area;
(c) determining, by the data processor of the computer system, a flood elevation associated with the property area by analyzing a hydrology dataset and the elevation dataset;
(d) determining, by the data processor of the computer system, a flood depth between the property elevation and the flood elevation;
(e) automatically calculating, by the data processor of the computer system, a flood risk score based at least in part on the flood risk zone and the flood depth;
(f) storing, by the data processor in the at least one data repository, the calculated flood risk score; and
(g) producing and displaying an interactive web page that includes a map of real properties and an indication of the flood risk score in association with at least one of the real properties.

20. The non-transitory computer readable storage medium of claim 19, wherein the property area comprises a property point.

* * * * *